US009964676B2

United States Patent
Nagahama et al.

(10) Patent No.: US 9,964,676 B2
(45) Date of Patent: May 8, 2018

(54) OPTICAL ELEMENT, WINDOW MATERIAL, FITTING, SOLAR SHADING DEVICE, AND BUILDING

(75) Inventors: Tsutomu Nagahama, Tochigi (JP); Atsushi Shibuya, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days. days.

(21) Appl. No.: 14/360,061

(22) PCT Filed: Aug. 24, 2012

(86) PCT No.: PCT/JP2012/072089
§ 371 (c)(1),
(2), (4) Date: May 22, 2014

(87) PCT Pub. No.: WO2013/080618
PCT Pub. Date: Jun. 6, 2013

(65) Prior Publication Data
US 2014/0293436 A1   Oct. 2, 2014

(30) Foreign Application Priority Data
Nov. 29, 2011  (JP) ................. 2011-260770

(51) Int. Cl.
*G02B 27/14*  (2006.01)
*G02B 5/26*  (2006.01)
(Continued)

(52) U.S. Cl.
CPC .............. *G02B 5/26* (2013.01); *E06B 9/24* (2013.01); *E06B 9/386* (2013.01); *E06B 9/42* (2013.01);
(Continued)

(58) Field of Classification Search
CPC ...... G02B 5/045; G02B 6/0053; G02B 5/124; G02B 6/0036; G02B 19/0028;
(Continued)

(56) References Cited

U.S. PATENT DOCUMENTS 5,512,219 A * 4/1996 Rowland et al. ............ 264/1.6
5,754,338 A * 5/1998 Wilson ................... B29C 66/234
359/529
(Continued)

FOREIGN PATENT DOCUMENTS

CN    102221722 A    10/2011
EP    2 352 042 A1    8/2011
(Continued)

OTHER PUBLICATIONS

International Search Report issued in International Application No. PCT/JP2012/072089 dated Dec. 11, 2012.
(Continued)

*Primary Examiner* — Alicia M Harrington
(74) *Attorney, Agent, or Firm* — Oliff PLC

(57) ABSTRACT

An optical element is provided with an optical layer in which a concavo-convex surface is formed on the surface thereof, and a wavelength-selective reflection layer formed on the concavo-convex surface. The wavelength-selective reflection layer directionally reflects light having a specific wavelength band selectively, while transmitting light having wavelength bands other than the specific wavelength band. The concavo-convex surface is provided with a plurality of first structural elements that are extended in a first direction within the surface of the optical layer and a plurality of second structural elements that are extended in a second direction within the surface of the optical layer, and placed to be spaced apart from each other, with the first direction and the second direction intersecting with each other.

13 Claims, 31 Drawing Sheets

(51) Int. Cl.
*E06B 9/24* (2006.01)
*G02B 5/04* (2006.01)
*E06B 9/386* (2006.01)
*E06B 9/42* (2006.01)
*G02B 5/10* (2006.01)

(52) U.S. Cl.
CPC ...... *G02B 5/045* (2013.01); *E06B 2009/2417* (2013.01); *G02B 5/10* (2013.01)

(58) Field of Classification Search
CPC .. G02B 27/145; G02B 6/0031; G02B 6/0055; G02B 6/0063; G02B 26/0883; G02B 5/0242; G02B 5/22; G02B 5/0231; G02B 5/0284; G02B 5/04; G02B 5/26; G02B 5/10; G02F 1/133526; F21V 5/005; F21V 5/02; F21V 7/0008; F21V 13/04; E06B 9/386; E06B 9/24; E06B 2009/2417
See application file for complete search history.

(56) References Cited

U.S. PATENT DOCUMENTS

| | | | | |
|---|---|---|---|---|
| 5,889,615 | A * | 3/1999 | Dreyer | G02B 5/124 264/1.9 |
| 6,155,689 | A * | 12/2000 | Smith | G02B 5/124 359/529 |
| 7,655,301 | B2 | 2/2010 | Chonan et al. | |
| 2004/0190102 | A1* | 9/2004 | Mullen | B29C 35/0894 359/237 |
| 2005/0185279 | A1* | 8/2005 | Mullen | G02B 5/124 359/530 |
| 2006/0008640 | A1 | 1/2006 | Chonan et al. | |
| 2010/0177380 | A1 | 7/2010 | Nagahama et al. | |
| 2010/0277801 | A1 | 11/2010 | Nakajima | |
| 2011/0222145 | A1* | 9/2011 | Ito | 359/359 |
| 2013/0163256 | A1* | 6/2013 | Hunt | G02B 5/045 362/317 |

FOREIGN PATENT DOCUMENTS

| | | |
|---|---|---|
| EP | 2 367 032 A2 | 9/2011 |
| JP | A-2004-58592 | 2/2004 |
| JP | A-2007-10893 | 1/2007 |
| JP | B2-4513921 | 7/2010 |
| JP | 2011-186414 A | 9/2011 |
| JP | A-2011-175249 | 9/2011 |
| JP | A-2011-180449 | 9/2011 |
| WO | 95/33612 A1 | 12/1995 |
| WO | WO 2005/087680 A1 | 9/2005 |
| WO | WO 2010/067640 A1 | 6/2010 |

OTHER PUBLICATIONS

Jul. 21, 2015 Search Report issued in European Patent Application No. 12853412.0.
Nov. 18, 2015 Office Action issued in Chinese Patent Application No. 201280058678.4.
Jun. 14, 2016 Chinese Office Action issued in Chinese Patent Application No. 201280058678.4.
Jul. 11, 2017 Office Action issued in Chinese Patent Application No. 201610823395.4.

* cited by examiner

OPTICAL ELEMENT, WINDOW MATERIAL, FITTING, SOLAR SHADING DEVICE, AND BUILDING

FIELD OF THE INVENTION

The present technique relates to an optical element, a window material, a fitting, a solar shading device and a building. More specifically, it concerns an optical element that directionally reflects incident light.

BACKGROUND OF THE INVENTION

From the viewpoint of reducing an air conditioning load, a window-use film for shading solar light has been marketed. As a technique for shading solar light, a film for absorbing solar light and a film for reflecting solar light have been marketed; however, the former film becomes hot after absorbing solar light to cause a problem of a heated peripheral portion of a window that is referred to as a perimeter zone. With respect to the latter film, many techniques have been disclosed in which an optical multilayer film, a metal containing film, a transparent conductive film, or the like has been used as the reflection layer (for example, see Patent Document 1).

However, since the reflection layers are formed on a window glass on a plane, incident solar light is only allowed to be regularly reflected. For this reason, light rays applied from the sky and regularly reflected therefrom are allowed to reach another building outside and the ground, and absorbed and converted to heat, thereby causing a rise in the ambient temperature. As a result, on the periphery of a building in which this reflection layer is bonded to the entire windows, a temperature rise is locally generated, with the result that such problems as to cause an increased heat island phenomenon in a city district and as to suppress lawn from growing only on an irradiated surface by the reflected light.

Therefore, in order to solve problems such as the heat island phenomenon or the like caused by this regular reflection, various films have been proposed by which solar light is directionally reflected in directions other than the direction of the regular reflection (see Patent Document 2). One of the proposals includes a film in which a reflection layer is formed on a concavo-convex surface constituted by a plurality of pillar-shaped elements that are one-dimensionally arranged, with the concavo-convex surface forming the reflection layer being enclosed and buried with a resin material.

PRIOR-ART DOCUMENTS

Patent Document

PTL 1: International Publication No. 05/087680 Pamphlet
PTL 2: Japanese Patent No. 4513921

SUMMARY OF THE INVENTION

However, in the case when the concavo-convex surface is enclosed and buried with a resin material as described above, during its enclosing and burying process, stripe-like film-thickness irregularities tend to be generated to cause degradation of film visibility.

Therefore, one object of the present technique is to provide an optical element, a window material, a fitting, a solar shading device and a building capable of suppressing the generation of stripe-like film-thickness irregularities.

In order to solve the above-mentioned problems, the present technique is provided with: an optical element including: an optical layer having a concavo-convex surface formed on one surface thereof; and a wavelength-selective reflection layer formed on the concavo-convex surface, and in this structure, the wavelength-selective reflection layer directionally reflects a light ray having a specific wavelength band, while transmitting light rays having wavelength bands other than the specific wavelength band, and the concavo-convex surface is provided with a plurality of first structural elements that are extended in a first direction within the surface of the optical layer and a plurality of second structural elements that are extended in a second direction within the surface of the optical layer, and located so as to be spaced apart from one another, with the first direction and the second direction intersecting with each other.

The present technique relates to the optical element, and the window material, fitting, solar shading device and building of the present technique are characterized by providing the optical element of the present technique.

In accordance with the present technique, the concavo-convex surface of the optical layer is provided with the plural first structural elements that are extended in the first direction within the surface of the optical layer, and the plural second structural elements that are extended in the second direction within the surface of the optical layer, and located so as to be spaced apart from one another, with the first direction and the second direction being allowed to intersect with each other. With this structure, upon enclosing and burying the concavo-convex surface of the optical layer, paths that allow the material for use in the enclosing and burying process to flow therethrough can be formed by the second structural elements.

Effects of Invention

As described above, in accordance with the present technique, it becomes possible to suppress the generation of stripe-like film-thickness irregularities.

DETAILED DESCRIPTION OF THE INVENTION

Referring to Figures, the following description will discuss embodiments of the present invention in the following order.

1. First Embodiment (example of an optical film in which first structural elements and second structural elements are formed orthogonal to each other)
2. Second Embodiment (example of an optical film in which second structural elements are formed diagonally relative to first structural elements)
3. Third Embodiment (example in which a light-scattering body is further attached to an optical film)
4. Fourth Embodiment (example in which a self-washing effect layer is further installed on an optical film)
5. Fifth Embodiment (example in which an optical film is applied to a blind device)
6. Sixth Embodiment (example in which an optical film is applied to a roll screen device)
7. Seventh Embodiment (example in which an optical film is applied to fittings)

<1. First Embodiment>
[Structure of Optical Film]

Figure 1A:
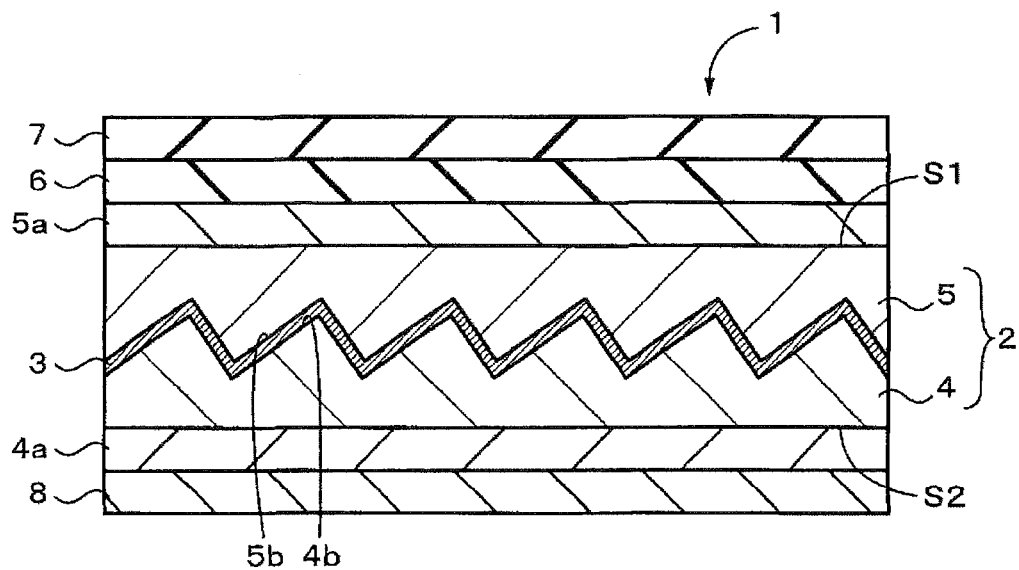
FIG. 1A is a cross-sectional view showing one structural example of an optical film in accordance with a first embodiment of the present invention.
Figure 1B:
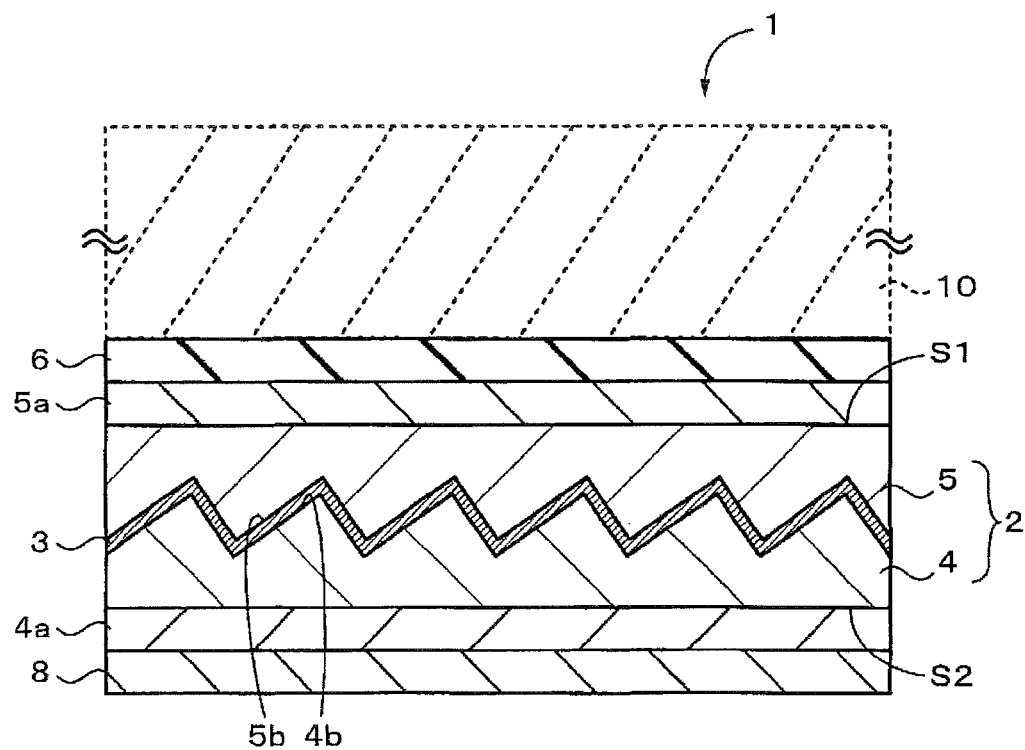
FIG. 1B is a cross-sectional view showing an example in which the optical film in accordance with the first embodiment of the present invention is bonded to an adherent member.

FIG. 1A is a cross-sectional view showing one structural example of an optical film in accordance with a first embodiment of the present invention. FIG. 1B is a cross-sectional view showing an example in which the optical film in accordance with the first embodiment of the present invention is bonded to an adherent member. The optical film 1 serving as an optical element is an optical film having a so-called directional reflection performance. As shown in FIG. 1A, the optical film 1 is provided with an optical layer 2 having an interface with a concavo-convex shape inside thereof, and a wavelength-selective reflection layer 3 formed on the interface of the optical layer 2. The optical layer 2 is provided with a first optical layer 4 with a first surface having a concavo-convex shape and a second optical layer 5 with a second surface having a concave-convex shape. The interface inside the optical layer is formed by the first surface and the second surface that have concavo-convex shapes and are disposed so as to be made face to face with each other. More specifically, the optical film 1 is provided with the first optical layer 4 having a concavo-convex surface 4b, the wavelength-selective reflection layer 3 foamed on the concavo-convex surface 4b of the first optical layer 4 and the second optical layer 5 formed on the wavelength-selective reflection layer 3 in a manner so as to bury the concavo-convex surface 4b on which the wavelength-selective reflection layer 3 has been formed. The optical film 1 is provided with a light-incident surface S1 on which light rays, such as solar light, are made incident, and a light-releasing surface S2 from which light rays of the incident light rays made incident on the incident surface S1, which have been transmitted through the optical film 1, are released. The optical film 1 is desirably applied to inner wall members, outer wall members, window materials, wall members, and the like. Moreover, the optical film 1 is also desirably applied to a slat (solar shading member) of a blind device and a screen (solar shading member) of a roll screen device. Furthermore, the optical film 1 is desirably applied as an optical element to be used for a lighting unit of fittings (interior member or exterior member), such as a shoji screen or the like.

The optical film 1 may be further provided with a first substrate 4a attached to the light-releasing surface S2 of the optical layer 2, if necessary. Moreover, the optical film 1 may be further provided with a second substrate 5a attached to the light-incident surface S1 of the optical layer 2, if necessary. Additionally, in the case when the first substrate 4a and/or the second substrate 5a are attached to the optical film 1, optical characteristics, such as transparency and color transmittance, shown below, are desirably satisfied, with the first substrate 4a and/or the second substrate 5a being attached to the optical film 1

The optical film 1 may be further provided with a bonding layer 6, if necessary. Of the light-incident surface S1 and the light-releasing surface S2 of the optical film 1, this bonding layer 6 is formed on the surface that is bonded to a window material 10. With this bonding layer 6 interposed therebetween, the optical film 1 is bonded to the indoor side or the outdoor side of the window material 10 serving as an adherent member. As the bonding layer 6, for example, an adhesive layer mainly composed of an adhesive (for example, a UV-setting resin, or a two-liquid mixing type resin), or a sticker layer mainly composed of a sticker (for example, Pressure Sensitive Adhesive (PSA)) may be used. In the case when the bonding layer 6 is a sticker layer, a separation layer 7 formed on the bonding layer 6 is further desirably provided thereon. With this structure, the optical film 1 is easily bonded onto the adherent member, such as the window material 10, with the bonding layer 6 interposed therebetween, by simply separating the separation layer 7.

From the viewpoint of improving the joining property of the second substrate 5a and the bonding layer 6 and/or the second optical layer 5, the optical film 1 may be further provided with a primer layer (not shown) between the second substrate 5a and the bonding layer 6 and/or the second optical layer 5. Moreover, from the viewpoint of improving the joining property of the same portion, in place of the primer layer, or together with the primer layer, a known physical preliminarily treatment is preferably carried out thereon. As the known physical preliminarily treatment, for example, a plasma process, a corona process, or the like is proposed.

The optical film 1 may be further provided with a barrier layer (not shown) on the light-incident surface S1 or the light-releasing surface S2, or between each of the surfaces and the wavelength-selective reflection layer 3, to which the adherent member such as the window material 10 or the like is bonded. By installing the barrier layer in this manner, moisture dispersion from the light-incident surface S1 or the light-releasing surface S2 to the wavelength-selective reflection layer 3 is reduced, so that degradation of metal or the like contained in the wavelength-selective reflection layer 3 can be suppressed. Therefore, the durability of the optical film 1 can be improved.

From the viewpoint of providing a scratch resistance or the like to its surface, the optical film 1 may be further provided with a hard coat layer 8. The hard coat layer 8 is preferably formed on a face of the light-incident surface S1 and the light-releasing surface S2 on the opposite side to the face to be bonded to an adherent member such as the window material 10 or the like. From the viewpoint of providing an antifouling property or the like to the light-incident surface S1 or the light-releasing surface S2 of the optical film 1, a layer having a water-repellent property or a hydrophilic property may be further formed thereon. The layer having these functions may be directly formed, for example, on the optical layer 2, or may be formed on a functional layer of various kinds, such as the hard coat layer 8.

From the viewpoint of easily bonding the optical film 1 onto an adherent member such as the window material 10 or the like, the optical film 1 is preferably designed to have flexibility. In this case, the films may include sheets. That is, the optical film 1 is supposed to include an optical sheet.

The optical film 1 is preferably provided with transparency. The transparency is preferably set within a range of degree of transmission image clearness, which will be described below. The difference of refractive indexes between the first optical layer 4 and the second optical layer 5 is preferably set to 0.010 or less, more preferably, to 0.008 or less, most preferably, to 0.005 or less. When the difference in refractive indexes exceeds 0.010, the transmission image tends to become a blurred image. In the case when it is in a range from 0.008 to 0.010 or less, no problems are raised for use in daily life although it also depends on external brightness. In the case when it is in a range from 0.005 to 0.008 or less, although a diffraction pattern tends to cause an adverse effect only when a very bright object, such as a light source, is viewed, outside scenes can be clearly viewed. In the case when it is 0.005 or less, the diffraction pattern no longer causes any adverse effect. Of the first optical layer 4 and the second optical layer 5, the optical layer forming the side which is bonded to the window material 10 or the like may be mainly composed of a sticker. By using this structure, the optical film 1 can be bonded to the window material 10 or the like by the first optical layer 4 or the second optical layer 5 mainly composed of the sticker. Additionally, in the case when this structure is used, the difference in the refractive indexes of the stickers is preferably set within the above-mentioned range.

The first optical layer 4 and the second optical layer 5 are preferably designed to have the same optical properties such as the refractive index or the like. More specifically, the first optical layer 4 and the second optical layer 5 are preferably made of the same material, for example, the same resin material, having transparency within a visible region. In the case when the first optical layer 4 and the second optical layer 5 are formed by using the same material, since the two layers have the same refractive index, it becomes possible to improve the transparency of visible light rays. However, even in the case of using the same material as the starting sources, the refractive indexes of the finally generated layers sometimes differ from each other due to the curing condition or the like in the film-forming process; therefore, this point needs to be taken into consideration. In contrast, in the case when the first optical layer 4 and the second optical layer 5 are made of different materials, since the refractive indexes of the two members are different from each other, light is refracted, with the wavelength-selective reflection layer 3 serving as the border, with the result that a blurred transmission image tends to be generated. In particular, when an object that is close to a point light source, such as a distant light bulb or the like, is observed, a diffraction pattern tends to be remarkably observed. Additionally, in order to adjust the value of a refractive index, an additive agent may be mixed in the first optical layer 4 and/or the second optical layer 5.

The first optical layer 4 and the second optical layer 5 are preferably designed to have transparency in a visible region. In this case, the definition of transparency has two kinds of meanings, that is, no light absorption is caused and no light scattering occurs. In the case when transparency is generally mentioned, it sometimes indicates only the former; however, the optical film 1 relating to the first embodiment is preferably provided with both of the properties. In case of the currently utilized retroreflection members, such as traffic signs and clothes for night-time workers, since their purposes are to visually recognize their reflected light display, even when they have, for example, a light scattering property, their reflected light can be visually recognized as long as they are tightly made in contact with a base reflective member. This is based upon the same principle as that even when an antiglare treatment having a scattering property is carried out on the front surface of an image display device so as to give an antiglare property thereto, its image can be visually recognized. However, since the optical film 1 relating to the first embodiment is characterized by the fact that it can transmit light rays other than light having a specific wavelength that is directionally reflected, and since it is bonded to a transmission member that mainly transmits this transmission wavelength so as to observe its transmitted light, it preferably has no scattering property. However, depending on its applications, the second optical layer 5 may be intentionally allowed to have a scattering property.

The optical film 1 is bonded to a rigid member that mainly has a transmitting property relative to transmitted light rays other than the light having a specific wavelength, that is, for example, the window material 10, with a sticker or the like interposed therebetween, and is utilized. As the window material 10, examples thereof include: window materials for use in buildings, such as high-rise buildings and houses, and window materials for use in vehicles. In the case when the optical film 1 is used for the window material for use in buildings, the optical film 1 is desirably applied to the window material 10 that is disposed in any of directions facing the east, south or west directions (for example, a south-east or south-west direction). By applying the optical film 1 to the window material 10 disposed at such a position, it becomes possible to more effectively reflect heat rays. The optical film 1 may be applied not only to a window glass of a single layer, but also to a special glass such as a multi-layered glass. Moreover, the window material 10 is not limited by those made of glass, and those made of a polymeric material having transparency may be used. The optical layer 2 preferably has transparency in a visible light region. By allowing it to have transparency in this manner, when the optical film 1 is bonded to the window material 10 such as window glass, visible light rays can be transmitted to properly ensure lighting by solar light. Moreover, with respect to the bonding surface, not only the inner surface of glass, but also the outer surface may be used.

Furthermore, the optical film 1 may be used in combination with another heat ray-cutting film, and for example, a light-absorption coat film may be formed on an interface (that is, the outermost surface of the optical film 1), for example, between air and the optical film 1. The optical film 1 may be used in combination with another layer, such as a hard coat layer, an ultraviolet-ray cutting layer, a surface reflection preventive layer, or the like. In the case when these functional layers are used in combination, these functional layers are preferably formed on an interface between the optical film 1 and air. However, with respect to the ultraviolet-ray cutting layer, since this layer needs to be disposed on the sun side from the optical film 1, the ultraviolet-ray cutting layer is preferably placed between the window glass surface and the optical film 1, in particular, upon application of this for inside bonding use of an indoor window glass surface. In this case, an ultraviolet-ray absorbing agent may be added to a bonding layer between the window glass surface and the optical film 1.

Moreover, depending on the application of the optical film 1, a coloring process may be carried out on the optical film 1 so that a designing property may be given thereto. In the case when the designing property is applied in this manner, at least one of the first optical layer 4 and the second optical layer 5 is desirably designed so as to mainly absorb light having a specific wavelength band in a visible light region, within a range not impairing the transparency.

Figure 2:
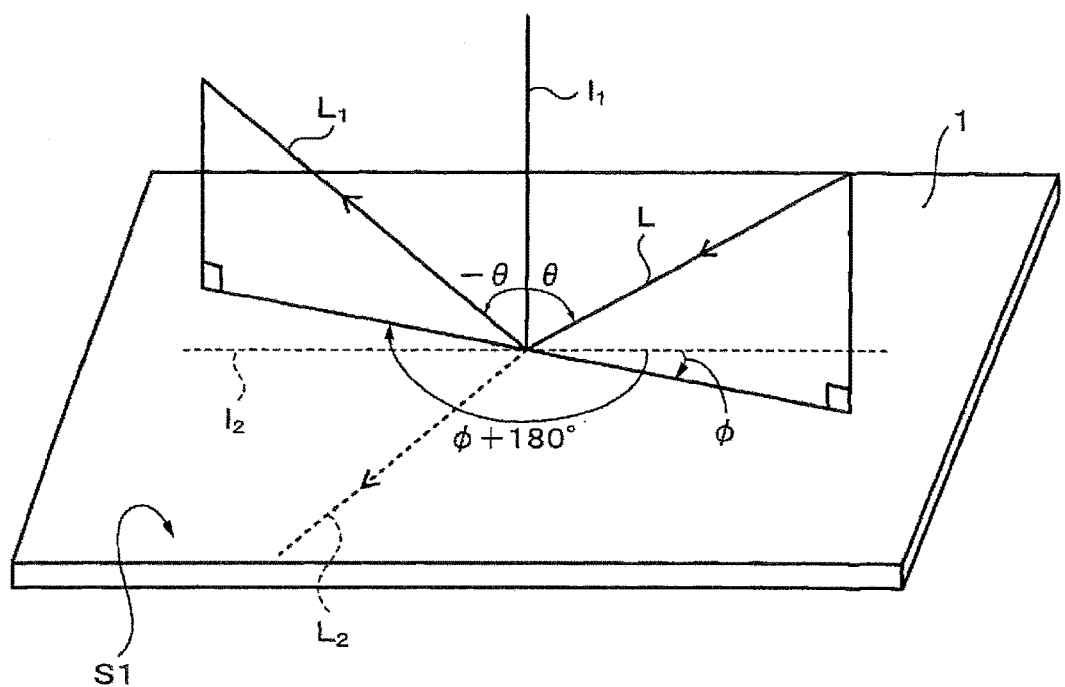
FIG. 2 is a perspective view showing a relationship between an incident light ray that is made incident on the optical film and a reflected light ray reflected by the optical film.

FIG. 2 is a perspective view showing a relationship between an incident light ray that is made incident on the optical film 1 and a reflected light ray reflected by the optical film 1. The optical film 1 has an incident-surface S1 on which light ray L is made incident. Of light rays L made incident on the incident-surface S1 with an incident angle ($\theta$, $\varphi$), the optical film 1 directionally reflects a light ray $L_1$ having a specific wavelength band selectively in a direction other than a regular reflection ($-\theta$, $\varphi+180°$) direction, while it preferably transmits a light ray $L_2$ with a wavelength band other than the specific wavelength band. Moreover, the optical film 1 exerts transparency on light rays having a wavelength band other than the specific wavelength band, and with respect to the transparency, it is desirably set within a range of degree of transmission image clearness, which will be described later. In this case, $\theta$: an angle made by a perpendicular line $l_1$ relative to the incident-surface S1 and the incident light ray L or the reflected light ray $L_1$. $\varphi$: an angle made by a specific straight line $l_2$ within the incident surface S1 and a component formed by projecting the incident light ray L or the reflected light ray $L_1$ onto the incident surface S1. In this case, the specific straight line $l_2$ within the incident surface refers to an axis that makes the reflection intensity in a $\varphi$ direction highest, when the optical film 1 is rotated with the perpendicular line $l_1$ relative to the incident surface S1 of the optical film 1 serving as an axis, while the incident angle ($\theta$, $\varphi$) is fixed (see FIG. 5). However, in the case when there are a plurality of axes (directions) that make the reflection intensity the highest, it is supposed that one of these is selected as the straight line $l_2$. Additionally, suppose that an angle $\theta$ obtained by rotating clockwise based upon the perpendicular line $l_1$ is defined as "$+\theta$", and that an angle $\theta$ obtained by rotating counter-clockwise based thereupon is defined as "$-\theta$". Suppose that an angle $\varphi$ obtained by rotating clockwise based upon the straight line $l_2$ is defined as "+φ", and that an angle φ obtained by rotating counter-clockwise based thereupon is defined as "−φ".

The light ray having a specific wavelength band that is directionally reflected selectively and the specific light ray that is allowed to transmit are different depending on the application of the optical film 1. For example, in the case when the optical film 1 is applied to the window material 10, the light ray having a specific wavelength band that is directionally reflected selectively is preferably a near infrared light ray, and the specific light ray that is allowed to transmit is preferably a visible light ray. More specifically, the light ray having a specific wavelength band that is directionally reflected selectively is preferably a near infrared light ray mainly having a wavelength range from 780 nm to 2100 nm. By reflecting the near infrared light ray, the optical element is allowed to suppress a temperature rise inside a building when it is bonded to the window material such as a glass window. Therefore, the cooling load can be lowered so as to save energy. In this case, the directional reflection refers to a reflection in a certain specific direction other than a regular reflection, and indicates that it is sufficiently strong in comparison with a diffusion reflection intensity having no directivity. In this case, with respect to the reflection, a reflectance in a specific wavelength range, for example, in a near infrared light region, is preferably set to 30% or more, more preferably, to 50% or more, and most preferably, to 80% or more. With respect to the transmission, a transmittance in a specific wavelength range, for example, in a visible light region, is preferably set to 30% or more, more preferably, to 50% or more, and most preferably, to 70% or more.

In the optical film 1, a direction φo in which the reflection is directionally made is preferably set to −90° or more to 90° or less. This is because in the case when the optical film 1 is bonded to the window material 10, of light rays made incident thereon from the sky, the light ray having the specific wavelength band can be returned in the upward sky direction. In the case when there are no high-rise buildings on the periphery, the optical film 1 in this range is effectively used. Moreover, the direction in which the reflection is directionally made is preferably set in the vicinity of (θ, −φ). The vicinity means a deviation preferably set within 5 degrees from (θ, −φ), more preferably, within 3 degrees therefrom, and most preferably, within 2 degrees therefrom. This is because in the case when the optical film 1 is bonded to the window material 10, by setting this range, of light rays made incident thereon from the sky above buildings having about the same height that stand side by side, the light ray having the specific wavelength band can be effectively returned to the sky above the other buildings. In order to achieve the directional reflection of this type, by one-dimensionally arranging pillar-shaped elements that are extended in one direction, the concavo-convex surface 4b of the first optical layer 4 or the concavo-convex surface 5b of the second optical layer 5 is preferably formed. A light ray made incident in the (θ, φ) direction (−90°<φ<90° can be reflected in the (θo, −φ) direction (0°<θo<90°) based upon the inclination of the pillar-shaped elements.

In the optical film 1, with respect to the degree of transmission image clearness relative to a wavelength band having a transmitting property, the value at the time of using an optical comb of 0.5 mm is preferably set to 50 or more, more preferably, to 60 or more, and most preferably, to 75 or more. In the case when the value of the degree of transmission image clearness is less than 50, the transmission image tends to become a blurred image. In the case when it is from 50 or more to less than 60, no problems are raised for use in daily life, although it also depends on external brightness. In the case when it is from 60 or more to less than 75, although a diffraction pattern tends to cause an adverse effect only when a very bright object, such as a light source, is viewed, outside scenes can be clearly viewed. In the case when it is 75 or more, the diffraction pattern no longer causes any adverse effect. Moreover, the total value of the values of the degree of transmission image clearness obtained by measurements by the use of optical combs of 0.125 mm, 0.5 mm, 1.0 mm and 2.0 mm is preferably set to 230 or more, more preferably, to 270 or more, and most preferably, to 350 or more. In the case when the total value of the degrees of transmission image clearness is less than 230, the transmission image tends to become a blurred image. In the case when it is from 230 or more to less than 270, no problems are raised for use in daily life, although it also depends on external brightness. In the case when it is from 270 or more to less than 350, although a diffraction pattern tends to cause an adverse effect only when a very bright object, such as a light source, is viewed, outside scenes can be clearly viewed. In the case when it is 350 or more, the diffraction pattern no longer causes any adverse effect. In this case, the value of the degree of transmission image clearness is measured by using an ICM-1T made by Suga Test Instruments in accordance with JIS K7105. However, in the case when the wavelength to be desirably transmitted is different from a D65 light source wavelength, measurements are preferably carried out after a calibration process has been carried out by using a filter for the wavelength to be desirably transmitted.

In the optical film 1, haze relative to the wavelength band having a transmitting property is preferably set to 6% or less, more preferably, to 4% or less, and most preferably, to 2% or less. When the haze exceeds 6%, the transmission light is diffused to cause a foggy view. In this case, the haze is measured by using an HM-150 made by Murakami Color Research Laboratory by using a measuring method defined by JIS K7136. However, in the case when the wavelength to be desirably transmitted is different from a D65 light source wavelength, measurements are preferably carried out after a calibration process has been carried out by using a filter for the wavelength to be desirably transmitted. The incident surface S1 of the optical film 1, preferably, the incident surface S1 and the light-releasing surface S2, have such a degree of smoothness as not to lower the degree of transmission image clearness. More specifically, the arithmetic mean roughness Ra of the incident surface S1 and the light-releasing surface S2 is preferably set to 0.08 μm or less, more preferably, 0.06 μm or less, and most preferably, to 0.04 μm or less. Additionally, the above-mentioned arithmetic mean roughness Ra is calculated as a roughness parameter through processes in which the surface roughness of the incident surface is measured, and a roughness curve is obtained from a two-dimensional cross-sectional curve. Moreover, the measuring conditions are based upon JIS B0601: 2001. The measuring device and the measuring conditions are shown below.

Measuring device: fully automatic micro-shape measuring device, Surfcorder ET4000A (made by Kosaka Research Institute, Inc.)
    λc=0.8 mm, Evaluation length 4 mm, cut-off×5
    Data sampling interval: 0.5 μm The transmission color of the optical film 1 is preferably made as close to neutral color as possible, and even when colored, a faint color tone, such as blue, bluish green, green or the like, which gives a cool impression, is preferably used. From the viewpoint of obtaining such a color tone, chromaticity coordinates x, y of a transmission light ray and a reflected light ray released from the light-releasing surface S2 derived from an incident light ray on the incident surface S1 that is transmitted through the optical layer 2 and the wavelength-selective reflection layer 3 are preferably set in a range of $0.20<x<0.35$ and $0.20<y<0.40$, more preferably in a range of $0.25<x<0.32$ and $0.25<y<0.37$, and most preferably in a range of $0.30<x<0.32$ and $0.30<y<0.35$, relative to irradiation from, for example, a D65 light source. Moreover, in order to prevent the color tone from becoming reddish, the relationship of $y>x-0.02$ is preferably satisfied, and more preferably, the relationship of $y>x$ is satisfied. Moreover, in the case when a reflection color tone is varied depending on the incident angle, for example, in the case of the application as the window of a building, since the color tone becomes different depending on places or since the color looks differently when viewed while walking, these states are not desirable. From the viewpoint of suppressing these changes in color tone, the absolute value of a difference in the color coordinate x and the absolute value of a difference in the color coordinate y of an incident light ray that is made incident on the incident surface S1 or the light-releasing surface S2 at an incident angle θ in a range from 5° or more to 60° or less and that of a regular reflected light ray from the optical film 1 is preferably set to 0.05 or less, more preferably, to 0.03 or less, and most preferably, to 0.01 or less, in each of the two main surfaces of the optical film 1. These limitations in the numeric value range relative to the color coordinates x and y given to the reflected light ray are preferably satisfied on both of the surfaces of the incident surface S1 and the light-releasing surface S2.

In order to suppress a color change in the vicinity of regular reflection, it is preferable to prevent a plane having an inclination of, preferably, 5° or less, more preferably, 10° or less, from being included. Moreover, in the case when the wavelength-selective reflection layer 3 is covered with a resin, since an incident light ray is refracted when made incident from air onto the resin, it is possible to suppress a color tone change in the vicinity of regular reflected light within a wider incident angle range. In addition, in the case when reflection color toward other than the regular reflection causes problems, the optical film 1 is desirably disposed so as not to be directionally reflected toward the direction to cause problems.

The following description will successively discuss the first optical layer 4, the second optical layer 5 and the wavelength-selective reflection layer 3 constituting the optical film 1

(First Optical Layer, Second Optical Layer)

The first optical layer 4 is, for example, used for supporting and also protecting the wavelength-selective reflection layer 3. From the viewpoint of imparting flexibility to the optical film 1, the first optical layer 4 is, for example, made of a layer mainly composed of a resin. Of the two main surfaces of the first optical layer 4, for example, one of the surfaces is a smoothed surface and the other surface is a concavo-convex surface 4b. The wavelength-selective reflection layer 3 is formed on the concavo-convex surface 4b.

The second optical layer 5 is, for example, allowed to enclose and bury the concavo-convex surface 4b of the first optical layer 4 on which the wavelength-selective reflection layer 3 is formed so that it is used for protecting the wavelength-selective reflection layer 3. From the viewpoint of imparting flexibility to the optical film 1, the second optical layer 5 is made of, for example, a layer mainly composed of a resin. Of the two main surfaces of the second optical layer 5, for example, one of the surfaces is a smoothed surface and the other surface is a concavo-convex surface 5b. The concavo-convex surface 4b of the first optical layer 4 and the concavo-convex surface 5b of the second optical layer 5 have such a relationship that their mutual concavo-convex shapes are inverted to each other. Therefore, in the following description, explanations will be given to the concavo-convex surface 4b of the first optical layer 4.

Figure 3:
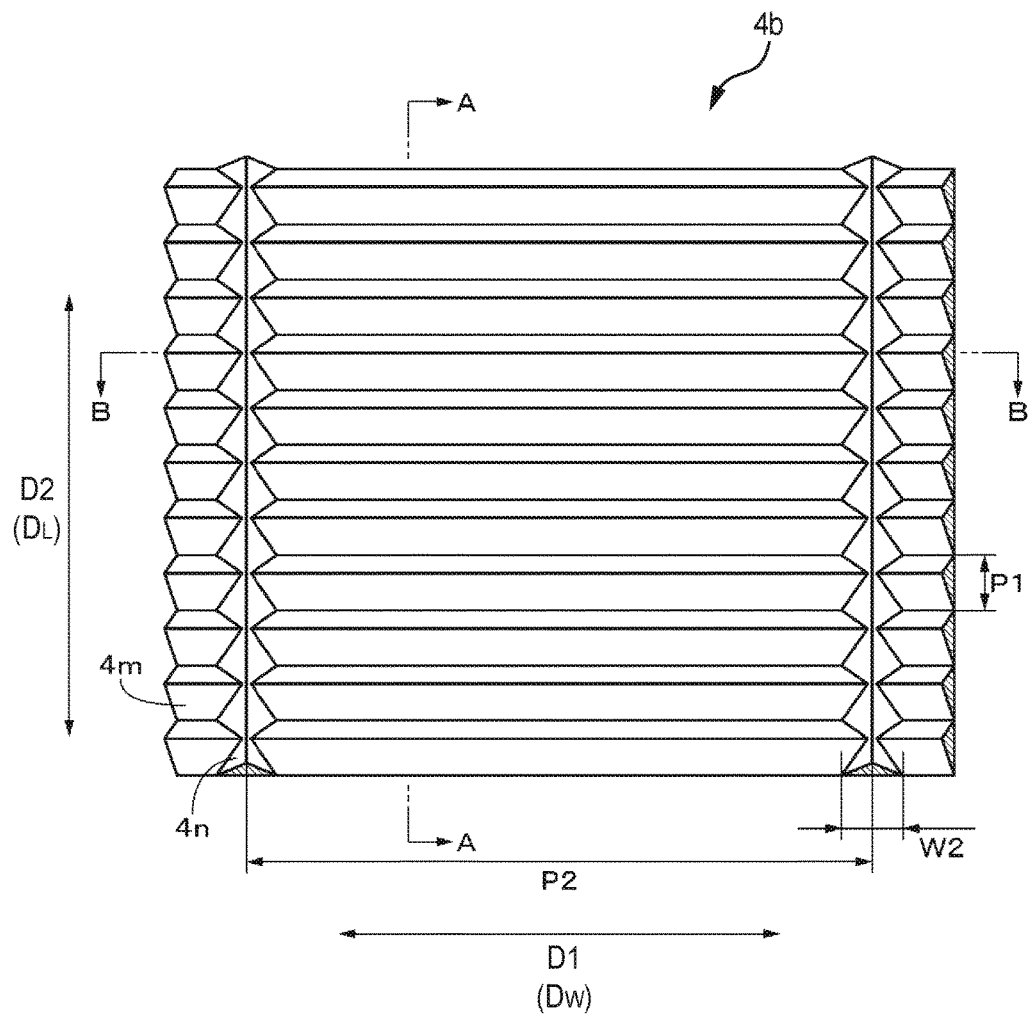
FIG. 3 is a plan view showing a shape example of a concavo-convex surface of a first optical layer of the optical film in accordance with the first embodiment.
Figure 4A:
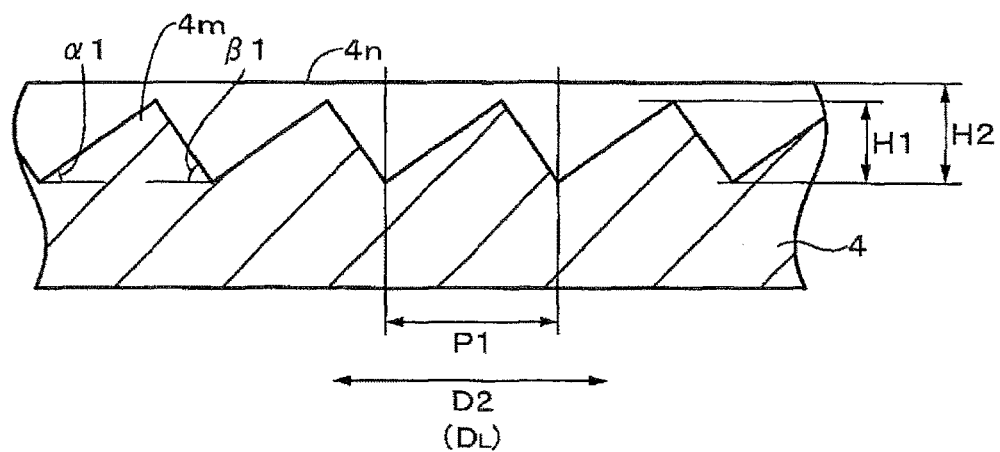
FIG. 4A is a cross-sectional view showing one shape example of the concavo-convex surface of the first optical layer in a second direction.
Figure 4B:
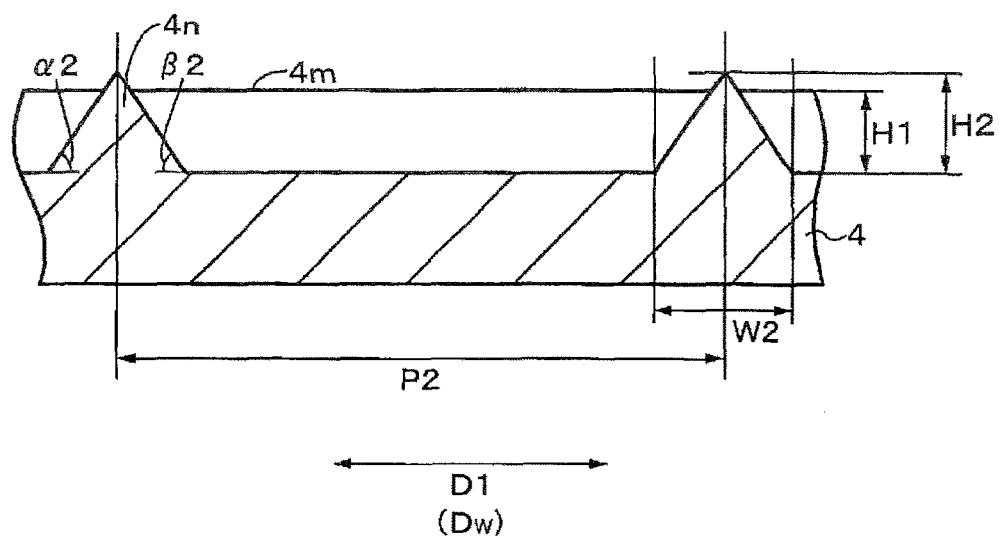
FIG. 4B is a cross-sectional view showing one shape example of the concavo-convex surface of the first optical film in a first direction.

FIG. 3 is a plan view showing one shape example of the concavo-convex surface of the first optical layer of the optical film in accordance with the first embodiment. FIG. 4A is a cross-sectional view showing one shape example of the concavo-convex surface of the first optical layer in a second direction. FIG. 4B is a cross-sectional view showing one shape example of the concavo-convex surface of the first optical layer in a first direction. In the first embodiment, two directions that orthogonally intersect with each other within the concavo-convex surface of the first optical layer 4 are referred to as a first direction D1 and a second direction D2. In the case when the first optical layer 4 has a rectangular shape having two pairs of sides that are made face to face with each other, the first direction D1 preferably corresponds to an extending direction of the sides of one of the two pairs of sides, and the second direction D2 preferably corresponds to an extending direction of the sides of the other of the two pairs of sides. In the case when the first optical layer 4 has a belt-like or rectangular shape with a width direction $D_W$ and a longitudinal direction $D_L$, the first direction D1 preferably corresponds to the width direction $D_W$ of the first optical layer 4 and the second direction D2 preferably corresponds to the longitudinal direction $D_L$ of the first optical layer 4.

The concavo-convex surface 4b of the first optical layer 4 is constituted by, for example, a plurality of first structural elements 4m and a plurality of second structural elements 4n. The first structural elements 4m are structural elements that extend in the first direction D1 within the concavo-convex surface of the first optical layer 4, and are one-dimensionally arranged so as to be adjacent to one another in the second direction D2 of the first optical layer 4. On the other hand, the second structural elements 4n are structural elements that extend in the second direction D2 within the concavo-convex surface of the first optical layer 4, and are one-dimensionally arranged so as to be spaced apart from one another in the first direction D1 of the first optical layer 4. That is, the first structural elements 4m and the second structural elements 4n have such a relationship that they orthogonally intersect with each other within the concavo-convex surface of the first optical layer 4. Additionally, the relationship between the first structural elements 4m and the second structural elements 4n is not intended to be limited by this, and may have a relationship in which the two elements are made to virtually orthogonally intersect with each other.

In the case when the first optical layer 4 has a belt-like or rectangular shape with the width direction $D_W$ and the longitudinal direction $D_L$, the first structural elements 4m and the second structural elements 4n are preferably designed to have the following structures. That is, the first structural elements 4m are structural elements that extend in the width direction $D_W$ of the first optical layer 4, and are one-dimensionally arranged so as to be adjacent to one another in the longitudinal direction $D_L$ of the first optical layer 4. On the other hand, the second structural elements 4n are structural elements that extend in the longitudinal direction $D_L$ of the first optical layer 4, and are one-dimensionally arranged so as to be spaced apart from one another in the width direction $D_W$ of the first optical layer 4. That is, on the surface of the first optical layer 4, the first structural elements 4m and the second structural elements 4n have such a relationship that they orthogonally intersect with each other.

As the first structural elements 4m, pillar-shaped elements or elements having an inverted shape thereof are preferably used. As the shape of the pillar-shaped elements, for example, a polygonal pillar shape, such as a prism shape (triangular pillar shape), a prism shape with ridge lines formed into an R shape, a lenticular shape, a toroidal shape, a hyperbolic pillar shape and a free curved face shape may be used, and two kinds or more of these shapes may be used in combination. In this case, the lenticular shape refers to any one of shapes in which its cross-sectional shape perpendicular to the ridge line portion of each pillar-shaped element is formed into an arch shape or a virtually arch shape, an elliptical arch shape or a virtually elliptical arch shape, or a parabolic shape or a virtually one portion of a parabolic shape. Therefore, a cylindrical shape is also included in the lenticular shape.

As the shape of the ridge line portion (apex portion) of the first structural elements 4m, for example, a right-angle shape, an R-shape, a polygonal shape (for example, pentagonal shape) or the like is proposed, and the R-shape is in particular preferable. By forming the ridge line portion of each of the structural elements 4m into the R-shape, it becomes possible to prevent the first structural elements 4m from being deformed in the shape due to a tightly wound film in the case when the optical film 1 is manufactured by using a roll-to-roll process. In this case, the shape of the ridge line portion (apex portion) of the first structural elements 4m refers to a cross-sectional shape of the ridge line portion in a direction perpendicular to the ridge line. More specifically, for example, in the first structural elements 4m, it refers to a cross-sectional shape of the ridge line portion in the longitudinal direction $D_L$.

In the case when the ridge line portion of the first structural element 4m has the R-shape, the ratio R/P of the curvature radius R relative to the pitch P of the first structural elements 4m is preferably set to 7% or less, more preferably, to 5% or less, and most preferably, to 3% or less.

In the optical film 1, the pitch P1 of the first structural elements 4m is preferably set to 5 µm or more to 5 mm or less, more preferably, to 5 µm or more to less than 250 µm, and most preferably, to 20 µm or more to 200 µm or less. In the case when the pitch P1 of the structural elements 4m is less than 5 µm, since it becomes difficult to form the shape of the structural elements 4m into a desired shape, and since it is generally difficult to make the wavelength selection characteristic of the wavelength-selective reflection layer 3 abruptly changed, one portion of the transmission wavelength tends to be reflected. In the case when such a reflection occurs, a diffraction is generated so that a reflection up to a high-order reflection is visually recognized, with the result that the transparency tends to be felt worse. On the other hand, in the case when the pitch P1 of the first structural elements 4m exceeds 5 mm, if the shape of the structural elements 4m required for directional reflection is considered, the required film thickness becomes too thick, with the result that the flexibility is lost, thereby making it difficult to be bonded to a rigid member such as the window material 10 or the like. Moreover, by setting the pitch P1 of the structural elements 4m to less than 250 µm, the flexibility is further increased so that a manufacturing process in roll-to-roll operations is easily carried out, with the necessity of a batch production being eliminated. In order to apply the optical film 1 of the present invention to fittings, such as a window or the like, a length of about several ms is required so that the roll-to-roll manufacturing operations rather than the batch production are suitable. Moreover, when the pitch 1 is set to 20 µm or more to 200 µm or less, the productivity is further improved.

Moreover, the shape of the first structural elements 4m to be formed on the surface of the first optical layer 4 is not limited to one kind, and the first structural elements 4m having shapes of a plurality of kinds may be formed on the first optical layer 4. In the case when the structural elements 4m having shapes of a plurality of kinds are formed on the surface, a predetermined pattern composed of the shapes of the plural kinds of the first structural elements 4m may be periodically repeated. Moreover, depending on a desired characteristic, the first structural elements 4m of the plural kinds may be formed at random (non-periodically).

Figure 5A:
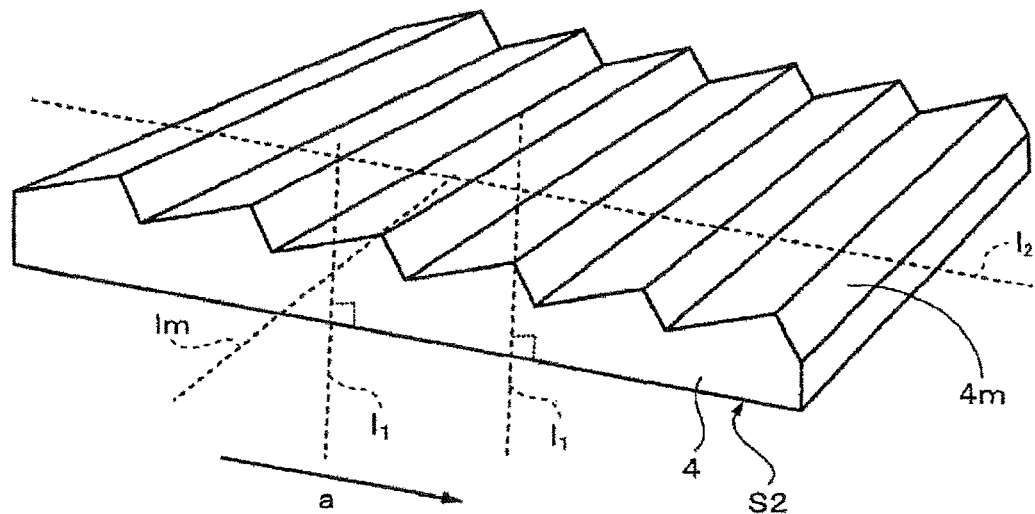
FIG. 5A is a perspective view showing one shape example of a first structural element formed on the first optical layer.
Figure 5B:
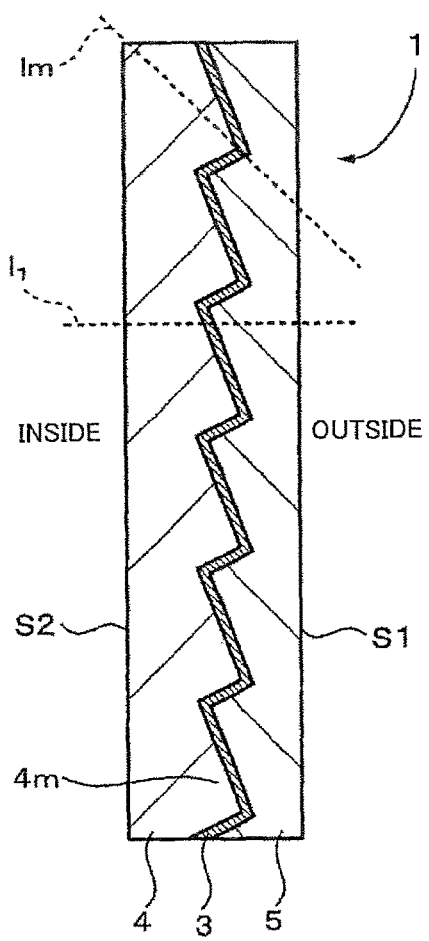
FIG. 5B is a cross-sectional view showing one structural example of an optical film provided with the first optical layer on which the first structural element shown in FIG. 5A is formed.

FIG. 5A is a perspective view showing one shape example of first structural elements. FIG. 5B is a cross-sectional view showing one structural example of an optical film provided with the first structural elements having a shape shown in FIG. 5A. As shown in FIGS. 5A and 5B, asymmetric pillar-shaped elements that extend in one direction are preferably used as the first structural elements 4m. By using this shape, incident light rays can be returned upward to the sky after a reflection of one time or reflections of two times. Therefore, in comparison with a corner cubic shape that returns incident light rays upward to the sky after reflections of three times, the amount of light absorption of the wavelength-selective reflection layer 3 is reduced so that heat generation can be suppressed.

Moreover, as shown in FIG. 5A, the shape of the first structural elements 4m may be formed into an asymmetric shape relative to a perpendicular line $l_1$ that is perpendicular to the incident surface S1 or the light-releasing surface S2 of the optical film 1. In this case, the main axis $l_m$ of the first structural elements 4m is tilted toward the arrangement direction a (that is, a longitudinal direction $D_L$) of the first structural elements 4m based upon the perpendicular line $l_1$. Here, the main axis $l_m$ of the first structural elements 4m refers to a straight line that passes through the middle point of the bottom side and the apex of each of the first structural elements 4m on the cross section of each of the first structural elements. For example, in the case when the first structural elements 4m are triangular pillar-shaped elements, the main axis $l_m$ of the triangular pillar-shaped elements refers to a straight line that passes through the middle point of the bottom side and the apex of each of the triangular pillar-shaped elements on the cross section of each of the triangular pillar-shaped elements. In the case when the optical film 1 is bonded to the window material 10 disposed virtually perpendicularly to the ground, the main axis $l_m$ of the first structural elements 4m is tilted toward the upward side (sky side) or toward the downward side (ground side) of the window material 10 based upon the perpendicular line $l_1$. FIG. 5B shows an example in which the main axis $l_m$ of the first structural elements 4m is tilted downward (ground side) of the window material 10 based upon the perpendicular line $l_1$.

Figure 6A:
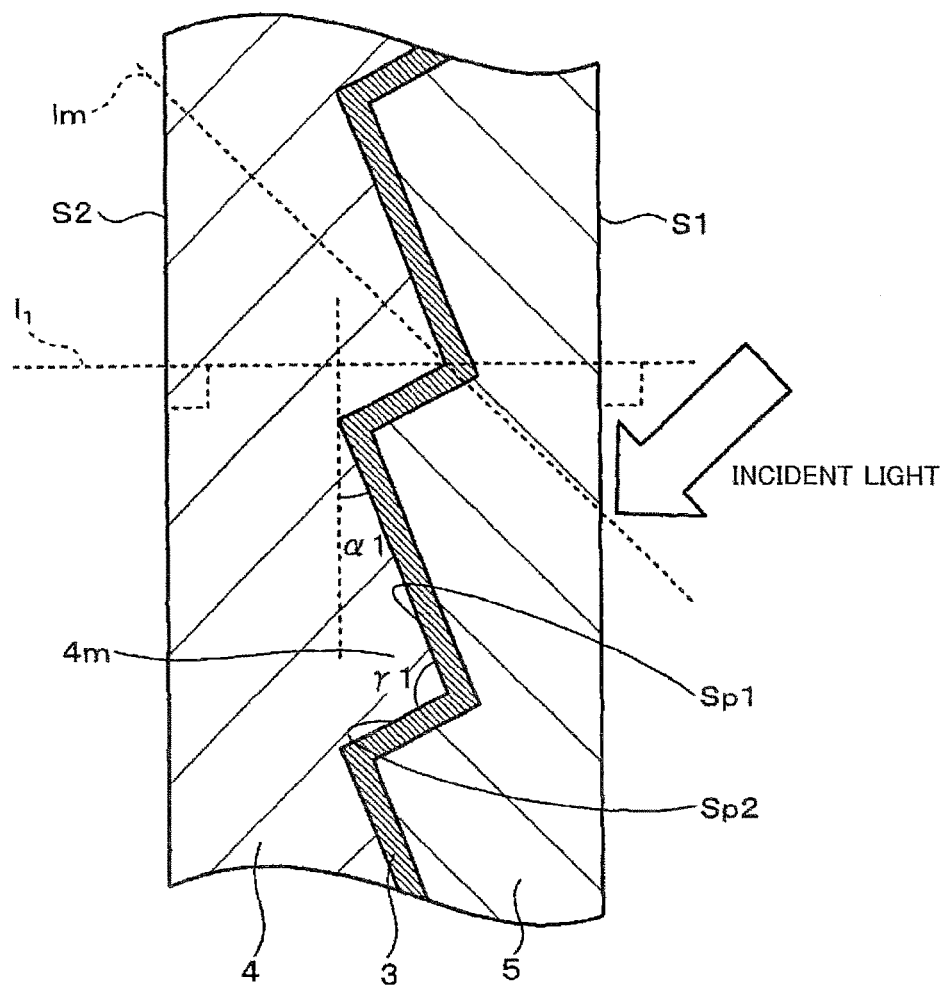
FIG. 6A is an enlarged cross-sectional view showing one portion of the optical film shown in FIG. 5B.
Figure 6B:
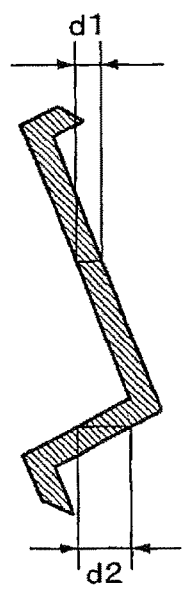
FIG. 6B is an enlarged cross-sectional view showing a wavelength-selective reflection layer shown in FIG. 5B in an enlarged manner.

FIG. 6A is an enlarged cross-sectional view showing one portion of the optical film shown in FIG. 5B in an enlarged manner. FIG. 6B is an enlarged cross-sectional view showing the wavelength-selective reflection layer shown in FIG. 5B in an enlarged manner. Each of the first structural elements 4m is provided with, for example, a first inclined surface Sp1 and a second inclined surface Sp2 forming pillar-shaped surfaces serving as film-forming surfaces on which the wavelength-selective reflection layer 3 is formed. The first inclined surface Sp1 corresponds to a surface forming an upper side (upper side toward the sky) when the optical film 1 is bonded to an adherent member such as the window material 10, and the second inclined surface Sp2 corresponds to a surface forming a lower side (ground side) when the optical film 1 is bonded to an adherent member such as the window material 10. In the following description, the film thicknesses of the wavelength-selective reflection layers 3 formed on the first inclined surface Sp1 and the second inclined surface Sp2 are respectively referred to as a first film thickness d1 and a second film thickness d2 of the wavelength-selective reflection layers 3.

Each of the first structural elements 4m has, for example, an apex angle $\gamma 1$ made by the first inclined surface Sp1 and the second inclined surface Sp2, and an inclination $\alpha 1$ of the first inclined surface Sp1 relative to the incident surface S1 or the light-releasing surface S2. The inclination $\alpha 1$ corresponds to an inclination forming an upper side (upward sky side) in the case when the optical film 1 is bonded to an adherent member such as the window material 10. The optical film 1 is bonded to an adherent member, such as the window material 10 or a building, in a manner so as to allow the inclination $\alpha 1$ in each of the first structural elements 4m to be located on an upper side from the apex angle $\gamma 1$. As described earlier, the ridge line portion (apex portion) of each of the first structural elements 4m may have a curvature R. When the ridge line portion has the curvature R in this manner, the apex angle R is prepared as an opening angle of the side of a portion on the front side from the apex portion that is curved by the curvature R.

The apex angle $\gamma 1$ and the inclination $\alpha 1$ are preferably allowed to satisfy any one of the following formulas (1) to (4). By allowing them to satisfy any one of the formulas, it becomes possible to obtain a high upward reflectance.

$$-3.6\gamma 1+396 \leq \alpha 1 \leq 80 \ (85 \leq \gamma 1 \leq 90) \quad (1)$$

$$\gamma 1-30 \leq \alpha 1 \leq -\gamma 1+170 \ (90 \leq \gamma 1 \leq 100) \quad (2)$$

$$30 \leq \alpha 1 \leq \gamma 1-50 \ (80 \leq \gamma 1 \leq 90) \quad (3)$$

$$30 \leq \alpha 1 \leq -\gamma 1+130 \ (90 \leq \gamma 1 \leq 100) \quad (4)$$

In the case when the apex angle $\gamma 1$ and the inclination $\alpha 1$ satisfy formula (1) or formula (2), the first film thickness d1 and the second film thickness d2 are preferably set to virtually the same value. Thus, improved performances of transmittance and reflectance can be expected. In this case, virtually the same film thicknesses mean that the ratio of the second film thickness d2 to the first film thickness d1 ((d1/d2)×100)[%] is set to ±10% or less.

In the case when the apex angle $\gamma 1$ and the inclination $\alpha 1$ satisfy formula (3) or formula (4), the first film thickness d1 and the second film thickness d2 may be different from each other. Here, in the case when the thickness of each of the metal layers in the wavelength-selective reflection layer 3 of one of the inclined surfaces is thin, since light cannot be reflected and is allowed to transmit therethrough, the thickness of each of the metal layers in the wavelength-selective reflection layer 3 is preferably set to 7 nm or more. On the other hand, in the case when the thickness of each of the metal layers in the wavelength-selective reflection layer 3 exceeds 14 nm, since a floating color of a reflected light ray is undesirably generated, the thickness of each of the metal layers in the wavelength-selective reflection layer 3 is desirably set to 14 nm or less. That is, the ratio of the film thicknesses is desirably set to 200% or less.

As the second structural elements 4n, a pillar-shaped element or its inverted shape is preferably used. As the shape of the pillar-shaped elements, for example, a polygonal pillar shape, such as a prism shape (triangular pillar shape), a prism shape with ridge lines formed into an R shape, a lenticular shape, a toroidal shape, a hyperbolic pillar shape and a free curved face shape may be used, and two kinds or more of these shapes may be used in combination. In this case, the lenticular shape refers to any one of shapes in which its cross-sectional shape perpendicular to the ridge line portion of each pillar-shaped element is formed into an arch shape or a virtually arch shape, an elliptical arch shape or a virtually elliptical arch shape, or a parabolic shape or a virtually one portion of a parabolic shape. Therefore, a cylindrical shape is also included in the lenticular shape. Moreover, by allowing the second structural elements 4n to wind in the width direction $D_W$ or the like, the inclined surface of each of the second structural elements 4n may be bent.

As the shape of the ridge line portion (apex portion) of the second structural elements 4n, for example, a right-angle shape, an R-shape, a polygonal shape (for example, pentagonal shape) or the like is proposed, and the R-shape is in particular preferable. By forming the ridge line portion of each of the second structural elements 4n into an R-shape, it becomes possible to suppress the ridge line portions of the second structural elements 4n from being visually recognized even when the inclination of the second structural elements 4n is large. Moreover, it becomes possible to prevent the second structural elements 4n from being deformed in the shape due to a tightly wound film in the case when the optical film 1 is manufactured by using a roll-to-roll process. In this case, the shape of the ridge line portion (apex portion) of the second structural elements 4n refers to a cross-sectional shape of the ridge line portion in a direction perpendicular to the ridge line. More specifically, for example, in the second structural elements 4n, it refers to a cross-sectional shape of the ridge line portion in the width direction $D_W$.

In the case when the heights of each first structural element 4m and each second structural element 4n are supposed to be H1 and H2 respectively, the height H1 of the first structural element 4m and the height H2 of the second structural element 4n are preferably allowed to satisfy a relationship of H2>H1. Thus, in enclosing and burying processes to be described later, the flow of a resin material is ensured, and the generation of stripe-like film-thickness irregularities can be suppressed. Additionally, as described earlier, the first optical layer 4 corresponds to an optical layer having the light-releasing surface S2 from which solar light that has transmitted through the optical film 1 is released. A difference $\Delta H(=H2-H1)$ between the height H2 of the second structural elements 4n and the height H1 of the first structural elements is preferably set to 0.5 µm or more to 25 µm or less, more preferably, to 2 µm or more to 15 µm or less, and most preferably, to 3 µm or more to 6 µm or less. In the case when the difference $\Delta H$ between heights is 0.5 µm or more, the flow of a resin material is ensured sufficiently in enclosing and burying processes to be described later, and the generation of stripe-like film-thickness irregularities tends to be suppressed more effectively. In the case when the difference $\Delta H$ between heights is 25 µm or less, the ratio of light that has been diagonally made incident on the optical film 1 serving as an optical element is reflected by the second structural elements 4n can be reduced so that the reflection performance by the first structural elements 4m, which has been originally aimed, tends to be obtained.

Since a function for directionally reflecting light with a specific wavelength band is mainly the function of the first structural elements 4m, the second structural elements 4n are preferably installed so as not to give adverse effects to the optical performance. More specifically, supposing that the pitch of the second structural elements 4n is P2 and that the groove width of the second structural elements 4n is w2, the pitch P2 is preferably set to 10×W2 or more, more preferably, to 20×W2 or more, and most preferably, to 25×W2 or more. By setting the pitch P2 to 10×W2 or more, the reduction of the directional reflection function of the optical film 1 due to the second structural elements 4n tends to be suppressed. Additionally, the first structural elements 4m mainly exert the directional reflection function of the optical film 1, as described earlier.

The pitch P2 of the second structural elements 4n is preferably set to 200 μm or more, more preferably, to 250 μm or more, and most preferably, to 300 μm or more. By setting the pitch P2 to 200 μm or more, the visual recognition of the diffraction pattern tends to be suppressed.

The pitch P2 of the second structural elements 4n is preferably set to 5 mm or less, more preferably, to 3 mm or less, and most preferably, to 1 mm or less. By setting the pitch P2 to 5 mm or less, the reduction of the effect of suppressing occurrence of stripe-like film-thickness irregularities tends to be suppressed.

Therefore, from the viewpoints of suppressing the reduction of the directional reflection function and also suppressing the generation of stripe-like film-thickness irregularities, the pitch P2 of the second structural elements 4n is preferably set to 10×W2 or more, that is, 5 mm or less, more preferably, to 20×W2 or more, that is, 3 mm or less, and most preferably, to 25×W2 or more, that is, 1 mm or less. Moreover, from the viewpoints of suppressing the visual recognition of the diffraction pattern and also suppressing the reduction of the effect of suppressing the generation of stripe-like film-thickness irregularities, the pitch P2 of the second structural elements 4n is preferably set to 200 μm or more to 5 mm or less, more preferably, to 250 μm or more to 3 mm or less, and most preferably, to 300 μm or more to 1 mm or less.

The wavelength-selective reflection layer 3 is installed on the first structural elements 4m and the second structural elements 4n, and the behavior of the wavelength-selective reflection layer 3 becomes different depending on the inclinations of the inclined surfaces of these structural elements. In accordance with intensive examinations of the inventors of the present invention, it has been found that in the case when the inclination of the inclined surface of the second structural elements 4n greatly steeper than the inclination of the inclined surface of the first structural elements 4m, the optical absorption by the wavelength-selective reflection layer 3 increases so that stripes tend to be visually recognized even in the case of observations at a long distance. Therefore, the inclination α2 of the first inclined surface and the inclination β2 of the second inclined surface of the second structural elements 4n are preferably set to 65° or less, and more preferably, to 60° or less. Moreover, in the case when the inclination α2 of the first inclined surface and the inclination β2 of the second inclined surface are mild, the area occupied by the second structural elements 4n increases, causing an adverse effect to the reflection performance by the first structural elements 4m, which has been originally aimed. Therefore, the inclination α2 of the first inclined surface and the inclination β2 of the second inclined surface of the second structural elements 4n are preferably set to 30° or more and more preferably, to 45° or more. When the above-mentioned points are summarized, the inclination α2 of the first inclined surface and the inclination β2 of the second inclined surface of the second structural elements 4n are preferably set to 30° or more to 65° or less, and more preferably, to 45° or more to 60° or less.

A difference between the inclinations of the inclined surfaces of the first structural elements 4m and the second structural elements 4n is preferably set to ±15° or less, more preferably, to ±10° or less, and most preferably to ±5° or less. By setting the difference between the inclinations of the inclined surfaces to +15° or less, it is possible to suppress visual recognition of color tones caused by differences of behaviors of the wavelength-selective reflection layer 3. In this case, in the case when there are a plurality of kinds of the inclined surfaces of the first structural elements 4m, the deviation angle from the surface having the closest inclination angle is taken into consideration.

Preferably, the first optical layer 4 is mainly composed of a resin which is less susceptible to reduction in the storage elastic modulus at 100° C. and in which the storage elastic modulus is not varied so much between that at 25° C. and that at 100° C. More specifically, a resin in which the storage elastic modulus at 25° C. is set to $3\times10^9$ Pa or less and the storage elastic modulus at 100° C. is set to $3\times10^7$ Pa or more is preferably contained therein. Additionally, although the first optical layer 4 is preferably made of one kind of a resin, it may contain two or more kinds of resins. Moreover, an additive agent may be mixed therein, if necessary.

In this manner, in the case when such a resin in which the reduction of the storage elastic modulus at 100° C. is small and the storage elastic moduli are not different so much between that of 25° C. and that of 100° C. is used as its main component, the designed interface shape can be virtually maintained even when a process requiring heat or heat and pressure is carried out after the formation of the concavo-convex surface 4b of the first optical layer 4. In contrast, in the case when such a resin in which the reduction of the storage elastic modulus at 100° C. is large and the storage elastic moduli are greatly different between that of 25° C. and that of 100° C. is used as its main component, deformation from the designed interface shape becomes greater, with the result that a curling or the like tends to occur in the optical film 1.

In this case, those processes accompanying heat include not only such a process as to directly apply heat to the optical film 1 or the constituent members, such as an annealing process or the like, but also such a process in which upon forming a thin film, or upon curing a resin composition or the like, the film-forming surface has a temperature rise locally, with the result that heat is indirectly applied to those members, as well as such a process in which the temperature of a metal mold is raised by an energy ray irradiation, with the result that heat is indirectly applied to the optical film. Moreover, the above-mentioned effects obtained by limiting the numeric value range of the storage elastic modulus are not particularly limited by the kinds of resins, and can be obtained from any one of a thermoplastic resin, a thermosetting resin and an energy-ray irradiation-type resin.

The storage elastic modulus of the first optical layer 4 can be confirmed, for example, by using the following method. In the case when the surface of the first optical layer 4 is exposed, the storage elastic modulus of the exposed surface can be confirmed by using a minute hardness meter. Moreover, in the case when the first substrate 4a or the like is formed on the surface of the optical layer 4, after separating the substrate 4a or the like therefrom so that the surface of the first optical layer 4 is exposed, the storage elastic modulus of the exposed surface can be confirmed by measurements by the use of a minute hardness meter.

As a method for suppressing a reduction of the elastic modulus under high temperatures, for example, in the case of the thermoplastic resin, a method for adjusting the length, kind or the like of a side chain is proposed, and in the case of the thermosetting resin and energy-ray irradiation-type resin, a method for adjusting the amount of cross-linking points, the molecule structure and the like of the cross-linking material is proposed. In this case, however, it is preferable to prevent the characteristic required for the resin material itself from being impaired by this structural change. For example, depending on the kinds of cross-linking agents, the elastic modulus becomes higher in the vicinity of room temperature to sometimes cause the resin to become brittle, or the shrinkage becomes greater to sometimes cause the resulting film to be curved or curled; therefore, the kind of the cross-linking agent needs to be desirably selected on demand in accordance with desired characteristics.

In the case when the optical layer 4 contains a crystalline polymeric material as its main component, it is preferable for the optical layer 4 to be mainly composed of a resin which has a glass transition point higher than the maximum temperature within manufacturing processes and is less susceptible to a reduction of the storage elastic modulus under the maximum temperature in the manufacturing processes. On the other hand, in the case of using a resin which has a glass transition point that is higher than room temperature 25° C. and within a range lower than the maximum temperature in the manufacturing processes, and is susceptible to a great reduction of the storage elastic modulus under the maximum temperature in the manufacturing processes, it becomes difficult to maintain an optimally designed interface shape during the manufacturing processes.

In the case when the first optical layer 4 contains an amorphous polymeric material as its main component, it is preferable for the first optical layer 4 to be mainly composed of a resin which has a melting point higher than the maximum temperature within manufacturing processes and is less susceptible to a reduction of the storage elastic modulus under the maximum temperature in the manufacturing processes. In contrast, in the case of using a resin which has a melting point that is higher than room temperature 25° C. and is located within a range lower than the maximum temperature in the manufacturing processes, and is susceptible to a great reduction of the storage elastic modulus under the maximum temperature in the manufacturing processes, it becomes difficult to maintain an optimally designed interface shape during the manufacturing processes.

In this case, the maximum temperature in the manufacturing processes refers to the maximum temperature of the concavo-convex surface 4b of the first optical layer 4 in the manufacturing processes. It is preferable for the second optical layer 5 to also satisfy the above-mentioned numeric value range of the storage elastic modulus and the temperature range of the glass transition point.

That is, at least one of the first optical layer 4 and the second optical layer 5 preferably contains a resin that has a storage elastic modulus at 25° C. of $3 \times 10^9$ Pa or less. Since it becomes possible to give flexibility to the optical film 1 at 25° C., the manufacturing process of the optical film 1 by using the roll-to-roll operation is achieved.

The first substrate 4a and the second substrate 5a have, for example, transparency. From the viewpoint of giving flexibility to the optical film 1, the shape of the substrate is preferably formed into a film shape; however, it is not limited only by this shape. As the material for the first substrate 4a and the second substrate 5a, for example, known polymeric materials may be used, examples of the known polymeric materials include: triacetyl cellulose (TAC), polyester (TPEE), polyethylene terephthalate (PET), polyimide (PI), polyamide (PA), aramid, polyethylene (PE), polyacrylate, polyether sulfone, polysulfone, polypropylene (PP), diacetyl cellulose, polyvinyl chloride, acrylic resin (PMMA), polycarbonate (PC), epoxy resin, urea resin, urethane resin, melamine resin, and the like; however, the materials are not particularly limited by these. From the viewpoint of productivity, the thickness of the first substrate 4a and the second substrate 5a is preferably set to 38 to 100 µm; however, it is not particularly limited by this range. The first substrate 4a and the second substrate 5a are preferably provided with an energy-ray transmitting property. With this arrangement, as will be described later, an energy-ray is applied to an energy-ray setting-type resin interposed between the first substrate 4a or the second substrate 5a and the wavelength-selective reflection layer 3 from the first substrate 4a or second substrate 5a side so that the energy-ray setting-type resin can be cured.

The first optical layer 4 and the second optical layer 5 have, for example, transparency. The first optical layer 4 and the second optical layer 5 are obtained, for example, by curing a resin composition. As the resin composition, from the viewpoint of easiness in production, an energy-ray setting-type resin that is cured by light, an electron beam, or the like, or a thermosetting type resin that is cured by heat is preferably used. With respect to the energy-ray setting-type resin, a photosensitive resin composition that is cured by light is preferably used, and an ultraviolet-ray setting resin composition that is cured by ultraviolet rays is most preferably used. From the viewpoint of improving the adhesion between the first optical layer 4 or the second optical layer 5 and the wavelength-selective reflection layer 3, the resin composition preferably further contains a compound containing a phosphoric acid, a compound containing a succinic acid and a compound containing butyrolactone. As the compound containing a phosphoric acid, for example, (meth)acrylate containing a phosphoric acid, more preferably, (meth)acrylic monomer or oligomer having a phosphoric acid in its functional group may be used. As the compound containing a succinic acid, for example, (meth)acrylate containing a succinic acid, more preferably, (meth)acrylic monomer or oligomer containing a succinic acid in its functional group may be used. As the compound containing butyrolactone, for example, (meth)acrylate containing butyrolactone, more preferably, (meth)acrylic monomer or oligomer containing butyrolactone in its functional group may be used.

The ultraviolet-ray setting-type resin composition contains, for example, (meth)acrylate and a photo-polymerization initiator. Moreover, the ultraviolet-ray setting-type resin composition may further contains a photo-stabilizer, a flame retardant, a leveling agent, an antioxidant or the like, if necessary.

With respect to the acrylate, a monomer and/or an oligomer containing two or more (meth)acryloyl groups may be preferably used. As this monomer and/or oligomer, for example, urethane (meth)acrylate, epoxy (meth)acrylate, polyester (meth)acrylate, polyol (meth)acrylate, polyether (meth)acrylate, melamine (meth)acrylate, or the like may be used. In this case, the (meth)acryloyl group refers to either an acryloyl group or a methacryloyl group. In this case, the oligomer refers to a molecule having a molecular weight in a range from 500 or more to 60000 or less.

As the photo-polymerization initiator, one selected from known materials on demand can be used. As the known materials, for example, a benzophenone derivative, an acetophenone derivative, an anthraquinone derivative, and the like may be used alone, or in combination. The compounding amount of the polymerization initiator is preferably set in a range from 0.1 mass % or more to 10 mass % or less in solid components. When the amount is less than 0.1 mass %, the photo-setting property deteriorates, failing to be actually applied to the industrial production. In contrast, when the amount exceeds 10 mass %, odor tends to remain in the coated film in the case when the quantity of light irradiation is small. In this case, the solid components mean all the components constituting a resin composition after its curing process. More specifically, for example, acrylate and the photo-polymerization initiator, etc. are referred to as solid components.

With respect to the resin, one that is capable of transferring a structure by irradiation with an energy ray, heat, or the like is preferably used, and any kind of resins, such as a vinyl-based resin, an epoxy-based resin, a thermoplastic resin or the like, may be used as long as it satisfies the requirement for the aforementioned refractive index.

In order to reduce the curing shrinkage, an oligomer may be added thereto. As the curing agent, polyisocyanate or the like may be contained therein. Moreover, when the adhesion between the first optical layer 4 and the second optical layer 5 is taken into consideration, a monomer having a hydroxyl group, a carboxylic group, or a phosphoric acid group, a coupling agent, such as polyhydric alcohols, carboxylic acid, silane, aluminum, titanium or the like, and various kinds of chelate agents or the like may be added thereto.

The resin composition preferably further contains a cross-linking agent. As this cross-linking agent, a cyclic cross-linking agent is in particular preferably used. By using the cross-linking agent, it is possible to make the resin heat resistant without changing the storage elastic modulus greatly at room temperature. Additionally, in the case when the storage elastic modulus at room temperature is greatly varied, the optical film 1 tends to become brittle, making it difficult to manufacture the optical film 1 by the use of the roll-to-roll process, or the like. As the cyclic cross-linking agent, for example, dioxane glycol diacrylate, tricyclodecane dimethanol diacrylate, tricyclodecane dimethanol dimethacrylate, ethylene oxide modified isocyanurate diacrylate, ethylene oxide modified isocyanurate triacrylate, caprolactone modified tris(acryloxyethyl) isocyanurate, or the like are proposed.

The first substrate 4a or the second substrate 5a is preferably designed to have a water vapor permeability that is lower than that of the first optical layer 4 or the second optical layer 5. For example, in the case when the first optical layer 4 is formed by using an energy-ray setting-type resin, such as urethane acrylate, it is preferable to form the first substrate 4a by using a resin, such as polyethylene terephthalate (PET) or the like, which has a water vapor permeability that is lower than that of the first optical layer 4, and also has an energy-ray transmitting property. With this arrangement, moisture diffusion from the light-incident surface S1 or the light-releasing surface S2 toward the wavelength-selective reflection layer 3 is reduced so that metal or the like contained in the wavelength-selective reflection layer 3 is prevented from deteriorating. Therefore, the durability of the optical film 1 can be improved. Additionally, the water vapor permeability of the PET having a thickness of 75 μm is about 10 $g/m^2/day$ (40° C., 90% RH).

It is preferable to allow at least one of the first optical layer 4 and the second optical layer 5 to contain a functional group having a high polarity, with its contents being preferably different between the first optical layer 4 and the second optical layer 5. Both of the first optical layer 4 and the second optical layer 5 contain a phosphoric acid compound (for example, phosphate), and the contents of the phosphoric acid compound are preferably made different between the first optical layer 4 and the second optical layer 5. The contents of the phosphoric acid compound between the first optical layer 4 and the second optical layer 5 are preferably made different by two times or more, more preferably by 5 times or more, and most preferably by 10 times or more.

In the case when at least one of the first optical layer 4 and the second optical layer 5 contains a phosphoric acid compound, the wavelength-selective reflection layer 3 preferably contains an oxide, a nitride or an oxynitride on its surface that is made in contact with the first optical layer 4 or the second optical layer 5 that contains the phosphoric acid compound. The wavelength-selective reflection layer 3 is, in particular, preferably provided with a layer containing zinc oxide (ZnO) or niobium oxide on the surface that is made in contact with the first optical layer 4 or the second optical layer 5 containing the phosphoric acid compound. With this structure, the adhesion between these optical layer and wavelength-selective reflection layer 3 can be improved. Moreover, in the case when the wavelength-selective reflection layer 3 contains metal, such as Ag or the like, its corrosion preventive effect can be improved. Furthermore, the wavelength-selective reflection layer 3 may contain a dopant such as Al, Ga or the like. This structure makes it possible to improve the film quality and smoothness when a metal oxide layer is formed by sputtering or the like.

From the viewpoint of allowing at least one of the first optical layer 4 and the second optical layer 5 to give a designing property to the optical film 1, the window material 10, and the like, the layer preferably has a characteristic for absorbing light having a specific wavelength band within a visible light region. A pigment to be dispersed in a resin may be either an organic-based pigment or an inorganic-based pigment; however, an inorganic-based pigment that particularly has high weatherabillity in the pigment itself is preferably used. More specifically, inorganic pigments, such as Zircon Gray (Co, Ni doped $ZrSiO_4$), Praseodymium Yellow (Pr doped $ZrSiO_4$), Chromium Titanium Yellow (Cr, Sb doped $TiO_2$ or Cr, W doped $TiO_2$), Chromium Green ($Cr_2O_3$ or the like), Peacock Blue ($(CoZn)O(AlCr)_2O_3$), Victoria Green ($(Al, Cr)_2O_3$), Prussian Blue ($CoO$—$Al_2O_3$—$SiO_2$), Vanadium Zirconium Blue (V doped $ZrSiO_4$), Chrome Tin Pink (Cr doped $CaO$—$SnO_2$—$SiO_2$), Manganese Pink (Mn doped $Al_2O_3$) and Salmon Pink (Fe doped $ZrSiO_4$) and organic-based pigments, such as azo-based pigments and phthalocyanine-based pigments, are proposed.

(Wavelength-Selective Reflection Layer)

The wavelength-selective reflection layer 3 is designed such that of light rays made incident on the incident surface, for example, at an incident angle (θ, φ), a light ray having a specific wavelength band is directionally reflected, while light rays other than the light ray having the specific wavelength band are transmitted therethrough. The wavelength-selective reflection layer 3 is, for example, a laminated film, a transparent conductive layer, or a functional layer. Moreover, two or more of the laminated film, the transparent conductive layer and the functional layer may be combined with one another, and may be used as the wavelength-selective reflection layer 3. The average layer thickness of the wavelength-selective reflection layer 3 is preferably set to 20 μm or less, more preferably, to 5 μm or less, and most preferably, to 1 μm or less. When the average layer thickness of the wavelength-selective reflection layer 3 exceeds 20 μm, a light path in which a transmitted light ray is refracted becomes longer, and a transmission image tends to be viewed in a distorted state. The formation method of the reflection layer may be carried out, for example, by using a sputtering method, a vapor deposition method, a dip coating method, a die-coating method, or the like.

The following description will successively discuss the laminated film, the transparent conductive layer and the functional layer.

(Laminated Film)

The laminated film has a configuration in which, for example, a low refractive index layer and a high refractive-index layer having respectively different refractive indexes are alternately stacked. Alternatively, the laminated film has a configuration in which, for example, a metal film having a high reflectance in an infrared region and a high refractive-index layer that has a high refractive-index in a visible light region and functions as an antireflection layer are alternately stacked. As the high refractive-index layer, an optical transparent layer or a transparent conductive layer may be used.

The metal layer having a high reflectance in the infrared region is mainly composed of a simple substance, such as, for example, Au, Ag, Cu, Al, Ni, Cr, Ti, Pd, Co, Si, Ta, W, Mo, Ge, or the like, or an alloy containing two kinds or more of these simple substances. From the viewpoint of practical use, among these, an Ag-based, Cu-based, Al-based, Si-based or Ge-based material is preferably used. Moreover, in the case of using an alloy as the metal layer, the metal layer is preferably mainly composed of AlCu, AlTi, AlCr, AlCo, AlNdCu, AlMgSi, AgPdCu, AgPdTi, AgCuTi, AgPdCa, AgPdMg, AgPdFe, Ag or SiB. Furthermore, in order to suppress corrosion in the metal layer, another material, such as Ti, Nd or the like, is preferably added to the metal layer. In particular, in the case when Ag is used for the material of the metal layer, the above-mentioned material is preferably added thereto.

The optical transparent layer is an optical transparent layer having a high refractive index in the visible light region and serving as an antireflection layer. The optical transparent layer is mainly composed of a high dielectric material, such as, for example, niobium oxide, tantalum oxide, titanium oxide, or the like. The transparent conductive layer is mainly composed of, for example, a ZnO-based oxide, an indium-doped tin oxide, or the like. Additionally, as the ZnO-based oxide, for example, at least one kind of materials selected from the group consisting of zinc oxide (ZnO), zinc oxide (GAZO) doped with gallium (Ga) and aluminum (Al), zinc oxide (AZO) doped with Al, and zinc oxide (GZO) doped with gallium (Ga) may be used.

Moreover, the refractive index of the high refractive-index layer contained in the laminated film is preferably set in a range from 1.7 or more to 2.6 or less. More preferably, it is set in a range from 1.8 or more to 2.6 or less, and most preferably, it is set in a range from 1.9 or more to 2.6 or less. With this structure, it is possible to realize an antireflection property in the visible light region by using a thin film in such a degree as not to cause cracks. In this case, the refractive index is taken at a wavelength of 550 nm. The high-refractive-index layer is a layer mainly composed of, for example, a metal oxide. As the metal oxide, from the viewpoint of alleviating the stress of the layer and suppressing the occurrence of cracks, a metal oxide other than zinc oxide is more preferably used in some cases. In particular, at least one kind of materials selected from the group consisting of niobium oxide (for example, niobium pentoxide), tantalum oxide (for example, tantalum pentoxide) and titanium oxide may be preferably used. The film thickness of the high-refractive-index layer is preferably set in a range from 10 nm or more to 120 nm or less, more preferably, from 10 nm or more to 100 nm or less, and most preferably, from 10 nm or more to 80 nm or less. In the case when the film thickness is less than 10 nm, the visible light tends to be easily reflected. In contrast, when the film thickness exceeds 120 nm, the transmittance tends to be lowered, and cracks tend to be easily generated.

Additionally, the laminated film is not limited to a thin film made of an inorganic material, and may be formed as a thin film made of a polymeric material, or may be formed by stacking layers in which fine particles or the like are dispersed in a polymer. Moreover, in order to prevent degradation by oxidation of lower layer metal during a film-forming process of the optical transparent layer, a thin buffer layer made of Ti or the like having a thickness of about several nms may be formed on the interface of the optical transparent layer to be film-formed. In this case, the buffer layer refers to a layer which suppresses oxidation of a metal layer or the like serving as the lower layer by being oxidized itself at the time of film-forming an upper layer.

(Transparent Conductive Layer)

The transparent conductive layer is a transparent conductive layer mainly composed of a conductive material having transparency in the visible light region. The transparent conductive layer is mainly composed of a transparent conductive substance, such as, for example, tin oxide, zinc oxide, a carbon-nanotube containing material, tin oxide doped with indium, zinc oxide doped with indium and tin oxide doped with antimony. Alternatively, a layer in which nano particles of these materials, or nano particles, nano-rods and nano-wires of a material having conductivity, such as metal or the like, are dispersed in a resin with a high concentration may be used.

(Functional Layer)

A functional layer is mainly composed of a chromic material whose reflection function or the like is reversibly changed by an external stimulus. The chromic material is a material which reversibly changes its structure by an external stimulus, such as, for example, heat, light, invading molecules, or the like. As the chromic material, for example, a photochromic material, a thermo-chromic material, a gas-chromic material and an electro-chromic material may be used.

The photochromic material refers to a material which reversibly changes its structure by a function of light. The photochromic material makes it possible to reversibly change various physical properties such as reflectance, colors or the like, by irradiation with light, such as, for example, ultraviolet rays, or the like. As the photochromic material, for example, transition metal oxides, such as $TiO_2$, $WO_3$, $MoO_3$, $Nb_2O_5$, or the like, doped with Cr, Fe, Ni, or the like, may be used. Moreover, by stacking a layer having a refractive index different from that of these layers thereon, a wavelength-selective characteristic can also be improved.

The thermo-chromic material refers to a material which reversibly changes its structure by a function of heat. The thermo-chromic material makes it possible to reversibly change various physical properties such as reflectance, colors or the like, by a function of heat. As the thermo-chromic material, for example, $VO_2$ may be used. Moreover, in order to control the transition temperature and the transition curve, elements, such as W, Mo, F, or the like, may be added thereto. Furthermore, a laminated layer structure in which a thin film mainly composed of a thermo-chromic material, such as $VO_2$, is sandwiched by antireflection layers mainly composed of a high-refractive-index material, such as $TiO_2$, ITO or the like, may also be proposed.

Alternatively, a photonic lattice, such as cholesteric liquid crystal or the like, may be used. The cholesteric liquid crystal makes it possible to selectively reflect light rays having wavelengths that depend on layer intervals, and since the layer intervals are changed depending on temperatures, the physical properties, such as reflectance, color or the like, can be reversibly changed by heating. At this time, the reflection band can be widened by using some cholesteric liquid crystal layers having different layer intervals.

An electro-chromic material refers to a material capable of reversibly changing various physical properties, such as reflectance, color or the like, by electricity. As the electro-chromic material, for example, a material whose structure can be reversibly changed by application of a voltage may be used. More specifically, as the electro-chromic material, for example, a reflection type light-adjusting material whose reflection characteristic is changed by doping or dedoping with protons or the like may be used. More specifically, the reflection type light-adjusting material is a material capable of controlling its optical characteristic among a transparent state and a mirror state, and/or its intermediate state by utilizing an external stimulus. As the material for this reflection-type light adjusting material, for example, an alloy material of magnesium and nickel, an alloy material mainly composed of alloy materials of magnesium and titanium, a material in which needle-state crystals having a selective reflectivity are confined in $WO_3$ and microcapsules, or the like, may be used.

As a specific functional layer structure, for example, a structure in which on the second optical layer, the above-mentioned alloy layer, a catalyst layer containing Pd or the like, a buffer layer such as a thin Al, an electrolyte layer such as $Ta_2O_5$, an ion storage layer such as $WO_3$ containing protons, a transparent conductive layer are stacked, may be used. Moreover, a structure in which on the second optical layer, the electro-chloric layers, such as the transparent conductive layer, the electrolyte layer, $WO_3$, or the like, and the transparent conductive layer are stacked may be used. In these structures, by applying a voltage between the transparent conductive layer and the opposed electrode, protons contained in the electrolyte layer are doped in or dedoped from the alloy layer. Thus, the transmittance of the alloy layer is changed. Moreover, in order to enhance the wavelength-selective characteristic, the electro-chloric material is preferably stacked together with a high-refractive-index material such as $TiO_2$, ITO or the like. Moreover, as another structure, a structure in which on the second optical layer, a transparent conductive layer, an optical transparent layer with micro-capsules dispersed therein, and a transparent electrode are stacked may be used. In this structure, by applying a voltage between the two transparent electrodes, the needle-state crystals in the microcapsules are oriented to form a transmitting state, or by removing the voltage, the needle-state crystals are directed in all directions so that a wavelength-selective reflection state may be prepared.

[Functions of Optical Film]

Figure 7A:
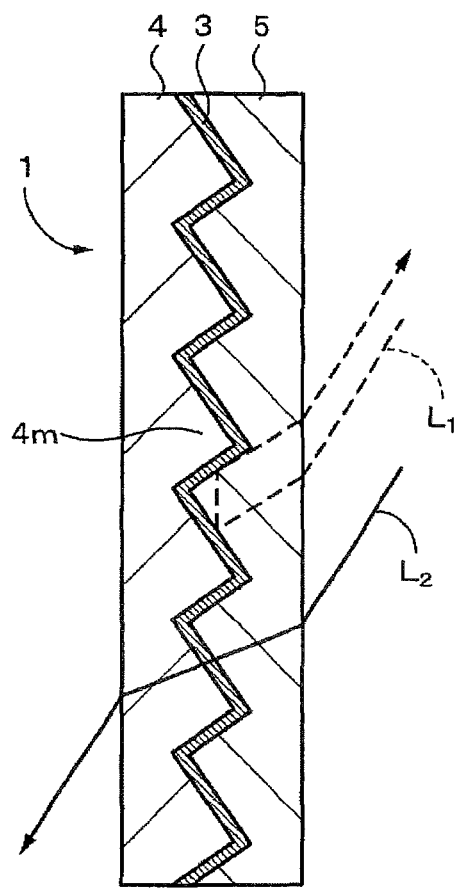
FIGS. 7A and 7B are cross-sectional views for use in explaining one example of functions of the optical film relating to the first embodiment.
Figure 7B:
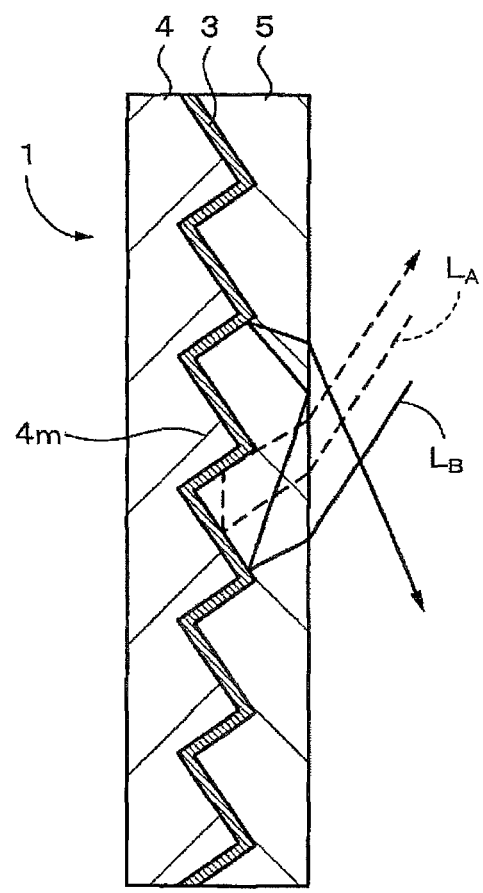

FIGS. 7A and 7B are cross-sectional views for use in explaining one example of a function of the optical film. As shown in FIG. 7A, of solar light rays made incident on the optical film 1, one portion of near infrared rays $L_1$ are directionally reflected in an upward sky direction in the same degree as in the incident direction, while visible light ray $L_2$ is allowed to transmit through the optical film 1.

Moreover, as shown in FIG. 7B, light rays, made incident on the optical film 1, and reflected by the reflection layer surface of the wavelength-selective reflection layer 3, are separated into a component $L_A$ to be reflected toward the sky and a component $L_B$ not to be reflected toward the sky, at a ratio depending on incident angles. Moreover, the component $L_B$ not to be reflected toward the sky is totally reflected by the interface between the second optical layer 5 and air, and then finally reflected in a direction different from the incident direction.

Figure 8A:
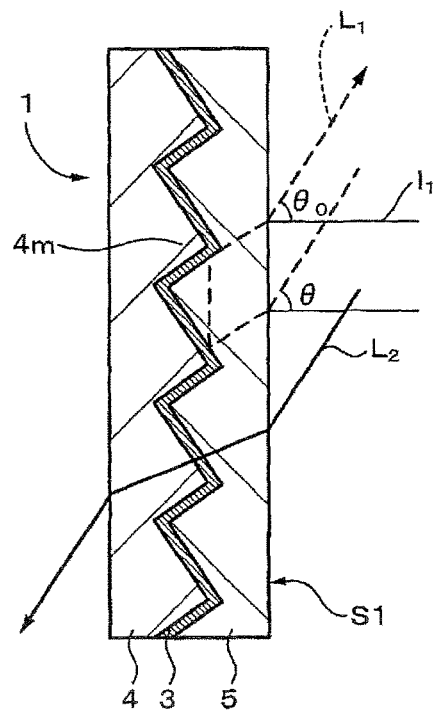
FIG. 8A is a cross-sectional view for use in explaining one example of functions of the optical film relating to the first embodiment.
Figure 8B:
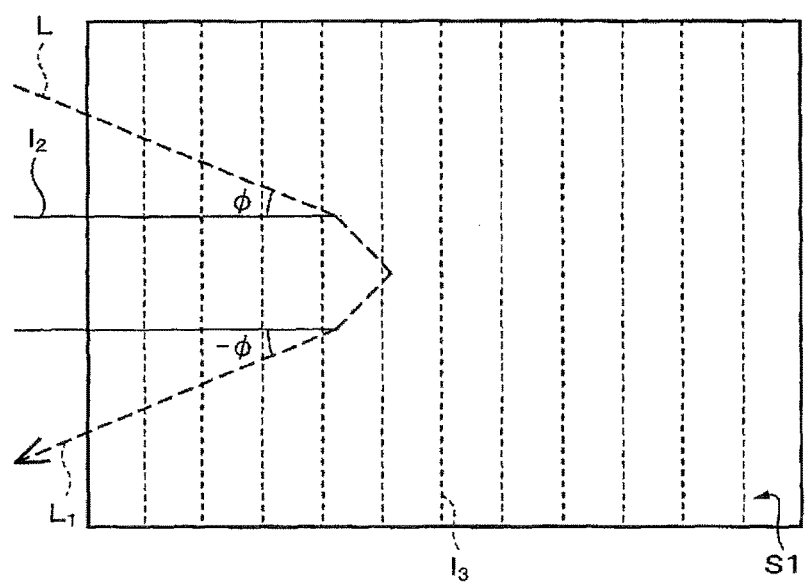
FIG. 8B is a plan view for use in explain one example of functions of the optical film relating to the first embodiment.

FIGS. 8A and 8B show a relationship between the ridge line $l_3$ of the first structural element 4m and the incident light ray L and the reflected light ray $L_1$. Of the incident light rays L onto the incident-surface S1 at an incident angle (θ, φ), the optical film 1 selectively reflects a light ray $L_1$ having a specific wavelength band directionally in a direction of (θo, −φ), that is, in a direction of (0°<θo<90°), while light rays $L_2$ other than that having the specific wavelength band are preferably transmitted therethrough. By satisfying this relationship, it is possible to reflect the light ray having the specific wavelength band in the upward sky direction. In this case, θ represents an angle made by the perpendicular line $l_1$ relative to the incident surface S1 and the incident light ray L or the reflected light ray $L_1$. On the other hand, φ represents an angle formed by a straight line $l_2$ that is orthogonal to the ridge line $l_3$ of the first structural element 4m within the incident surface S1 and a component of the incident light ray L or the reflected light ray $L_1$ projected onto the incident surface S1. Additionally, an angle θ obtained by rotating clockwise based upon the perpendicular line $l_1$ is defined as "+θ", and an angle θ obtained by rotating counter-clockwise based upon the perpendicular line $l_1$ is defined as "−θ". An angle φ obtained by rotating clockwise based upon the straight line $l_2$ is defined as "+φ", and an angle φ obtained by rotating counter-clockwise based thereupon is defined as "−φ".

[Entire Shape of Optical Film]

Figure 9:
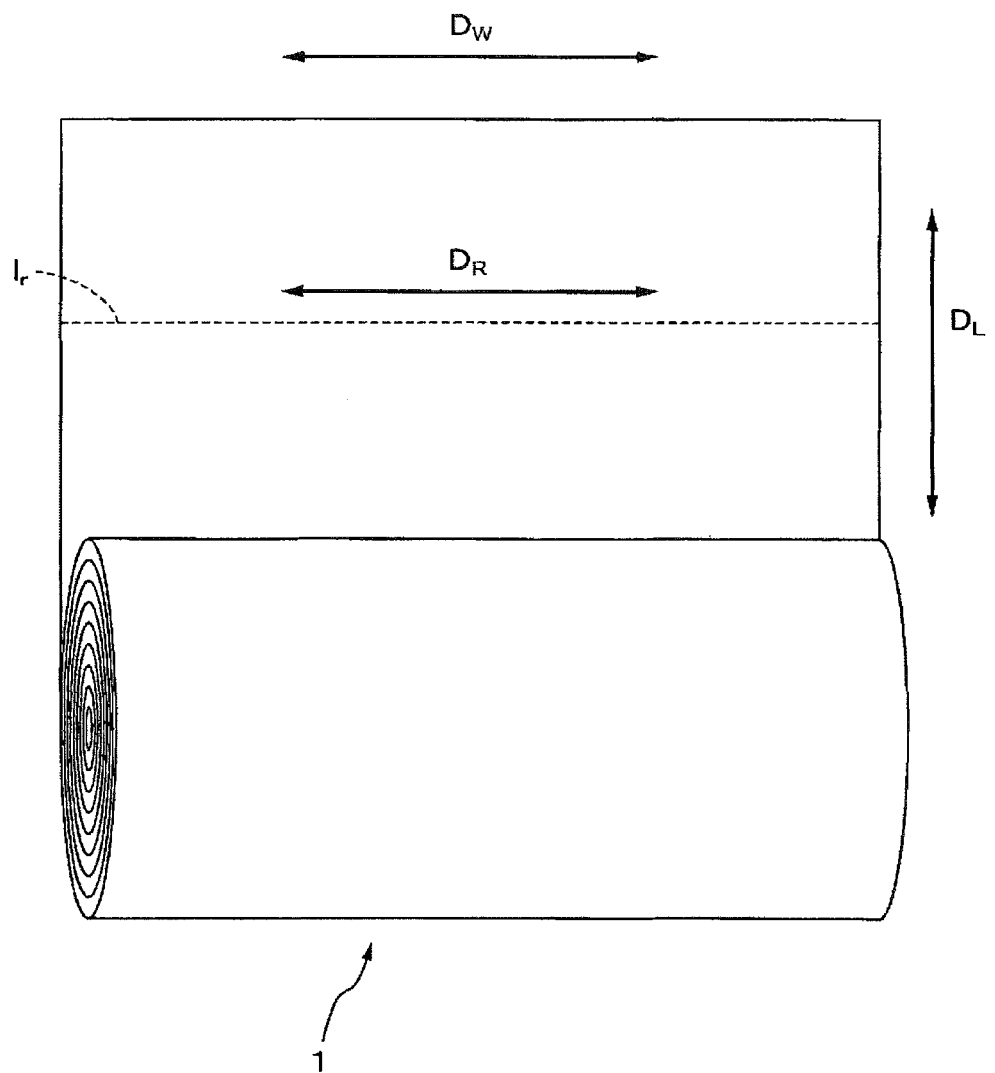
FIG. 9 is a perspective view showing one example of the entire shape of the optical film relating to the first embodiment.

FIG. 9 is a perspective view showing one example of the entire shape of the optical film in accordance with the first embodiment. As shown in FIG. 9, the optical film 1 is preferably formed into a belt-like or rectangular shape as a whole. By using this shape, the optical film 1 can be easily produced by using a roll-to-roll process. Moreover, by winding the optical film 1 into a roll shape or the like, it is possible to achieve easiness in handling. In the following description, the longitudinal direction of the optical film 1 having a belt-like or rectangular shape is referred to as a longitudinal direction $D_L$, and the short-side direction (referred to also as a width direction) thereof is referred to as a short-side direction $D_W$. Moreover, a direction of a ridge line lr of each of the first structural elements 4m formed on the optical layer 4 is referred to as a ridge-line direction $D_R$.

The first structural elements 4m are preferably formed on the first optical layer 4 in a manner so as to make the ridge line lr in parallel with the short-side direction $D_W$ of the optical film 1. The ridge line direction $D_R$ of the first structural elements 4m and the longitudinal direction of the optical film 1 are preferably designed to have such a relationship as to be orthogonal to the longitudinal direction $D_L$ each other. With this structure, by simply bonding the belt-shaped or rectangular-shaped optical film 1 to the window material or the like of a building so as to allow the height direction of the building and the longitudinal direction $D_L$ of the belt-shaped or rectangular-shaped optical film 1 to be virtually in parallel with each other, the reflection function of the optical film 1 can be effectively exerted.

[Method for Bonding Optical Film]

Figure 10A:
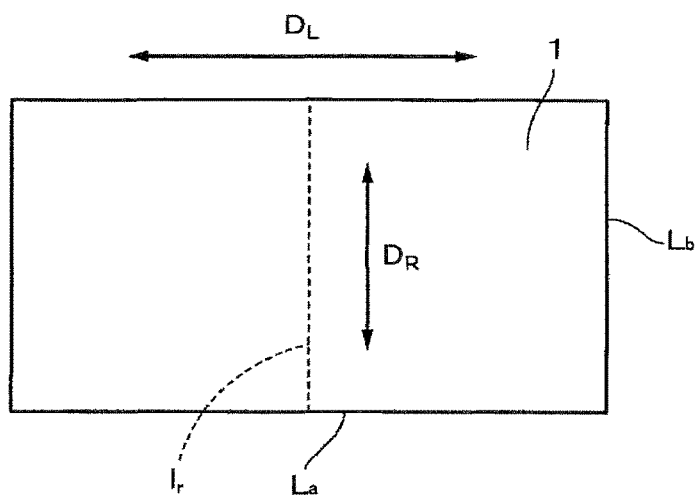
FIGS. 10A and 10B are schematic diagrams for use in explaining one example of a bonding method of the optical film relating to the first embodiment of the present technique.
Figure 10B:
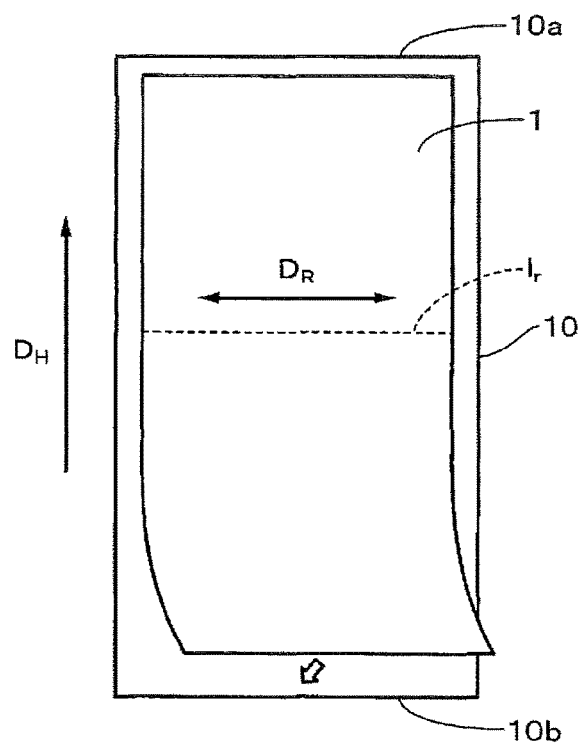

FIGS. 10A and 10B are schematic diagrams for use in explaining one example of a bonding method of the optical film relating to the first embodiment of the present technique. A window material 10 to be installed on a high-rise building in recent years, such as a building or the like, generally has a rectangular shape with a longitudinal width wider than a lateral width. Therefore, in the following description, explanations will be given by exemplifying a case in which the optical film 1 is bonded to the window material 10 having such a shape.

First, from an optical film (so-called master disc) 1 wound up into a roll, the belt-shaped optical film 1 is fed and appropriately cut so as to fit to the shape of a window material 10 to be bonded so that the optical film 1 having a rectangular shape is obtained. As shown in FIG. 10A, the optical film 1 having this rectangular shape is provided with one pair of opposed long sides $L_a$ and one pair of opposed short sides $L_b$. The long sides $L_a$ of the rectangular-shaped optical film 1 and the ridge line direction $D_R$ of the first structural elements 4m within the incident in-plane of the optical film 1 are made virtually orthogonal to each other. That is, the longitudinal direction $D_L$ of the rectangular-shaped optical film 1 and the direction $D_R$ of the ridge line of the first structural elements 4m within the incident surface of the optical film 1 are virtually orthogonal to each other.

Next, one of the short sides $L_b$ of the optical film 1 thus cut is position-adjusted on a short side 10a located on the upper end of the rectangular-shaped window material 10. Next, the rectangular-shaped optical film 1 is successively bonded onto the window material 10 from the upper end toward the lower end with a bonding layer 6 or the like interposed therebetween. Thus, the other short side $L_b$ of the optical film 1 is position-adjusted on the short side 10b positioned on the other end of the rectangular-shaped window material 10. Next, if necessary, air bubbles mingled between the window material 10 and the optical film 1 are removed by pressing or the like the surface of the optical film 1 bonded to the window material 10. By the above-mentioned processes, the rectangular-shaped optical film 1 is bonded to the window material 10 so as to make the ridge line direction $D_R$ of the first structural elements 4m within the incident surface of the optical film 1 and the height direction $D_H$ of a building, such as a high-rise building, are made virtually in parallel with each other.

[Bonding Direction of Optical Film]

Figure 11B:
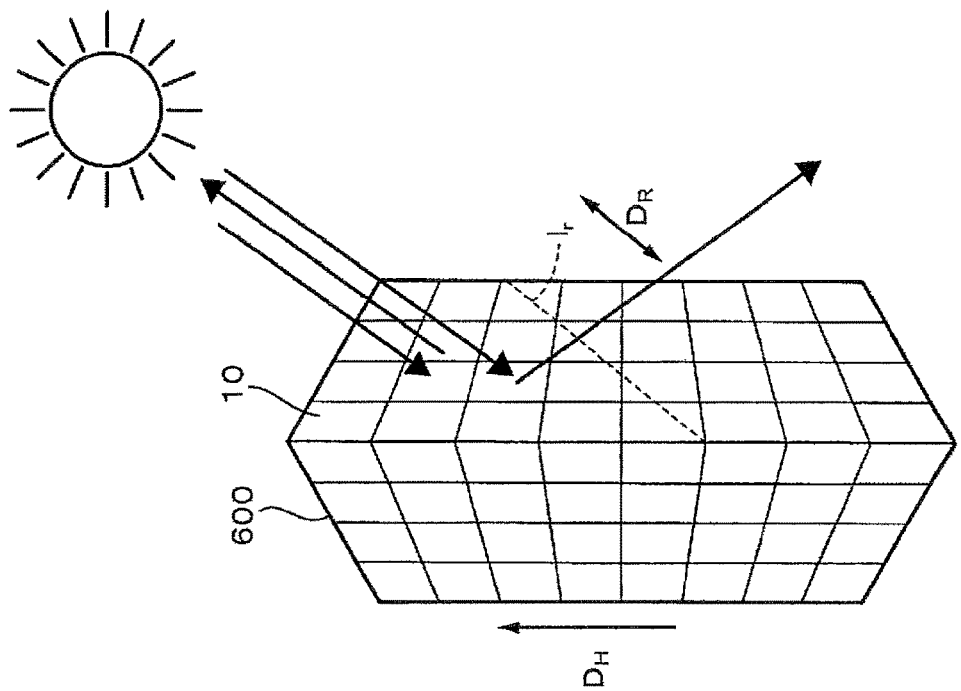
FIGS. 11A and 11B are schematic diagrams for use in explaining a difference in reflection functions of optical films caused by bonding directions.
Figure 11A:
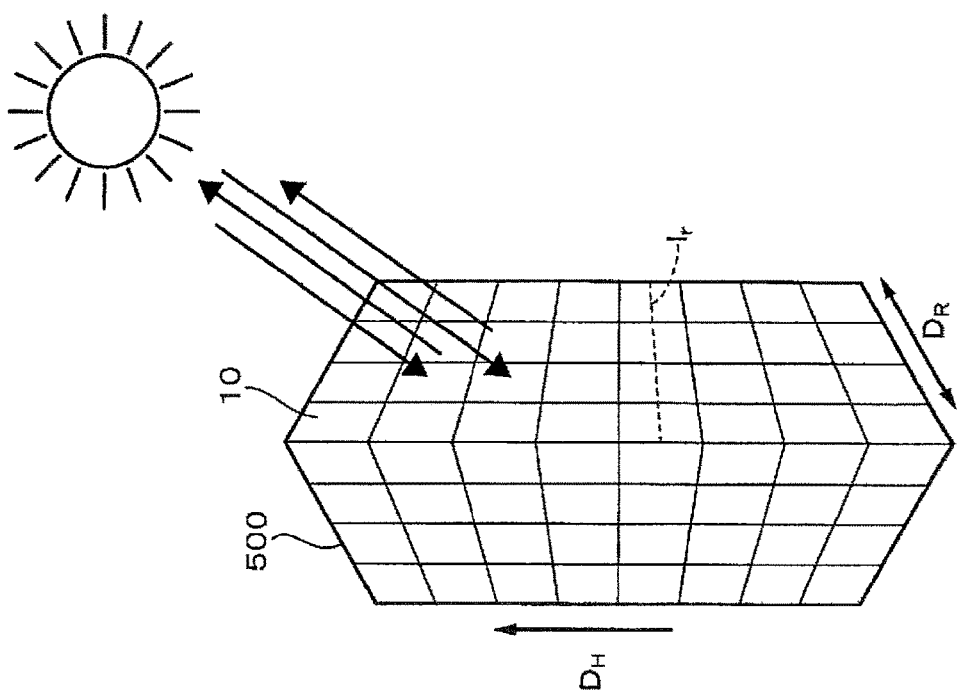

FIGS. 11A and 11B are schematic diagrams for use in explaining differences of reflection functions of the optical film 1 caused by bonding directions.

FIG. 11A shows an example of a building 500 in which an optical film 1 is bonded to a window material 10 so as to make the ridge-line direction $D_R$ of first structural elements 4m within the incident surface of the optical film 1 and the height direction $D_H$ of the building article virtually orthogonal to each other. That is, an example in which the optical film 1 is bonded to the window material 10 by using the above-mentioned bonding method of the optical film. In the case when the optical film 1 is bonded to the window material 10 in this manner, the reflection function of the optical film 1 can be effectively exerted. Therefore, many of light rays that have been made incident on the window material 10 from above can be reflected upward. That is, the upward reflectance of the window material 10 can be improved.

FIG. 11B shows an example of a building 600 in which an optical film 1 is bonded to a window material 10 in such a manner that the ridge-line direction $D_R$ of first structural elements 4m within the incident surface of the optical film 1 and the height direction $D_H$ of the building are not made orthogonal to each other, but made diagonal to each other. In the case when the optical film 1 is bonded to the window material 10 in this manner, it becomes difficult to allow the reflection function of the optical film 1 to be effectively exerted. Therefore, the ratio at which light rays that have been made incident on the window material 10 from above are reflected downward increases. That is, the upward reflectance of the window material 10 is lowered.

[Master Disc]

Figure 12:
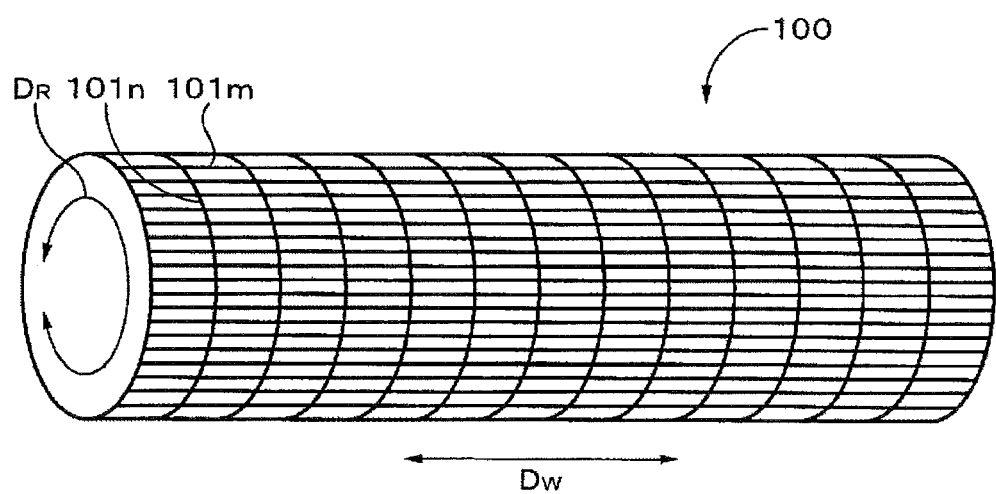
FIG. 12 is a perspective view showing one structural example of a master disc for use in manufacturing the optical film in accordance with the first embodiment of the present technique.

FIG. 12 is a perspective view showing one structural example of a master disc for use in manufacturing the optical film in accordance with the first embodiment of the present technique. As shown in FIG. 12, a roll-shaped master disc 100 has a column surface, and a concavo-convex surface serving as a molding surface is formed on the column surface. By transferring this concavo-convex surface onto a film or the like, a concavo-convex surface 4b of the first optical film 4 is molded. The concavo-convex surface of the roll-shaped master disc 100 is composed of a plurality of first grooves 101m and a plurality of second grooves 101n. The first grooves 101m are used for molding the first structural elements 4m of the optical layer 4, and have a concavo-convex shape inverted to that of the first structural elements 4m. On the other hand, the second grooves 101n are used for molding the second structural elements 4n of the first optical layer 4, and have a concavo-convex shape inverted to that of the second structural elements 4n.

Figure 13:
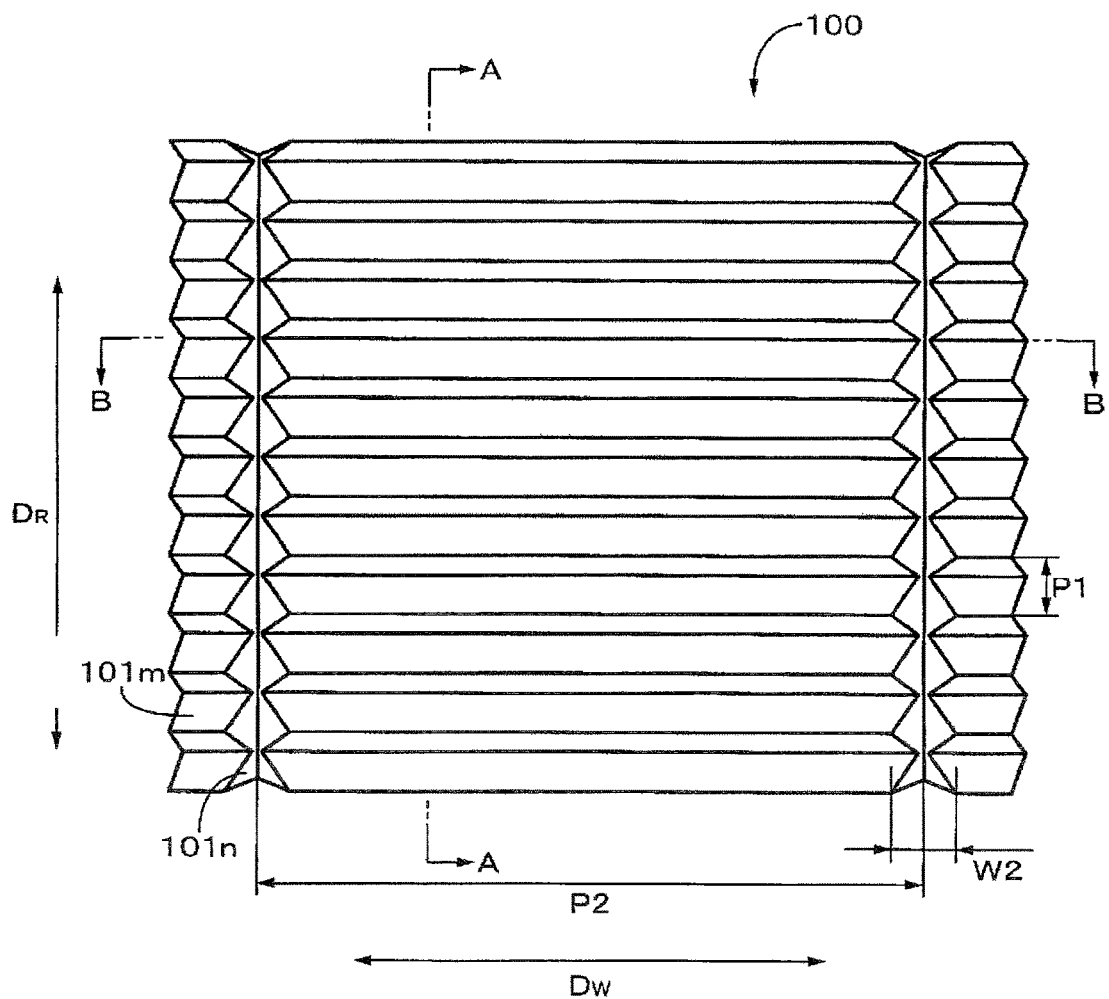
FIG. 13 is a plan view showing one shape example of a molding surface of the master disc.
Figure 14A:
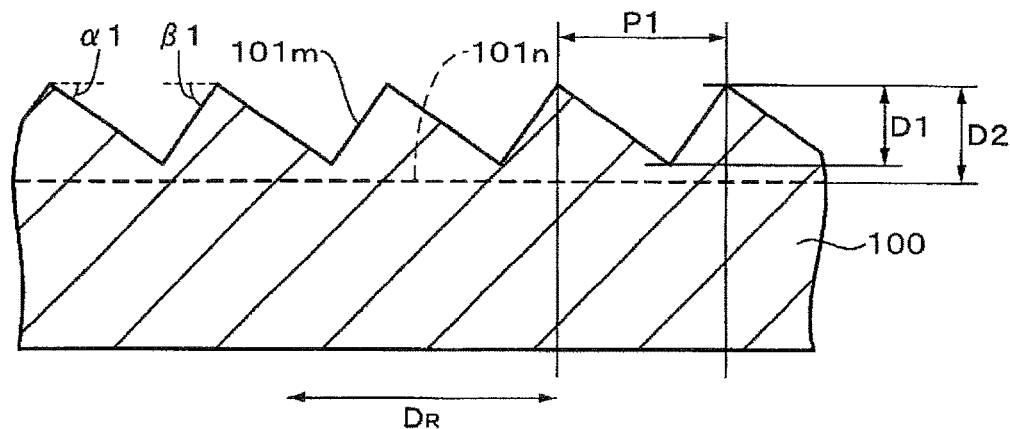
FIG. 14A is a cross-sectional view showing one shape example of a molding surface in a circumferential direction of the master disc.
Figure 14B:
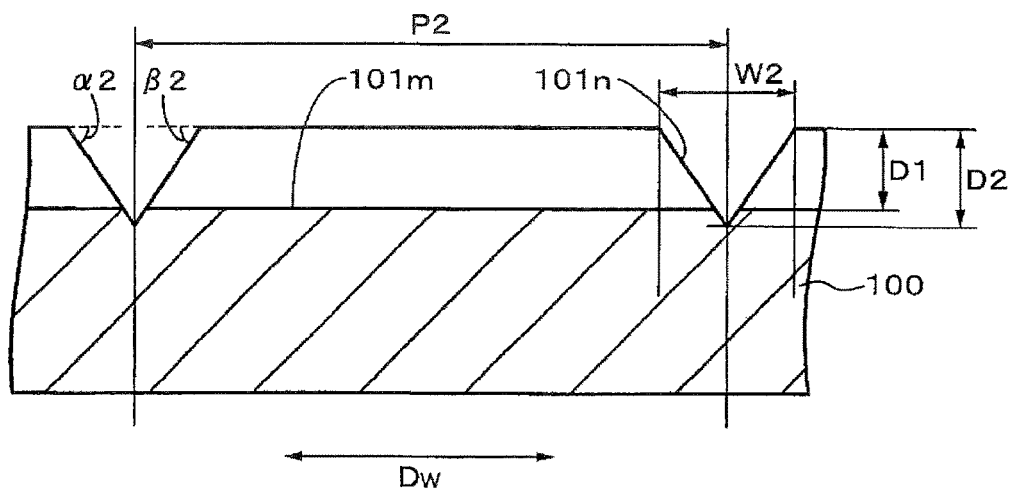
FIG. 14B is a cross-sectional view showing one shape example of a molding surface in a width direction of the master disc.

FIG. 13 is a plan view showing one shape example of a molding surface of the master disc. FIG. 14A is a cross-sectional view showing one shape example of a molding surface in a circumferential direction of the master disc. FIG. 14B is a cross-sectional view showing one shape example of the molding surface in a width direction of the master disc. The first grooves 101m are grooves that extend, for example, in a width direction (axis direction) $D_W$ of the master disc 100, and are one-dimensionally arranged so as to be adjacent to one another in the circumferential direction $D_R$ of the master disc 100. The second grooves 101n are grooves that extend, for example, in a circumferential direction $D_R$ of the master disc 100, and are one-dimensionally arranged so as to be spaced apart from one another in the width direction (height direction) $D_W$ of the master disc 100. That is, on the molding surface of the master disc 100, the first grooves 101m and the second grooves 101n have such a relationship so as to be orthogonal to each other.

The depth D2 of the second grooves 101n is preferably made to be deeper than the depth D1 of the first grooves 101m. A difference ΔD (=D2−D1) between the depth D2 of the second grooves 101n and the depth D1 of the first structural elements is preferably set to 0.5 μm or more to 25 μm or less, more preferably, to 2 μm or more to 15 μm or less, and most preferably, to 3 μm or more to 6 μm or less.

Supposing that the pitch of the second grooves 101n is P2 and that the groove width of the second grooves 101n is W2, the pitch P2 is preferably set to 10×W2 or more, more preferably, to 20×W2 or more, and most preferably to 25×W2 or more.

Moreover, the pitch P2 of the second grooves 101n is preferably set to 200 μm or more, more preferably, to 250 μm or more, and most preferably, to 300 μm or more.

The pitch P2 of the second grooves 101n is preferably set to 5 mm or less, more preferably, to 3 mm or less, and most preferably, to 1 mm or less.

Therefore, the pitch P2 of the second grooves 101n is preferably set to 10×W2 or more to 5 mm or less, more preferably, to 20×W2 or more to 3 mm or less, and most preferably, to 25×W2 or more to 1 mm or less. Moreover, the pitch P2 of the second grooves 101n is preferably set to 250 µm or more to 5 mm or less, more preferably, to 300 µm or more to 3 mm or less, and most preferably, to 200 µm or more to 1 mm or less.

The inclination α2 of the first inclined surface of the second grooves 101n and the inclination β2 of the second inclined surface are preferably set to 65° or less, and more preferably, to 60° or less. The inclination α2 of the first inclined surface of the second grooves 101n and the inclination β2 of the second inclined surface are preferably set to 30° or more, and more preferably, to 45° or more. Therefore, the inclination α2 of the first inclined surface of the second grooves 101n and the inclination β2 of the second inclined surface are preferably set to 30° or more to 65° or less, and more preferably, to 45° or more to 60° or less.

A difference between the inclinations of the inclined surfaces of the first grooves 101m and the second grooves 101n is preferably set to ±15° or less, more preferably, to ±10° or less, and most preferably, to ±5° or less. In the case when there are a plurality of kinds of inclined surfaces of the first grooves 101m, a declination from the surface having the closest inclination is taken into consideration.

[Manufacturing Device for Optical Film]

Figure 15:
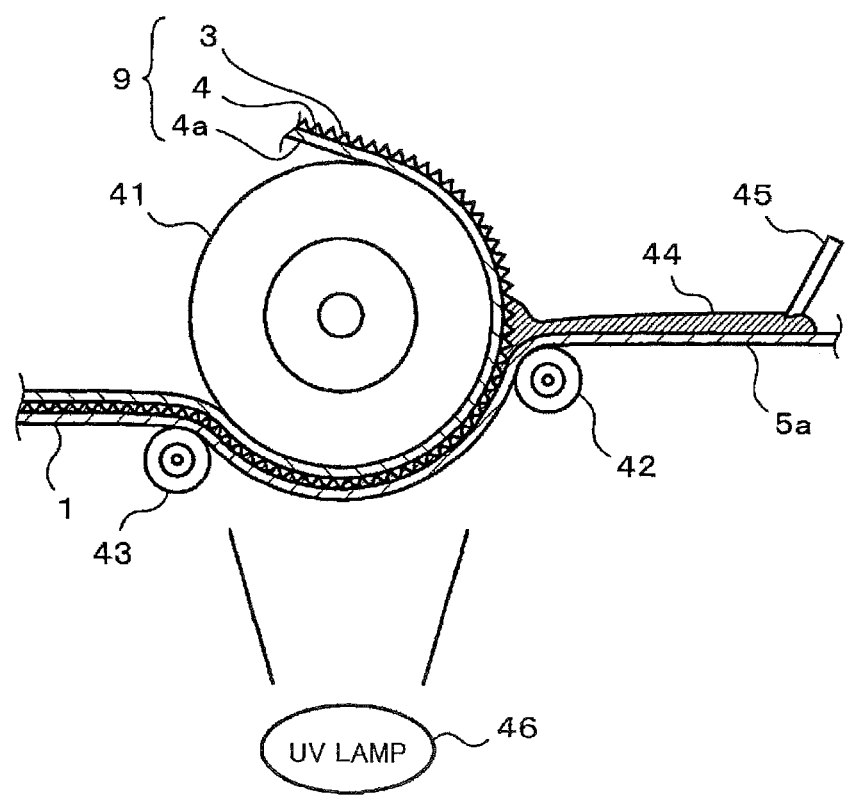
FIG. 15 is a schematic drawing that shows one structural example of a manufacturing device for use in manufacturing the optical film in accordance with the first embodiment.

FIG. 15 is a schematic view showing one structural example of a manufacturing device for manufacturing the optical film relating to the first embodiment of the present invention. As shown in FIG. 15, this manufacturing device is provided with laminate rolls 41 and 42, guide rolls 43, a coating device 45 and an irradiation device 46.

The laminate rolls 41 and 42 are designed so as to nip the optical layer 9 with a reflection layer and a second substrate 5a. In this case, the optical layer 9 with the reflection layer has a structure in which the wavelength-selective reflection layer 3 is film-formed on one of the main surfaces of the first optical layer 4. Additionally, as the optical layer 9 with the reflection layer, a first substrate 4a may be formed on the other main surface on the side opposite to the surface on which the wavelength-selective reflection layer 3 of the first optical layer 4 is formed. In this example, the wavelength-selective reflection layer 3 is film-formed on the one of the main surfaces of the first optical layer 4, and the first substrate 4a is formed on the other main surface. The guide rolls 43 are disposed on a transporting path inside the manufacturing device so as to transport a belt-like optical film 1. The materials for the laminate rolls 41 and 42 and the guide rolls 43 are not particularly limited, and in accordance with desired roll characteristics, metal such as stainless steel, rubber, silicone and the like are selected on demand and may be used.

As the coating device 45, for example, a device provided with a coating means such as a coater or the like may be used. As the coater, for example, by taking into consideration physical properties or the like of the resin composition to be coated, a desired coater, such as a gravure coater, a wire bar coater or a die coater, may be selected and used on demand. The irradiation device 46 is an irradiation device that applies an ionizing ray, such as, for example, an electron beam, an ultraviolet ray, a visible ray or a gamma ray. In this example, as the irradiation device 46, a UV lamp for applying an ultraviolet ray is illustrated.

[Manufacturing Method for Optical Film]

Referring to FIGS. 15 to 18, the following description will discuss one example of a method for manufacturing an optical film relating to the first embodiment of the present invention. Additionally, one portion or the entire portion of the manufacturing process shown below is preferably carried out by a roll-to-roll process from the viewpoint of productivity. However, a manufacturing process for metal molds is omitted.

Figure 16A:
FIGS. 16A to 16C are process drawings for use in explaining one example of a manufacturing method of the optical film relating to the first embodiment.
Figure 16B:
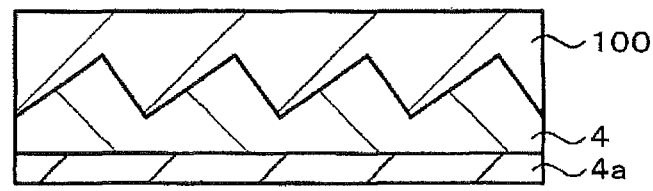

First, as shown in FIG. 16A, a concavo-convex surface composed of a plurality of first grooves 101m and a plurality of second grooves 101n is formed on a surface of a master disc (metal mold (replica)) 100 by using, for example, a bite machining process or a laser machining process. Next, as shown in FIG. 16B, by using, for example, a melt extrusion method, a transferring method, or the like, the shape of the concavo-convex surface of the master disc 100 is transferred onto a film-shaped resin material. As the transferring method, a method in which an energy-ray setting-type resin is poured into a mold and cured by applying an energy ray thereto, a method in which heat and pressure are applied to a resin so as to transfer the shape, or a method (laminate transferring method) in which a resin film is supplied from a roll and the shape of a mold is transferred thereon while applying heat thereto is proposed. Thus, as shown in FIG. 16C, a first optical layer 4 having a concavo-convex surface 4b on one of its main surfaces is formed.

Figure 16C:
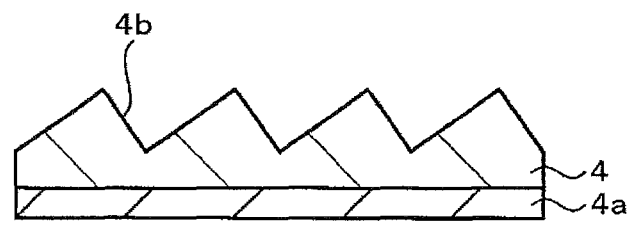

Moreover, as shown in FIG. 16C, the first optical layer 4 may be formed on the first substrate 4a. In this case, for example, a method is used in which a film-shaped first substrate 4a is supplied from a roll, and after an energy-ray setting-type resin has been applied onto the substrate, a mold is pressed thereon so as to transfer the shape of the mold, while the resin is cured by applying an energy ray thereto. Additionally, the resin preferably further contains a cross-linking agent. Thus, it becomes possible to provide heat resistance to the resin without causing a great change in the storage elastic modulus at room temperature.

Figure 17A:
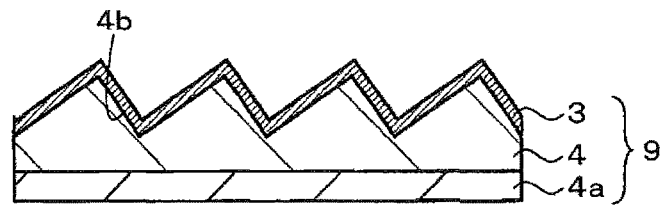
FIGS. 17A to 17C are process drawings for use in explaining one example of a manufacturing method of the optical film relating to the first embodiment.
Figure 17B:
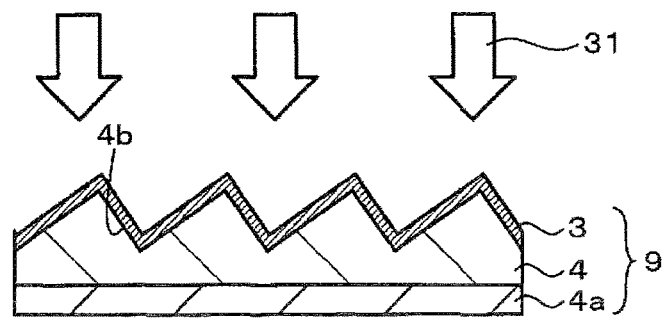

Next, as shown in FIG. 17A, the wavelength-selective reflection layer 3 is film-formed on one of the main surfaces of the first optical layer 4. As the film-forming method of the wavelength-selective reflection layer 3, for example, a sputtering method, a vapor deposition method, a CVD (Chemical Vapor Deposition) method, a dip coating method, a die coating method, a wet coating method, a spray coating method, and the like are proposed, and from these film-forming methods, an appropriate method is selected on demand in accordance with the shape or the like of the concavo-convex surface 4b of the first optical layer 4. Next, as shown in FIG. 17B, an annealing process 31 is applied to the wavelength-selective reflection layer 3, if necessary. The temperature of the annealing process is, for example, set in a range from 100° C. or more to 250° C. or less.

Figure 17C:
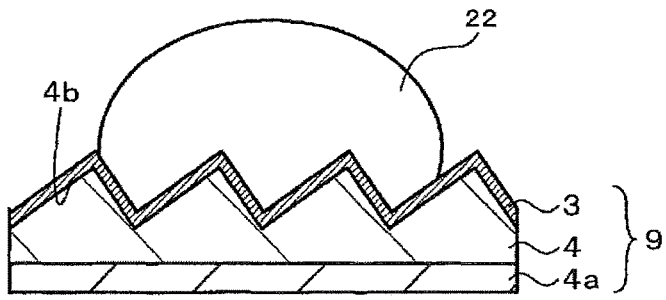
Figure 18A:
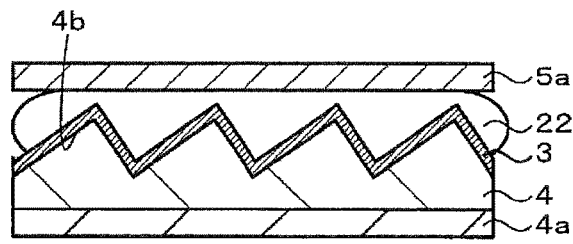
FIGS. 18A to 18C are process drawings for use in explaining one example of a manufacturing method of the optical film relating to the first embodiment.
Figure 18B:
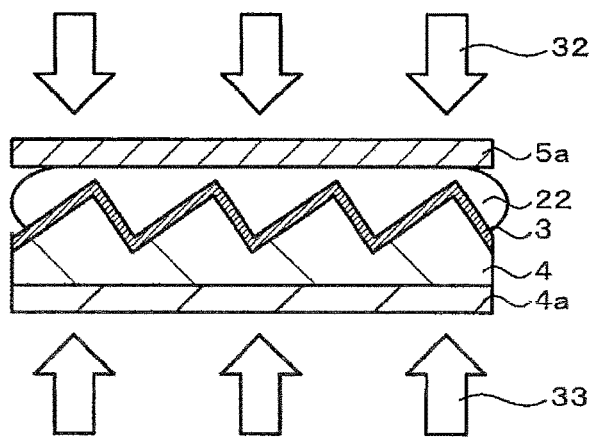
Figure 18C:
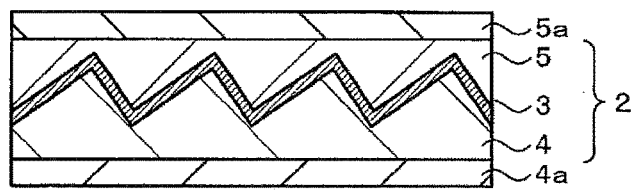

Next, as shown in FIG. 17C, a resin 22 in an uncured state is applied onto the wavelength-selective reflection layer 3. As the resin 22, for example, an energy-ray setting-type resin, a thermosetting resin, or the like may be used. As the energy-ray setting-type resin, an ultraviolet-ray setting resin is preferably used. Next, as shown in FIG. 18A, by covering the second substrate 5a on the resin 22, a laminated body is formed. Then, as shown in FIG. 18B, the resin 22 is cured by using, for example, an energy ray 32 or a heating process 32, while applying pressure 33 onto the laminated body. As the energy ray, for example, an electron beam, an ultraviolet ray, a visible light ray, a gamma ray, an electron beam, or the like may be used, and from the viewpoint of productivity, the ultraviolet ray is preferably used. The integrated irradiation amount is preferably selected on demand by taking into consideration the curing characteristic of the resin, yellowing suppression of the resin and the substrate, or the like. The pressure to be applied to the laminated body is preferably set in a range from 0.01 MPa or more to 1 MPa or less. In the case of less than 0.01 MPa, a problem is raised in a film running property. On the other hand, in the case when 1 MPa is exceeded, it becomes necessary to use metal rolls as the nip rolls, and this is undesirable because uneven pressure tends to be generated. As described above, the second optical layer 5 is formed on the wavelength-selective reflection layer 3 as shown in FIG. 18C, and the optical film 1 is obtained.

The following description will discuss a formation method of the optical film 1 by the use of the manufacturing device shown in FIG. 15 more specifically. First, from a substrate supply roll, not shown, the second substrate 5a is sent, and the second substrate 5a thus sent passes below the coating device 45. Next, onto the second substrate 5a passing below the coating device 45, an ionizing ray setting resin 44 is applied by the coating device 45. Next, the second substrate 5a to which the ionizing ray setting resin 44 has been applied is transported toward the laminate rolls 41 and 42. On the other hand, the optical layer 9 with a reflection layer attached thereto is sent from an optical layer supply roll, not shown, and transported toward the laminate rolls 41 and 42.

Next, the second substrate 5a thus transported and the optical layer 9 with the reflection layer are sandwiched by the laminate rolls 41 and 42 in a manner so as not to allow air bubbles to be mingled between the second substrate 5a thus transported and the optical layer 9 with the reflection layer, so that the optical layer 9 with the reflection layer is laminated onto the second substrate 5a. At this time, paths for allowing the ionizing ray setting resin 44 to flow may be formed in a running direction of the optical layer 9 with the belt-shaped reflection layer, that is, in a longitudinal direction of the optical layer 9 with the belt-shaped reflection layer. Therefore, it is possible to prevent stripe-like film-thickness irregularities from occurring in the longitudinal direction of the belt-shaped optical film 1 to be manufactured.

Next, the second substrate 5a laminated with the optical layer 9 with the reflection layer is transported along the outer circumferential face of the laminate roll 41, with an ionizing ray being applied onto the ionizing ray setting resin 44 from the second substrate 5a side by the irradiation device 46 so that the ionizing ray setting resin 44 is cured. Thus, the second substrate 5a and the optical layer 9 with the reflection layer are bonded to each other, with the ionizing ray setting resin 44 being interposed therebetween, so that a target elongated optical film 1 is produced. Next, the belt-like optical film 1 thus produced is wound around a winding roll, not shown. Thus, a material roll formed by winding the belt-like optical film 1 therearound is obtained.

The cured first optical layer 4 is preferably set so as to have a storage elastic modulus of $3\times10^7$ Pa or more at $(t-20)°$ C. supposing that a process temperature at the time of the above-mentioned second optical layer formation is t ° C. In this case, for example, the process temperature t refers to a heating temperature of the laminate roll 41. The first optical layer 4 is formed, for example, on the first substrate 4a, and transported along the laminate roll 41 with the first substrate 4a interposed therebetween; therefore, it has been known from experience that the temperature to be actually applied onto the first optical layer 4 is about $(t-20)°$ C. For this reason, by setting the storage elastic modulus of the first optical layer 4 at $3\times10^7$ Pa or more at $(t-20)°$ C., it is possible to prevent the concavo-convex shape on the interface inside the optical layer from being deformed by heat or heat and pressure.

Moreover, in the first optical layer 4, its storage elastic modulus at 25° C. is preferably set to $3\times10^9$ Pa or less. Thus, it is possible to impart flexibility at room temperature to the optical film. Therefore, the optical film 1 can be manufactured by using a manufacturing process such as a roll-to-roll process, or the like.

Additionally, the process temperature t is preferably set to 200° C. or less when the heat resistance of a resin for use in the optical layer or the substrate is taken into consideration. However, by using a resin having a high heat resistance, the process temperature t may be set to 200° C. or more.

[Effects]

In the first embodiment, the concavo-convex surface of the first optical layer 4 is made of a plurality of structural elements 4m that extend in a first direction D1 and a plurality of second structural elements 4n that extend in a second direction D2 that orthogonally intersects with the first direction D1, and are disposed to be spaced apart from each other. With this structure, in the case when after the wavelength-selective reflection layer 3 has been formed on the concavo-convex surface of the first optical layer 4, the concavo-convex surface is enclosed and buried with a resin composition or the like so as to improve its transparency, paths that allow the resin composition or the like for use in the enclosing and burying process to flow therethrough can be formed in a second direction D2 that is orthogonal to the extending direction of the first structural elements 4m. Therefore, it becomes possible to suppress stripe-like film-thickness irregularities from occurring in the second direction D2 that is orthogonal to the extending direction of the first structural elements 4m. For example, in the case when the first optical layer 4 has a belt-like or rectangular shape having a width direction $D_W$ and a longitudinal direction $D_L$, the paths through which the resin composition for use in the enclosing and burying process flow can be formed in the longitudinal direction $D_L$ of the first optical layer 4 so that it becomes possible to suppress stripe-like film-thickness irregularities from occurring in the longitudinal direction $D_L$ of the first optical layer 4.

In the case when the extending direction of the second grooves 101n that orthogonally intersect with the first grooves 101m is virtually in parallel with the running direction of the film, upon machining a roll-shaped master disc 100, the second grooves 101n can be machined, while the roll-shaped master disc 100 is being rotated, with a cutting bite being fixed; therefore, the second grooves 101n can be easily formed on the surface of the roll-shaped master disc 100.

In the case when the second structural elements 4n protrude furthest of the concavo-convex surface of the first optical layer 4, each of the tip portions is preferably formed into an R-shape. Thus, it becomes possible to prevent the tip portion of each of the second structural elements 4n from deteriorating in its shape due to a tightly winding process when the first optical layer 4 is manufactured by using a roll-to-roll process.

<Modified Example>

The following description will discuss a modified example of the above-mentioned embodiment.

Figure 19A:
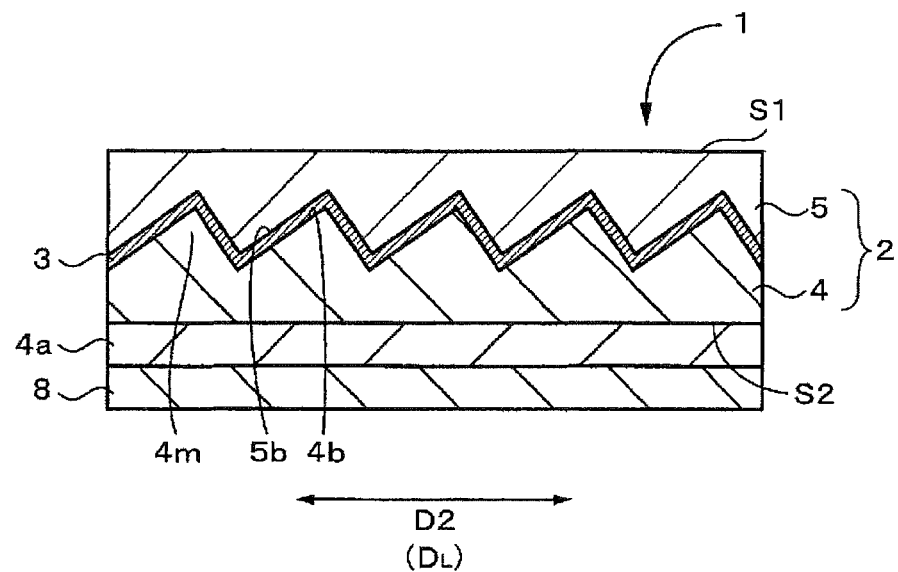
FIG. 19A is a cross-sectional view showing an optical film in a second direction relating to a modified example of the first embodiment.
Figure 19B:
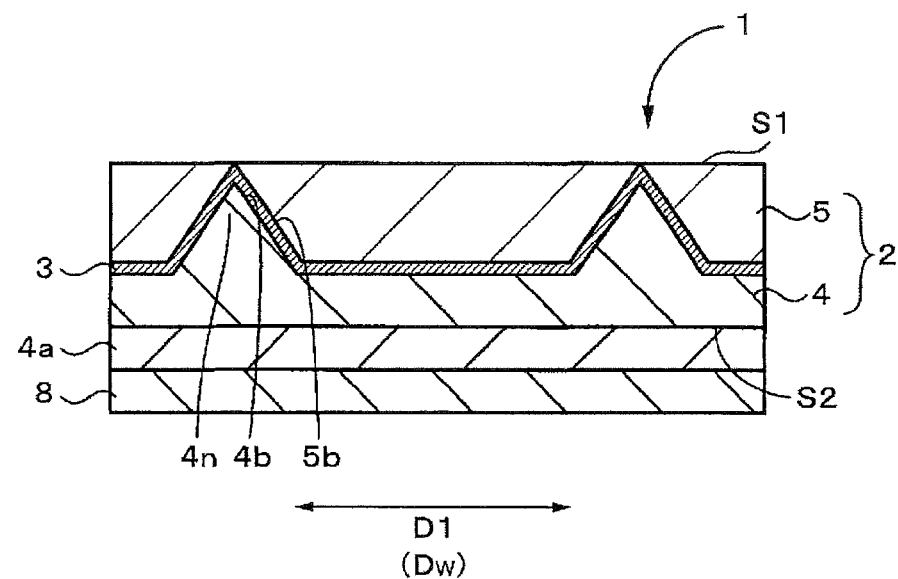
FIG. 19B is a cross-sectional view showing the optical film in a first direction relating to the modified example of the first embodiment.

FIG. 19A is a cross-sectional view in a second direction of an optical film relating to a modified example of the first embodiment. FIG. 19B is a cross-sectional view in a first direction of the optical film relating to the modified example of the first embodiment. In the optical film 1 in accordance with this modified example, as shown in FIG. 19A and FIG. 19B, the position of an apex portion of each of the convex shapes of the concavo-convex surface 4b of the first optical layer 4 with the wavelength-selective reflection layer 3 formed thereon is designed so as to have virtually the same height as that of the incident surface S1 of the first optical layer 4. Additionally, FIGS. 19A and 19B show a structure in which the height of the second structural elements 4n is higher than the height of the first structural elements 4m, with the apex portion of each of the second structural elements 4n being located closer to the incident surface S1 in comparison with the apex portion of each of the first structural elements 4m.

Moreover, in place of the wavelength-selective reflection layer 3, a high reflectance layer may be used. The high reflectance layer is a layer having a high reflectance that directionally reflects almost all light rays L that are made incident on the incident surface S1, for example, with an incident angle (θ, φ), in directions other than the direction of regular reflection (−θ, φ+180°) (see FIG. 2). The high reflectance layer is, for example, a metal layer having a high reflectance, and its reflectance is preferably set to 30% or more at a wavelength of 1500 nm. As the material for the high reflectance layer, for example, simple substances, such as Au, Ag, Cu, Al, Ni, Cr, Ti, Pd, Co, Si, Ta, W, Mo, Ge, or the like, or an alloy containing two kinds or more of these simple substances may be used. From the viewpoint of practical use, among these, an Ag-based, Cu-based, Al-based, Si-based or Ge-based material is preferably used. Moreover, in order to suppress corrosion in the high reflectance layer, another material, such as Ti, Nd or the like, is preferably added to the high reflectance layer. Furthermore, a metal nitride layer may also be used as the high reflectance layer, and as the material for the metal nitride layer, for example, TiN, CrN, WN or the like may be used. The film thickness of the high reflectance layer may be set, for example, in a range of 10 nm or more to 200 nm or less; however, the range is not particularly limited by this, as long as it provides a high reflectance.

<2. Second Embodiment>

Figure 20:
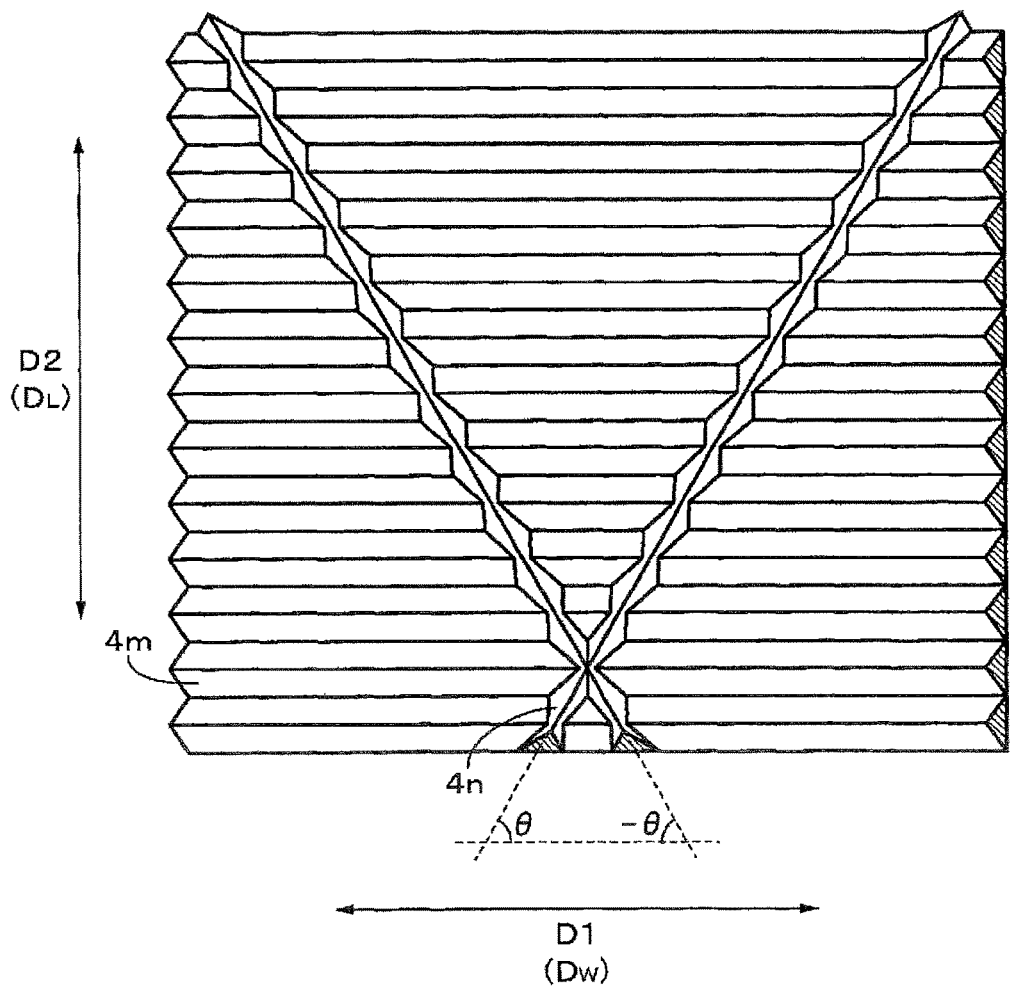
FIG. 20 is a plan view showing one shape example of a concavo-convex surface of a first optical layer of an optical film in accordance with a second embodiment.

FIG. 20 is a plan view showing a shape example of a concavo-convex surface of a first optical layer of an optical film in accordance with a second embodiment. In the second embodiment, two directions that diagonally intersect with each other within a concavo-convex surface of a first optical layer 4 are referred to as a first direction D1 and a second direction D2. In the case when the first optical layer 4 has a rectangular shape having two pairs of opposed sides, the first direction D1 preferably corresponds to the extending direction of the sides of one of the pairs of the two pairs of the sides. In the case when the first optical layer 4 has a band shape or a rectangular shape with a width direction $D_W$ and a longitudinal direction $D_L$, the first direction D1 preferably corresponds to the width direction $D_W$ of the first optical layer 4.

As shown in FIG. 20, the optical film in accordance with the second embodiment differs from that of the first embodiment in that the first direction D1 corresponding to the extending direction of the first structural elements 4m and the second direction D2 corresponding to the extending direction of the second structural elements 4n are allowed to diagonally intersect with each other.

In the case when the first optical layer 4 has a band shape or a rectangular shape with the width direction $D_W$ and the longitudinal direction $D_L$, the first structural elements 4m and the second structural elements 4n are preferably provided with the following configuration. That is, the first structural elements 4m are structural elements that extend in the width direction $D_W$ of the first optical layer 4, and are one-dimensionally arranged so as to be adjacent to one another in the longitudinal direction $D_L$ of the first optical layer 4. On the other hand, the second structural elements 4n are structural elements that extend in a diagonal direction relative to the longitudinal direction $D_L$ of the first optical layer 4, and are one-dimensionally arranged so as to be spaced apart from one another in a direction orthogonal to the diagonal direction. That is, on the surface of the first optical layer 4, the first structural elements 4m and the second structural elements 4n have such a relationship as to diagonally intersect with each other.

In this case, an angle made by the first direction D1 and the second direction D2 is preferably set in a range from 45° or more to less than 90°, more preferably, from 60° or more to less than 90°, most preferably, from 75° or more to less than 90°, and by far the most preferably, from 85° or more to less than 90°. By setting the range to 45° or more, the effect for suppressing the generation of stripe-like film-thickness irregularities tends to be improved.

When the angle made by the first direction D1 and the second direction D2 is defined including the case in which the first direction D1 and the second direction D are made orthogonal to each other in the first embodiment, the resulting angle is preferably set in a range from 45° or more to 90° or less, more preferably, from 60° or more to 90° or less, most preferably, from 75° or more to 90° or less, and by far the most preferably, from 85° or more to 90° or less. In the case when the resulting angle is in by far the most preferable range (from 85° or more to 90° or less), the first direction D1 and the second direction D2 have such a relationship as to be virtually orthogonal to each other.

It is not necessary for all the plural second structural elements 4n to be extended in the same extending direction, and the second plural structural elements 4n may be extended in two or more directions different from one another. FIG. 20 shows an example in which the plural second structural elements 4n are extended in two directions, that is, a second direction having an angle θ relative to the extending direction of the first structural elements 4m and a third direction having an angle −θ relative thereto. Additionally, in the case when the configuration in which the plural second structural elements 4n are extended in two or more directions different from one another is adopted, such a configuration in which the plural second structural elements 4n are extended so as not to intersect with one another is preferably adopted. Thus, when the concavo-convex surface of the first optical layer 4 is enclosed and buried by a resin composition or the like, it becomes possible to prevent a flow of the resin composition or the like to be used in the enclosing and burying process from being interrupted by the intersecting portions of the mutual second structural elements 4n.

The roll-shaped master disc 100 for use in molding the first optical layer 4 having the above-mentioned configuration is manufactured, for example, in the following processes. First, by repeating a process for shifting a cutting bite in the width direction $D_W$ of the roll-shaped master disc, a plurality of first grooves 101m are fondled. Next, in synchronism with the rotation of the roll-shaped master disc 100, by repeating a process for shifting the cutting bite in the width direction $D_W$ of the roll-shaped master disc 100, a plurality of second grooves 101n, which diagonally intersect with the plural first grooves 101m, are formed.

<3. Third Embodiment>

The third embodiment differs from the first embodiment in that although a light ray having a specific wavelength is directionally reflected, light rays having wavelengths other than the specific wavelength are scattered. The optical film 1 is provided with a light scattering body that scatters an incident light ray. This light scattering body is installed, for example, at least one place among the surface of the optical layer 2, the inside of the optical layer 2 and a gap between the wavelength-selective reflection layer 3 and the optical layer 2. The light scattering body is preferably installed, for example, at least one place among the gap between the wavelength-selective reflection layer 3 and the first optical layer 4, the inside of the first optical layer 4 and the surface of the first optical layer 4. In the case when the optical film 1 is bonded to a support member such as a window material, it may be applicable to either one of an indoor side and an outdoor side. In the case when the optical film 1 is bonded to the outdoor side, the light scattering body for scattering light other than that having a specific wavelength is preferably installed only between the wavelength-selective reflection layer 3 and a support member such as a window material. This is because when the light scattering body is located between the wavelength-selective reflection layer 3 and the incident surface, the directional reflection characteristic tends to be lost. Moreover, in the case when the optical film 1 is bonded to the indoor side, the light scattering body is preferably installed between a light-releasing surface on the side opposite to the corresponding bonding surface and the wavelength-selective reflection layer 3.

Figure 21A:
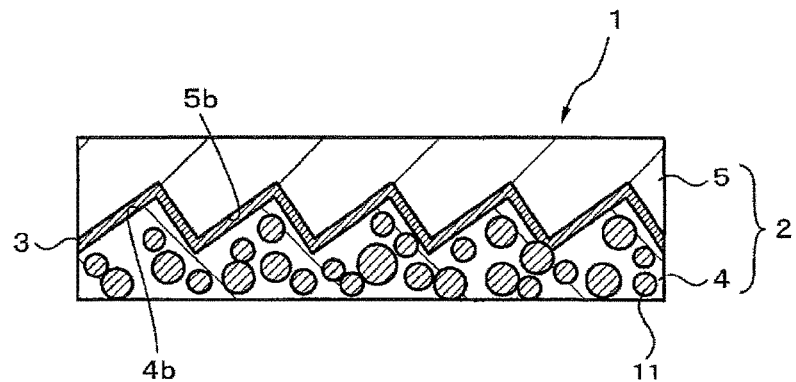
FIG. 21A is a perspective view showing a first structural example of an optical film in accordance with a third embodiment.

FIG. 21A is a cross-sectional view showing a first structural example of the optical film 1 in accordance with the third embodiment. As shown in FIG. 21A, the first optical layer 4 contains a resin and fine particles 11. The fine particles 11 have a refractive index different from that of the resin that is a main constituent material of the first optical layer 4. As the fine particles 11, for example, at least one kind of organic fine particles and inorganic fine particles may be used. Moreover, as the fine particles 11, hollow fine particles may be used. Examples of the fine particles 11 include inorganic fine particles, such as silica, alumina, or the like, or organic fine particles, such as styrene or acrylic materials, copolymers thereof, or the like; and in particular, silica fine particles are preferably used.

Figure 21B:
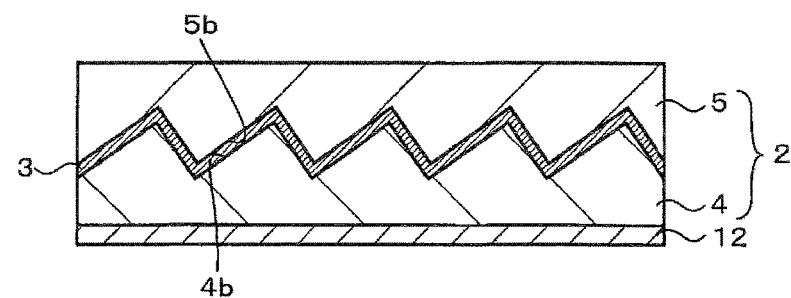
FIG. 21B is a perspective view showing a second structural example of the optical film in accordance with the third embodiment.

FIG. 21B is a cross-sectional view showing a second structural example of the optical film 1 in accordance with the third embodiment. As shown in FIG. 21B, the optical film 1 is further provided with a light diffusion layer 12 on the surface of the first optical layer 4. The light diffusion layer 12 contains, for example, a resin and fine particles. As the fine particles, the same fine particles as those of the first example may be used.

Figure 21C:
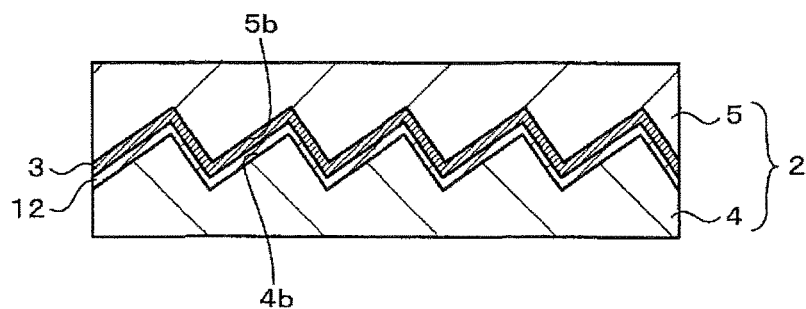
FIG. 21C is a perspective view showing a third structural example of the optical film in accordance with the third embodiment.

FIG. 21C is a cross-sectional view showing a third structural example of the optical film 1 in accordance with the third embodiment. As shown in FIG. 21C, the optical film 1 is further provided with a light diffusion layer 12 between the wavelength-selective reflection layer 3 and the first optical layer 4. The light diffusion layer 12 contains, for example, a resin and fine particles. As the fine particles, the same fine particles as those of the first example may be used.

In accordance with the third embodiment, a light ray having a predetermined wavelength band such as an infrared ray or the like can be directionally reflected, while light rays having wavelengths other than the predetermined wavelength, such as visible light-rays or the like, can be scattered. Therefore, the optical film 1 is allowed to become foggy so that it is possible to impart a designing property to the optical film 1

<4. Fourth Embodiment>

Figure 22:
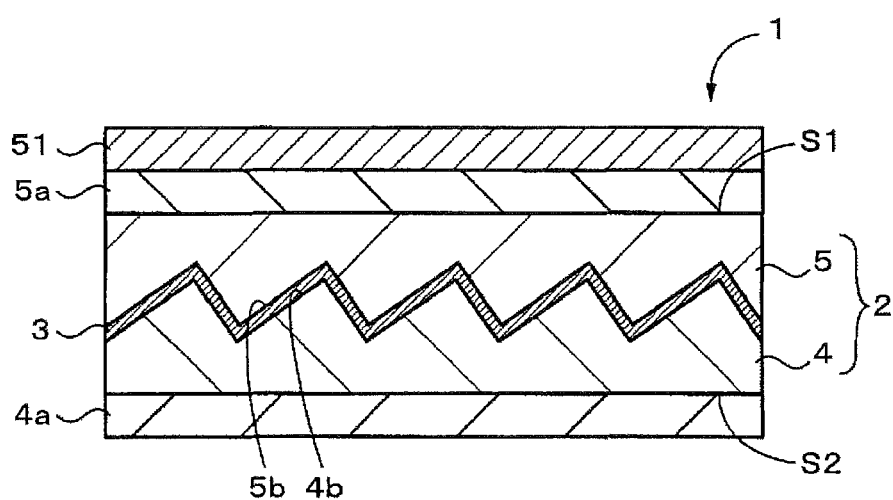
FIG. 22 is a cross-sectional view showing one structural example of an optical film in accordance with a fourth embodiment.

FIG. 22 is a cross-sectional view showing one structural example of an optical film in accordance with a fourth embodiment. The fourth embodiment differs from the first embodiment in that a self-washing effect layer 51 that exerts a washing effect is further placed on an exposed surface on the side opposite to the surface to be bonded to the adherent member of the incident surface S1 and the light-releasing surface S2 of the optical film 1. The self-washing effect layer 51 contains, for example, a photo-catalyst. As the photo-catalyst, for example, $TiO_2$ may be used.

As described above, the optical film 1 has such a characteristic as to reflect incident light rays in a wavelength-selective manner. In the case when the optical film 1 is used outdoors, or in a room or the like with lots of contaminants, since light is scattered by contaminants adhering to the surface to cause reduction in transmitting and reflecting properties, the surface is preferably always kept transparent optically. For this reason, the surface is preferably provided with superior water repellency, hydrophilicity, or the like, with the surface being preferably allowed to exert a washing effect automatically.

In accordance with the fourth embodiment, since the optical film 1 is provided with the self-washing effect layer 51, it is possible to impart water repellency, hydrophilicity, or the like to the incident surface. Therefore, it is possible to suppress contaminants or the like from adhering to the incident surface, and consequently to suppress a reduction of directional reflecting property.

<5. Fifth Embodiment>

The aforementioned first embodiment has been explained by exemplifying a case in which the present invention is applied to the window material or the like; however, the present invention is not intended to be limited by this example, and may be applied to members other than the window material, such as interior members and exterior members. Moreover, not limited only to immovable fixed interior members and exterior members, such as walls, roofs, or the like, the present invention can be applied to a device that can be taken into an indoor space, by moving the interior member or the exterior member so as to adjust the transmission amount and/or reflection amount of solar light in accordance with a change in the amount of solar light caused by seasons and time variations. In the fifth embodiment, as one example of such a device, a solar shading device (blind device), which is capable of adjusting the shading amount of incident light rays by the use of a group of solar shading members by altering the angle of the group of solar shading members composed of a plurality of solar shading members, will be explained.

Figure 23:
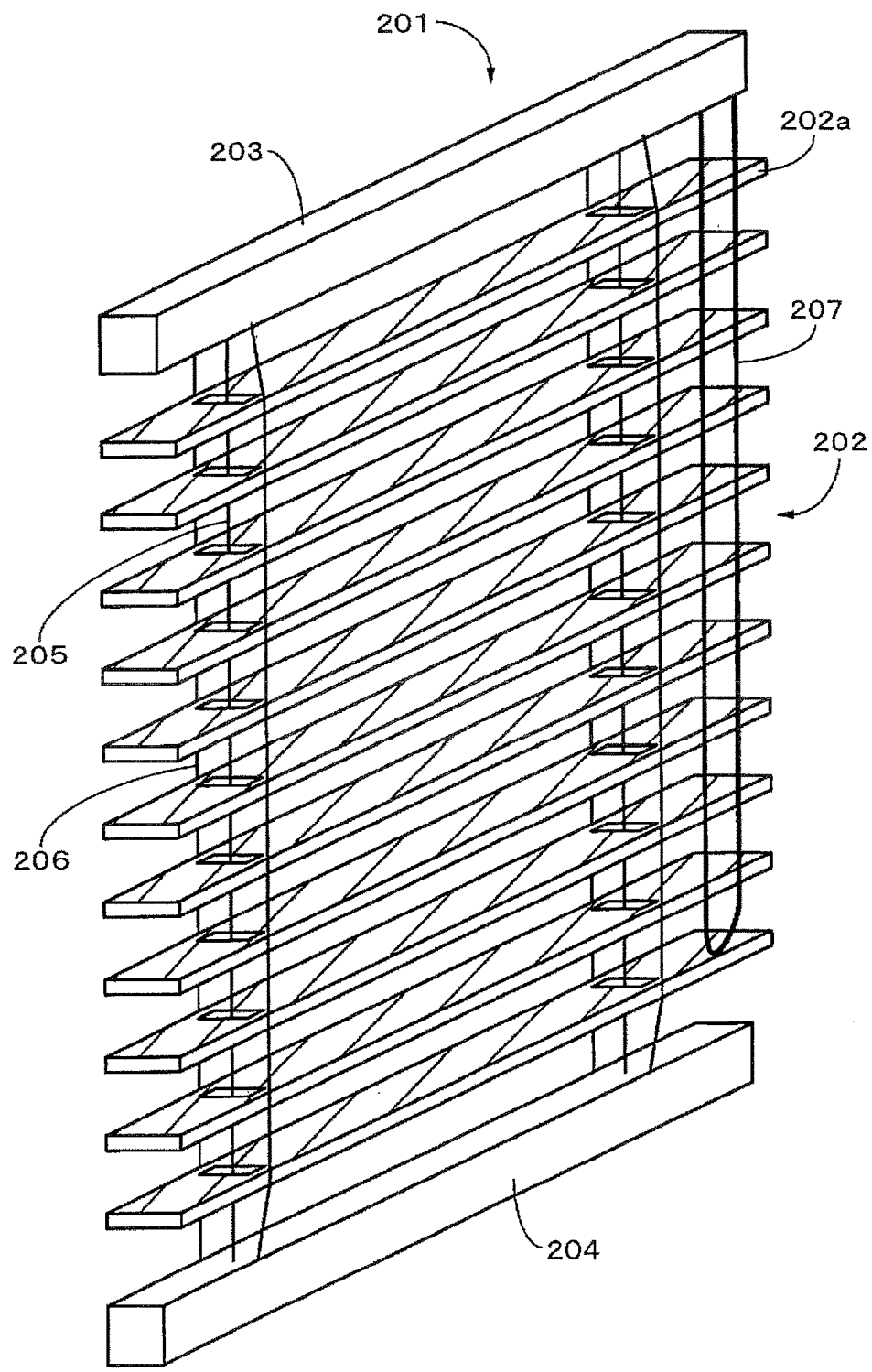
FIG. 23 is a perspective view showing one structural example of a blind device in accordance with a fifth embodiment.

FIG. 23 is a perspective view showing one structural example of a blind device in accordance with the fifth embodiment. As shown in FIG. 23, a blind device 201 serving as the solar shading device is constituted by a head box 203, a group of slats (group of solar shading members) 202 composed of a plurality of slats (blades) 202a and a bottom rail 204. The head box 203 is installed above the group of slats 202 composed of the plural slats 202a. From the head box 203, a ladder code 206 and a lifting code 205 are extended downward, and the bottom rail 204 is suspended at the lower ends of these codes. The slats 202a, each serving as the solar shading member with, for example, a thin elongated rectangular shape, are suspended and supported by the ladder codes 206 that extend downward from the head box 203, with predetermined intervals. Moreover, an operation means (not shown), such as a rod, for use in adjusting the angle of the group of the slats 202 composed of the plural slats 202*a* is attached to the head box 203.

The head box 203 serves as a driving means that adjusts the amount of light to be taken into a space such as the inside of a room, by rotation-driving the group of slats 202 composed of the plural slats 202*a* in response to an operation by the operation means such as the rod. Moreover, the head box 203 also functions as a driving means (raising and lowering means) that raises and lowers the group of slats 202 on demand in accordance with the operation of the operation means such as raising and lowering operation codes 207 or the like.

Figure 24A:
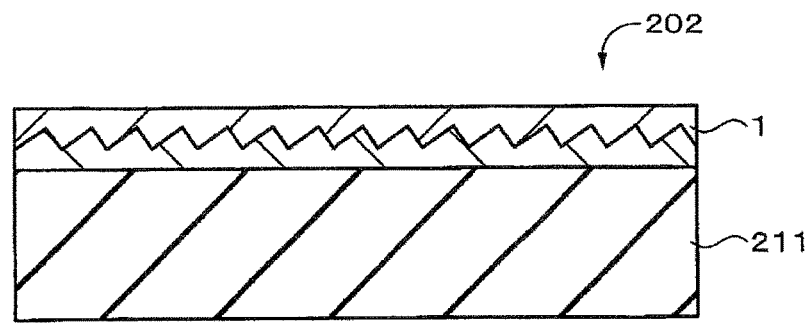
FIG. 24A is a cross-sectional view showing a first structural example of a slat.

FIG. 24A is a cross-sectional view showing a first structural example of the slats. As shown in FIG. 24A, each slat 202*a* is provided with a base member 211 and an optical film 1. Of the two main surfaces of the base member 211, the optical film 1 is preferably formed on the incident surface side (for example, surface side opposed to the window material) on which external light is made incident in a state where the group of slats 202 are closed. The optical film 1 and the base member 211 are bonded to each other, for example, by using a bonding layer such as an adhesive layer or a sticker layer.

As the shape of the base member 211, for example, a sheet shape, a film shape, a plate shape or the like may be used. As the material for the base member 211, for example, glass, a resin material, a paper material, a cloth material or the like may be used, and from the viewpoint of taking visible light into a predetermined space such as the inside of a room, a resin material having a transparent property is preferably used. As the glass, resin material, paper material and cloth material, known materials as the conventional roll screen may be used. As the optical film 1, one kind of the optical films 1 relating to the aforementioned first to fourth embodiments may be used, or two or more kinds of them may be used in combination.

Figure 24B:
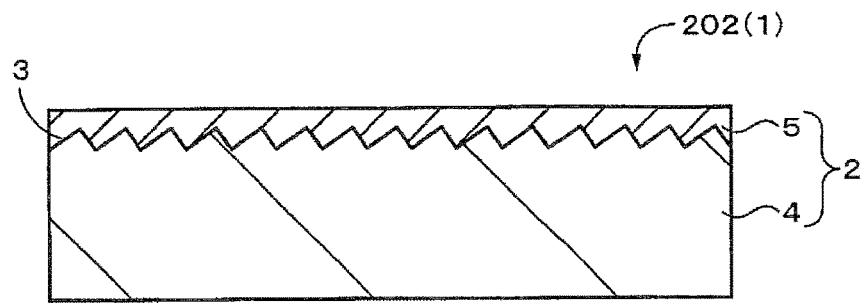
FIG. 24B is a cross-sectional view showing a second structural example of the slat.

FIG. 24B is a cross-sectional view showing a second structural example of the slat. As shown in FIG. 24B, in the second structural example, the optical film 1 is used as the slats 202*a*. The optical film 1 is preferably designed to be supported by the ladder codes 205 and have such a degree of rigidity as to maintain its shape in the supported state.

<6. Sixth Embodiment>

In the sixth embodiment, explanations will be given to a roll screen device that is one example of a solar shading device capable of adjusting the shading amount of incident light by the use of a solar shading member by winding-up or feeding the solar shading member.

Figure 25A:
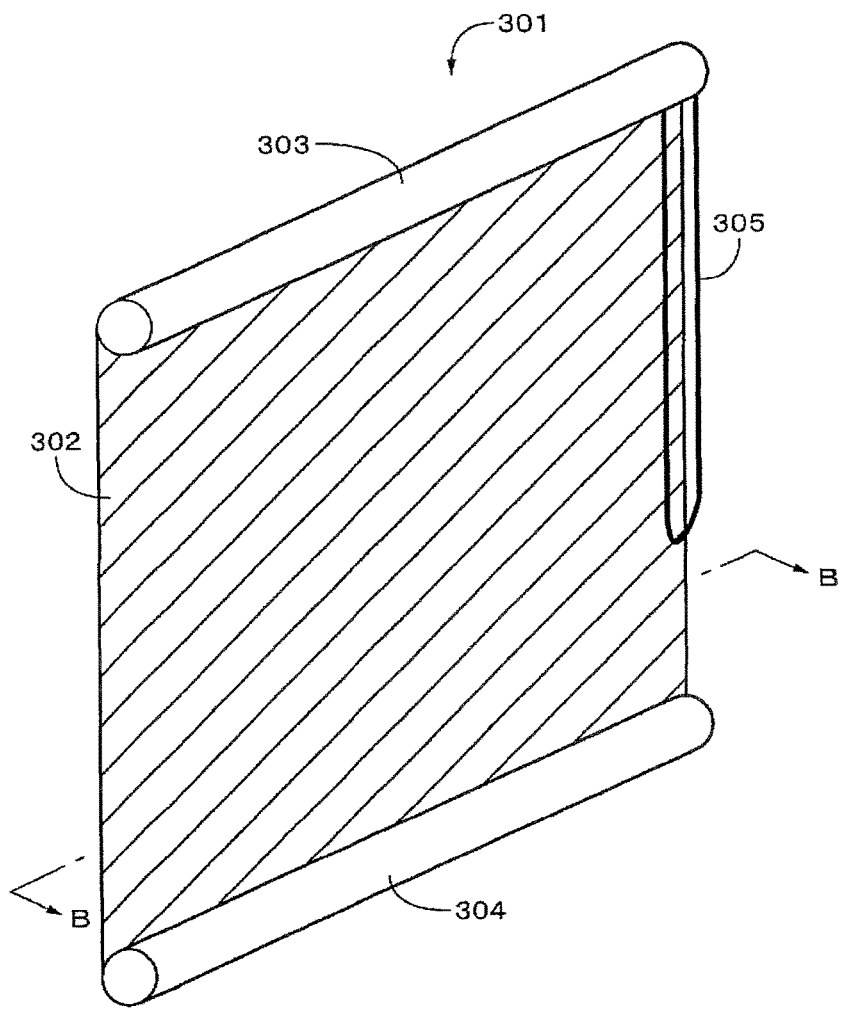
FIG. 25A is a perspective view showing one structural example of a roll screen in accordance with a sixth embodiment.

FIG. 25A is a perspective view showing one structural example of the roll screen device in accordance with the sixth embodiment. As shown in FIG. 25A, a roll screen device 301 serving as the solar shading device is provided with a screen 302, a head box 303 and a core member 304. The head box 303 is designed so as to raise or lower the screen 302 by operating the operation unit such as a chain 305 or the like. The head box 303 is provided with a winding shaft on which the screen is wound or from which the screen is fed, and one of the ends of the screen 302 is joined to the winding shaft. The core member 304 is joined to the other end of the screen 302. The screen 302 has flexibility, and its shape is not particularly limited, and is desirably selected depending on the shape of a window material to which the roll screen device 301 is applied, and is, for example, formed into a rectangular shape.

Figure 25B:
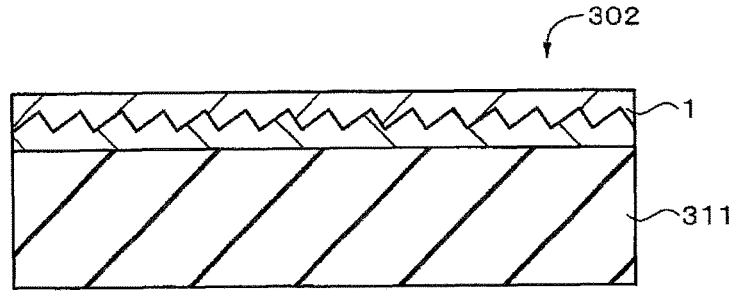
FIG. 25B is a cross-sectional view showing one structural example of a screen.

FIG. 25B is a cross-sectional view showing one structural example of the screen 302. As shown in FIG. 25B, the screen 302 is provided with a base member 311 and the optical film 1, and preferably designed so as to have flexibility. Of two main surfaces of the base member 211, the optical film 1 is preferably formed on the incident surface side (for example, surface side opposed to the window material) on which external light is made incident. The optical film 1 and the base member 311 are bonded to each other, for example, by using a bonding layer, such as an adhesive layer or a sticker layer. Additionally, the structure of the screen 302 is not limited only by this example, and the optical film 1 may be used as the screen 302.

As the shape of the base member 311, for example, a sheet shape, a film shape, a plate shape or the like may be used. As the material for the base member 311, for example, glass, a resin material, a paper material, a cloth material or the like may be used, and from the viewpoint of taking visible light into a predetermined space such as the inside of a room, a resin material having a transparent property is preferably used. As the glass, resin material, paper material and cloth material, known materials as the conventional roll screen may be used. As the optical film 1, one kind of the optical films 1 relating to the aforementioned first to fourth embodiments may be used, or two or more kinds of them may be used in combination.

<7. Seventh Embodiment>

In the seventh embodiment, explanations will be given to an example in which the present invention is applied to a fitting (interior member or exterior member) in which an optical element having a directional reflection performance is used as a lighting unit.

Figure 26A:
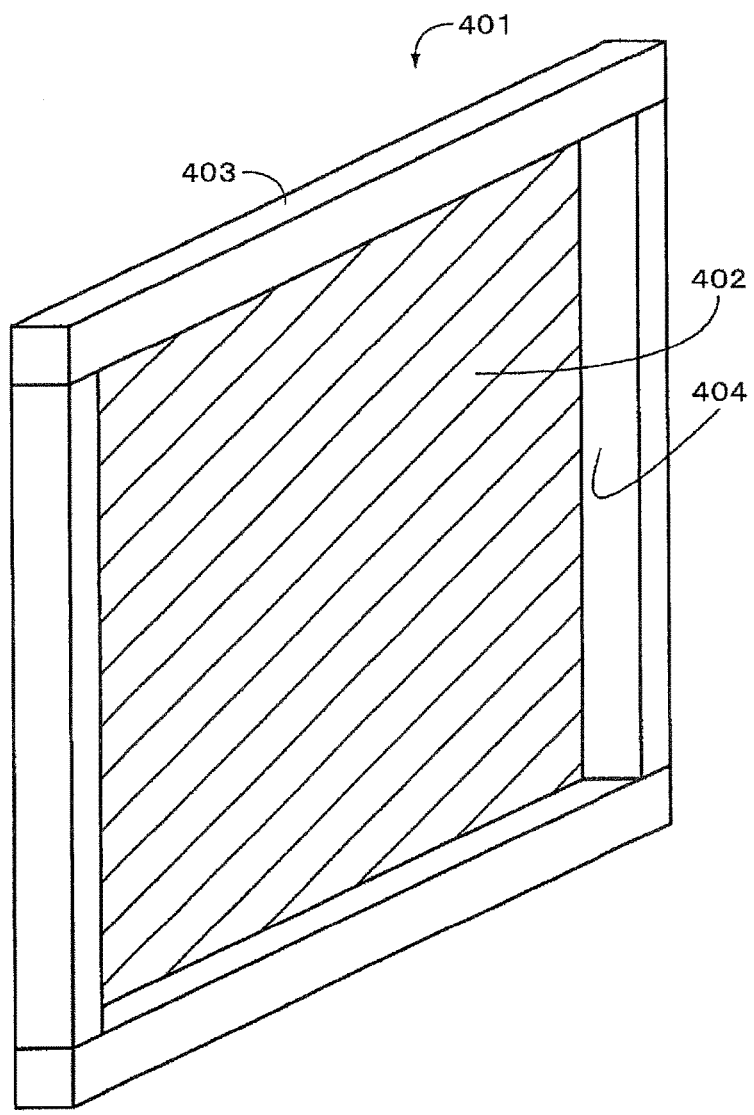
FIG. 26A is a perspective view showing one structural example of a fitting in accordance with a seventh embodiment.

FIG. 26A is a perspective view showing one structural example of the fitting in accordance with the seventh embodiment. As shown in FIG. 26A, a fitting 401 has a structure in which an optical element 402 is installed in a lighting unit 404. More specifically, the fitting 401 is provided with the optical element 402 and a frame member 403 that is formed on the peripheral edge of the optical element 402. The optical element 402 is secured by the frame member 403, and the optical element 402 can be removed by disassembling the frame member 403, if necessary. As the fitting 401, for example, a shoji screen is proposed; however, the present technique is not intended to be limited by this example, and may be applicable to various fittings having a lighting unit.

Figure 26B:
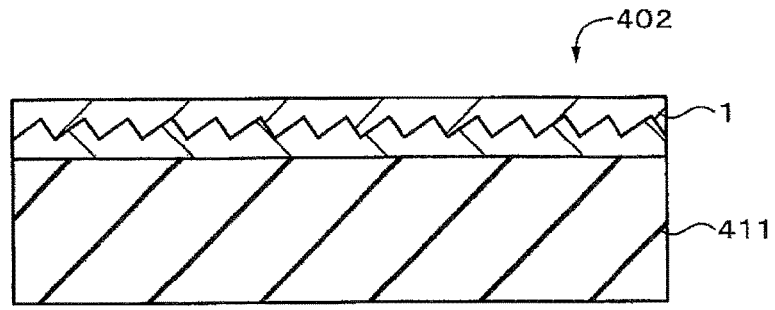
FIG. 26B is a cross-sectional view showing one structural example of an optical element.

FIG. 26B is a cross-sectional view showing one structural example of the optical element. As shown in FIG. 26B, the optical element 402 is provided with a base member 411 and the optical film 1. Of two main surfaces of the base member 411, the optical film 1 is preferably formed on the incident surface side (for example, surface side opposed to the window material) on which external light is made incident. The optical film 1 and the base member 311 are bonded to each other, for example, by using a bonding layer, such as an adhesive layer or a sticker layer. Additionally, the structure of the shoji screen is not limited only by this example, and the optical film 1 may be used as the optical element 402.

The base member 411 may be formed as, for example, a sheet, a film, or a substrate having flexibility. As the material for the base member 411, for example, glass, a resin material, a paper material, a cloth material or the like may be used, and from the viewpoint of taking visible light into a predetermined space such as the inside of a room, a resin material having a transparent property is preferably used. As the glass, resin material, paper material and cloth material, known materials as the conventional optical element for use as fittings may be used. As the optical film 1, one kind of the optical films 1 relating to the aforementioned first to fourth embodiments may be used, or two or more kinds of them may be used in combination.

EXAMPLES

The present invention is described in greater detail below by referring to the examples, however, the present technique should not be construed as being limited only to these examples.

Example 1

Figure 27:
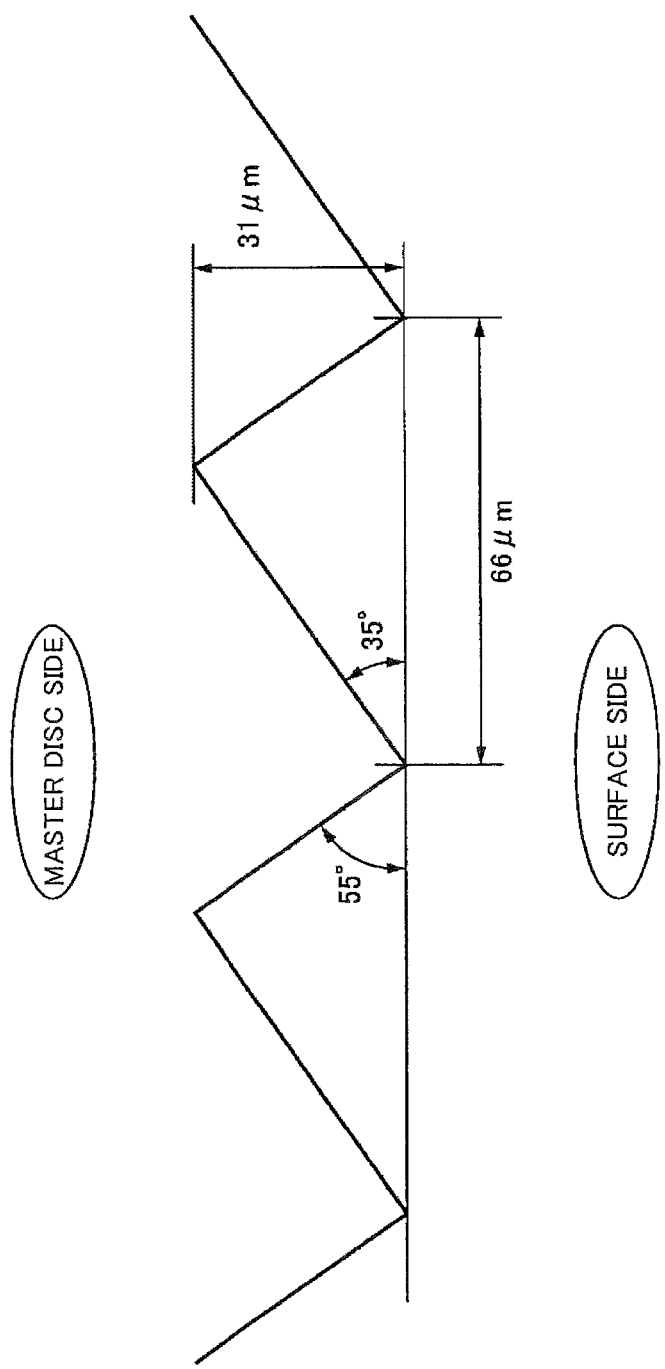
FIG. 27 is a schematic diagram showing a shape of a first groove (groove in a width direction) of a master disc for use in manufacturing the optical film in accordance with embodiment 1.
Figure 28:
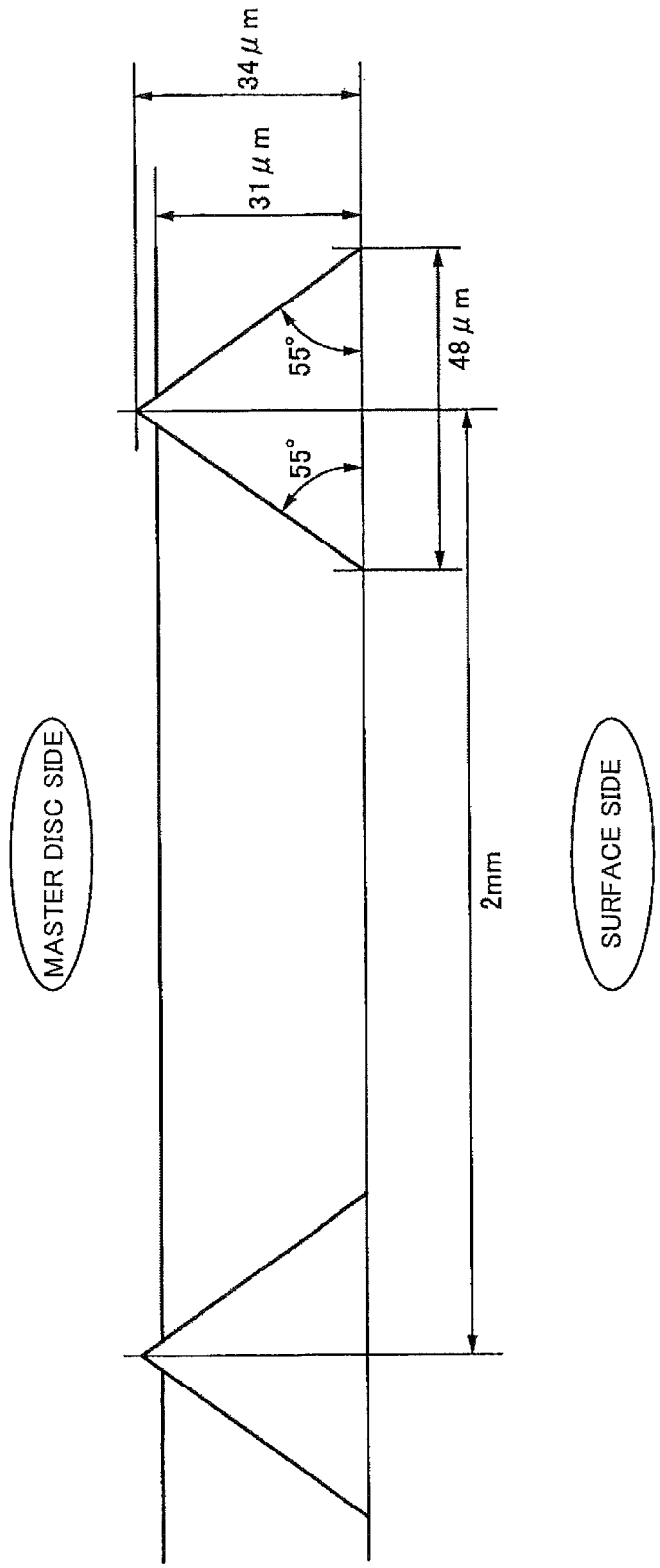
FIG. 28 is a schematic diagram showing a shape of a second groove (groove in a circumferential direction) of the master disc for use in manufacturing the optical film in accordance with embodiment 1.
Figure 29A:
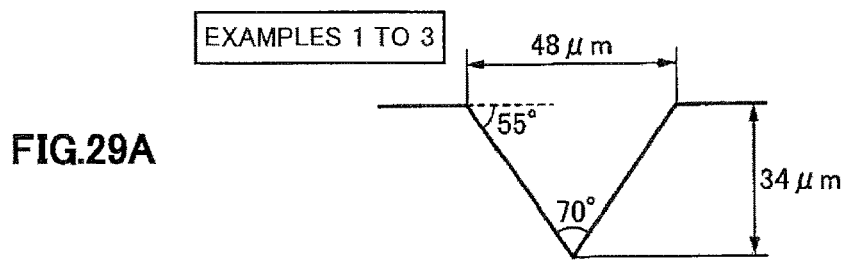
FIGS. 29A to 29D are schematic diagrams that show shape of bites used for manufacturing the master discs of embodiments 1 to 3 and 4, 6 and 8.

First, by carrying out a cutting process by the use of a bite, grooves (first grooves) shown in FIG. 27 were formed in an axis direction (width direction) of a metal mold roll made of Ni—P steel. Moreover, by carrying out a cutting process in a circumferential direction by using a bite having a shape as shown in FIG. 29A, grooves (second grooves) shown in FIG. 28 were formed in a circumferential direction of the metal mold roll made of Ni—P steel. Thus, a metal mold roll shown in FIG. 12 was obtained. In this case, the second grooves were machined with a pitch of 2 mm and a depth of 34 μm so as to be formed into grooves having a depth deeper than that of the first grooves. Next, a belt-shaped PET film (A4300, made by Toyobo Co., Ltd.) with a thickness of 75 μm was allowed to pass between this metal mold roll and the nip roll, while urethane acrylate (trade name: Allonix, made by Toagosei Co., Ltd., refractive index after having been cured: 1.533, viscosity: about 200 m Pa·s) was supplied between the metal mold roll and the belt-shaped PET film, and this was allowed to travel while being nipped, and by irradiating this with UV rays from the PET film side so that the resin was cured to be formed into a predetermined shape. Thus, a concavo-convex surface composed of a plurality of first triangular pillar-shaped elements (first structural elements) that extend in the short-side direction (width direction) of the film and a plurality of second triangular pillar-shaped elements (second structural elements) that extend in the longitudinal direction of the film was molded on the belt-shaped PET film.

Next, onto the molded surface formed into a predetermined shape, by film-forming reflection layers by a vacuum sputtering method so as to have GAZO (29.1 nm)/AgNdCu (9.9 nm)/GAZO (89.7 nm)/AgNdCu (9.9 nm)/GAZO (29.1 nm) so that in a direction perpendicular to an inclined surface of 35°, layers of GAZO (23.8 nm)/AgNdCu (8.1 nm)/GAZO (73.5 nm)/AgNdCu (8.1 nm)/GAZO (23.8 nm) were stacked. Additionally, upon film-forming the AgNdCu film serving as a silver alloy film, an alloy target having a composition of Ag/Nd/Cu=99.0 at %/0.4 at %/0.6 at % was used, and upon film-forming the GAZO film, a ceramic target having a composition of $Ga_2O_3/Al_2O_3/ZnO$=0.57 at %/0.31 at %/99.12 at % was used.

After the film formation, the film formation surface serving as a concavo-convex surface was enclosed and buried with a resin by using a device shown in FIG. 15 in the following manner. First, between nip rolls, a shaped surface with alternate multi-layer films formed thereon and a PET film (A4300, made by Toyobo Co., Ltd.) with a thickness of 50 μm were made face to face with each other, and between these, the same resin (trade name: Allonix, made by Toagosei Co., Ltd., refractive index after having been cured: 1.533, viscosity: about 200 m Pa·s) as that of the shape layer was supplied, and by allowing this to travel while being nipped, air bubbles were extruded. Next, by irradiating this with UV rays with the PET film interposed therebetween, the resin was cured. By the above-mentioned processes, a target optical film of example 1 was obtained.

Example 2

The same processes as those of example 1 were carried out except that Al (15 nm) was film-formed as the reflection layer so that an optical film of example 2 was obtained.

Example 3

The same processes as those of example 1 were carried out except that upon processing the second grooves (grooves in the circumferential direction), the pitch was set to 4 mm so that an optical film of example 3 was obtained.

Example 4

Figure 29B:
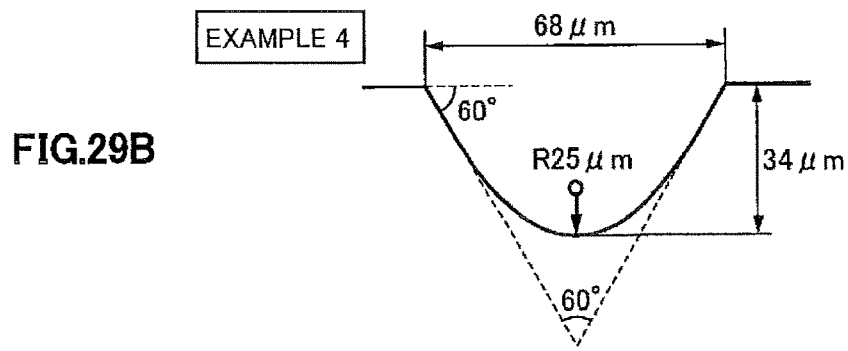

The same processes as those of example 1 were carried out except that upon processing the second grooves (grooves in the circumferential direction), a bite having a shape shown in FIG. 29B was used so that an optical film of example 4 was obtained.

Example 5

The same processes as those of example 1 were carried out except that upon processing the second grooves (grooves in the circumferential direction), the second grooves were formed with a crossed axes angle of θ=±60° and a pitch of 1 mm, as shown in FIG. 20, so that an optical film of example 5 was obtained.

Example 6

Figure 29C:
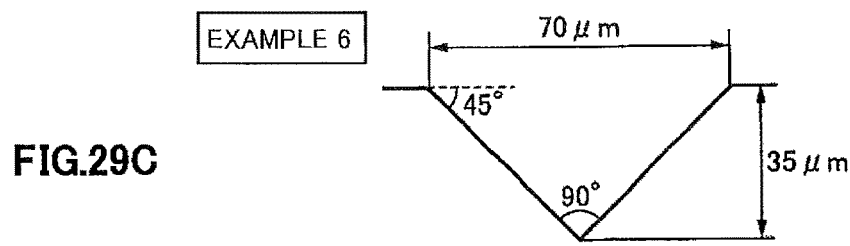

The same processes as those of example 1 were carried out except that upon processing the second grooves (grooves in the circumferential direction), a bite having a shape shown in FIG. 29C was used with a processed depth of 35 μm so that an optical film of example 6 was obtained.

Example 7

The same processes as those of example 1 were carried out except that upon processing the first grooves (grooves in the axis direction), a groove structure having symmetric inclinations with 45° was formed as shown in Table 1 so that an optical film of example 7 was obtained.

Example 8

Figure 29D:
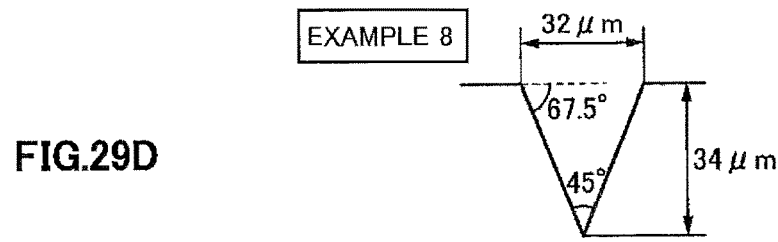
Figure 30A:
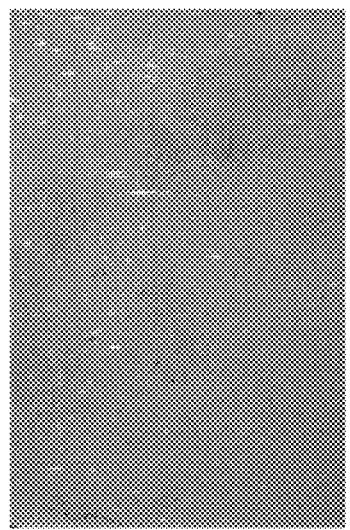
FIGS. 30A to 30D are drawings that show the results of observations of optical films in accordance with embodiments 1, 4, 6 and 8.
Figure 30B:
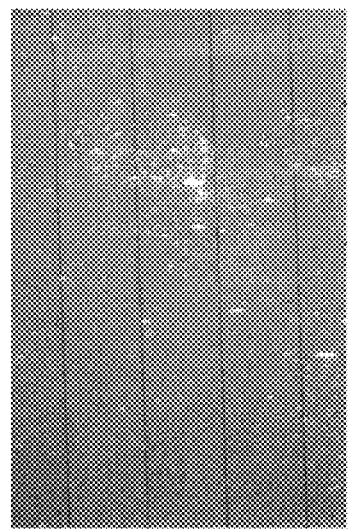
Figure 30C:
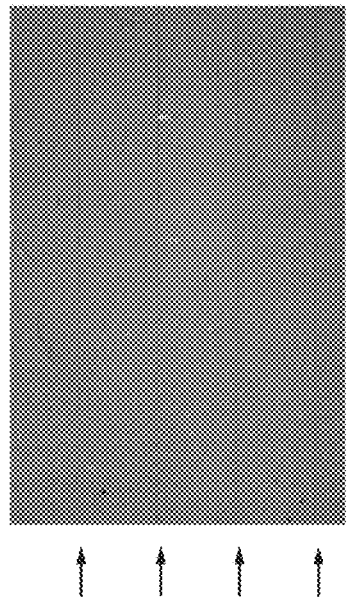
Figure 30D:
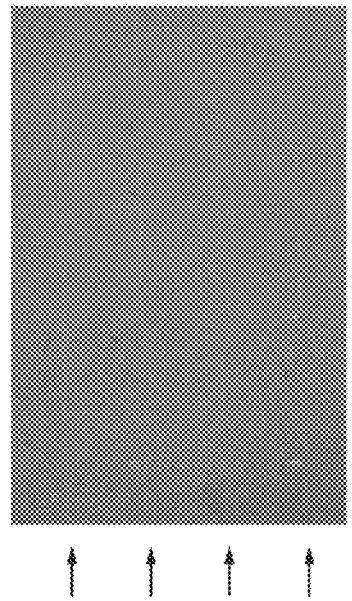

The same processes as those of example 1 were carried out except that upon processing the second grooves (grooves in the circumferential direction), a bite having a shape shown in FIG. 29D was used so that an optical film of example 8 was obtained.

Example 9

The same processes as those of example 1 were carried out except that upon processing the second grooves (grooves in the circumferential direction), the pitch was set to 150 μm so that an optical film of example 9 was obtained.

Example 10

The same processes as those of example 1 were carried out except that upon processing the second grooves, the pitch was set to 10 mm so that an optical film of example 10 was obtained.

Example 11

The same processes as those of example 1 were carried out except that upon processing the second grooves (grooves in the circumferential direction), the processed depth was set to 28 μm so that an optical film of example 11 was obtained.

Comparative Example 1

The same processes as those of example 1 were carried out except that the second grooves (grooves in the circumferential direction) were not processed so that an optical film of comparative example 1 was obtained.
(Evaluation of Stripes in Flowing Direction)
Each of the optical films thus manufactured was bonded to a window glass, and scenes on the opposite side were observed through the optical film from diagonal directions of 45° and 70° on a fine day.
○: The scenes were viewed without any distortion in the same manner as in the case of no optical film being bonded, from either the direction of 45° or 70°.
Δ: Although distortion in the scenes at 45° did not give adverse effects, stripe-like distortions were observed at 70°.
x: Stripe-like distortions were also observed in the scenes at 45°.
Additionally, in the case when the scenes were viewed without any distortion also at the angle of 70°, the planarity of the surface of the optical film is high, and the optical film may be used for a high-class building; however, even in the case when a slight distortion is observed at 70°, if no distortion is observed when viewed from an angle of about 45°, the optical film may be applied to a general building
(Evaluation of Visibility of Ridge Line in Longitudinal Direction)
Each of the optical films thus manufactured was bonded to a window glass, and the optical film was observed from the front side with a distance of 50 cm on a fine day. In this case, the "ridge line in the longitudinal direction" refers to the ridge line of a second triangular pillar-shaped element (second structural element) observed when the optical film is viewed from the front side.
⊚: No adverse effects are caused at all by the ridge lines in the longitudinal direction.
○: Although it looks as if there is something at a portion of the ridge line in the longitudinal direction when viewed carefully, the degree thereof is so small that no adverse effects are given.
x: Portions corresponding to the ridge lines in the longitudinal direction are observed like black lines.
FIGS. 30A to 30D typically show the results of observations of the optical films of examples 1, 4, 6 and 8.
(Diffraction Pattern in Lateral Direction)
Each of the optical films thus manufactured was bonded to a window glass in a manner so as to make the direction of the ridge line in the longitudinal direction coincident with the vertical direction, and at night, a light bulb located far away by 100 m or more was observed.
○: No diffraction patterns are observed in the lateral direction.
x: Diffraction patterns with color separations are observed in the lateral direction.
Table 1 shows configurations of the optical films of examples 1 to 11 and comparative example 1.

TABLE 1

| | First triangular pillar-shaped element | | | | Second triangular pillar-shaped element | | | | | |
|---|---|---|---|---|---|---|---|---|---|---|
| | Inclination $\alpha 1$ [°] | Inclination $\beta 1$ [°] | Pitch P1 [μm] | Height H1 [μm] | Crossed axes angle $\theta$ [°] | Inclination $\alpha 2$, $\beta 2$ [°] | Tip portion | Width W2 [μm] | Pitch P2 [mm] | Height H2 [μm] |
| Example 1 | 35 | 55 | 66 | 31 | 90 | 55 | Right angle | 48 | 2 | 34 |
| Example 2 | 35 | 55 | 66 | 31 | 90 | 55 | Right angle | 48 | 2 | 34 |
| Example 3 | 35 | 55 | 66 | 31 | 90 | 55 | Right angle | 48 | 4 | 34 |
| Example 4 | 35 | 55 | 66 | 31 | 90 | 60 | R25 μm | 68 | 2 | 34 |
| Example 5 | 35 | 55 | 66 | 31 | ±60 | 55 | Right angle | 48 | 1 | 34 |
| Example 6 | 35 | 55 | 66 | 31 | 90 | 45 | Right angle | 70 | 2 | 35 |
| Example 7 | 45 | 45 | 66 | 33 | 90 | 45 | Right angle | 70 | 2 | 35 |
| Example 8 | 35 | 55 | 66 | 31 | 90 | 67.5 | Right angle | 32 | 2 | 34 |
| Example 9 | 35 | 55 | 66 | 31 | 90 | 55 | Right angle | 48 | 0.15 | 34 |
| Example 10 | 35 | 55 | 66 | 31 | 90 | 55 | Right angle | 48 | 10 | 34 |
| Example 11 | 35 | 55 | 66 | 31 | 90 | 55 | Right angle | 39 | 2 | 28 |
| Comparative example 1 | 35 | 55 | 66 | 31 | — | | | | | |

Crossed axes angle θ: Crossed axes angle between the first triangular pillar-shaped element and the second triangular pillar-shaped element
Right angle: Right angle with a sharp tip portion (pin angle)

Table 2 shows structural parameters of optical films of examples 1 to 11 and comparative example 1, and results of evaluations.

TABLE 2

| | Structural Parameters | | | Evaluation Results | | |
|---|---|---|---|---|---|---|
| | ΔH [μm] | P2/W2 [μm] | Δα, Δβ [°] | Flowing direction stripe | Ridge line visibility | Lateral diffraction pattern |
| Example 1 | 3 | 42 | 0 | ○ | ○ | ○ |
| Example 2 | 3 | 42 | 0 | ○ | ○ | ○ |
| Example 3 | 3 | 83 | 0 | ○ | ○ | ○ |
| Example 4 | 3 | 29 | 5 | ○ | ◎ | ○ |
| Example 5 | 3 | 21 | 0 | ○ | ○ | ○ |
| Example 6 | 4 | 29 | ±10 | ○ | ◎ | ○ |
| Example 7 | 2 | 29 | 0 | ○ | ◎ | ○ |
| Example 8 | 3 | 63 | 12.5 | ○ | X | ○ |
| Example 9 | 3 | 3 | 0 | ○ | ○ | X |
| Example 10 | 3 | 208 | 0 | Δ | ○ | ○ |
| Example 11 | −3 | 51 | 0 | Δ | ○ | ○ |
| Comparative example 1 | — | — | — | X | — | ○ |

ΔH: (Height H2 of second triangular pillar-shaped element) − (Height H1 of first triangular pillar-shaped element)
P2/W2: (Pitch P2 of second triangular pillar-shaped element)/(With W2 of second triangular pillar-shaped element)
Δα: (Inclination α2 of second triangular pillar-shaped element) − (Inclination α1 of first triangular pillar-shaped element)
Δβ: (Inclination β2 of second triangular pillar-shaped element) − (Inclination β1 of first triangular pillar-shaped element)

Figure 31:
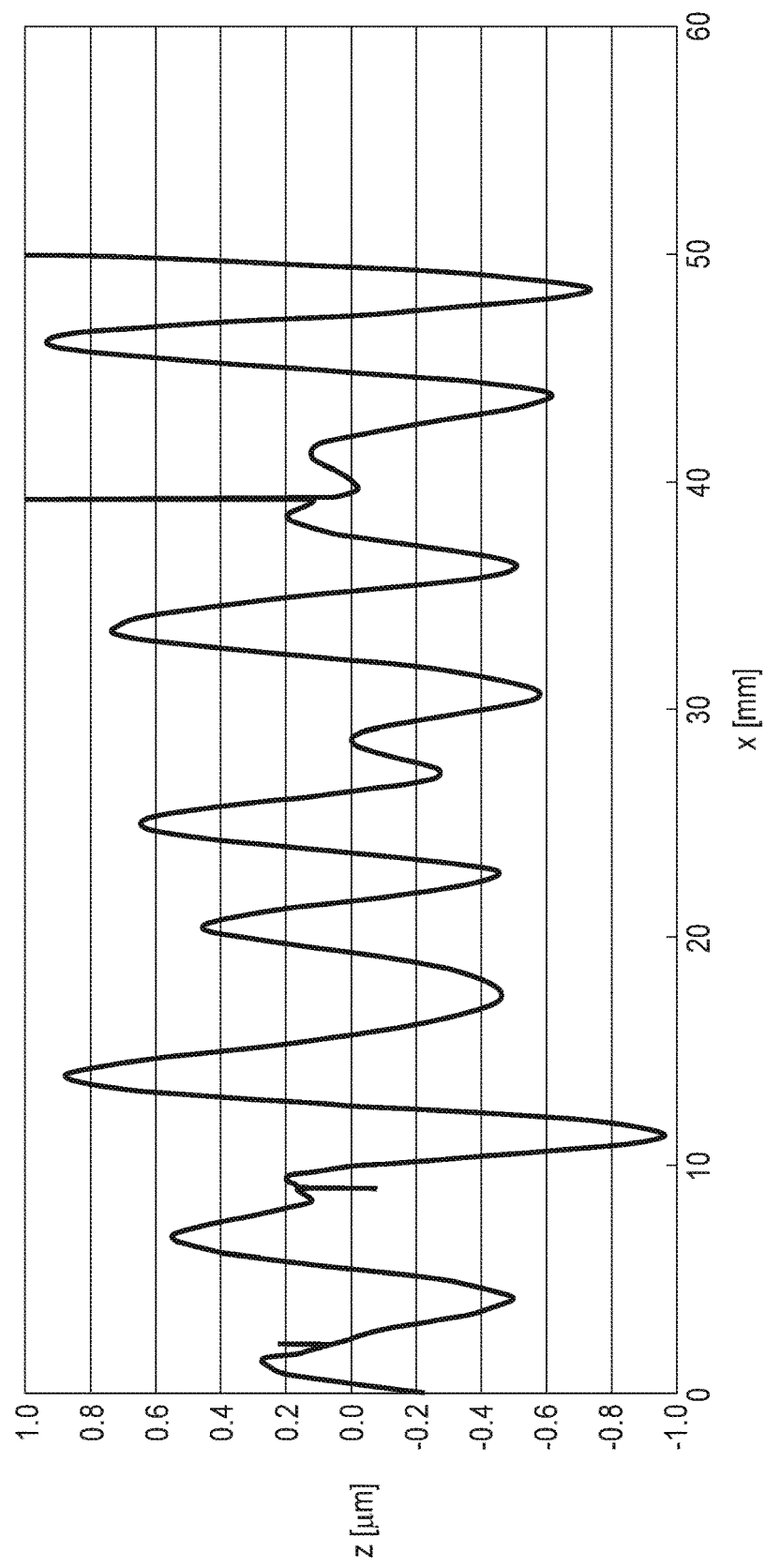
FIG. 31 is a drawing that shows roughness curves on the surface of an optical film in accordance with comparative example 1.

From Table 1 and Table 2, the following facts are confirmed. In comparative example 1, in the case when flowing-direction stripes were observed, clear stripes were observed. In order to measure the pitch and height of each of the stripes, by using a stylus type surface shape measuring device ET-4000 (made by Kosaka Research Institute, Inc.), a roughness curve was obtained in a manner so as to traverse the stripe. As a result, it was found that as shown in FIG. 31, the stripe had a pitch of about 6 mm and a height of about 1 to 2 μm. Moreover, in the case when the optical film was turned over so as to carry out the same measurements thereon, since the positions of the peaks and the bottoms were approximately coincident with each other on the surface and rear surface sides, it was found that the stripes were not derived from the shrinkage of the optical film, but caused by the thickness distribution.

On the other hand, in examples 1 to 11, it was found that by forming the second triangular pillar-shaped elements that intersect with the first triangular pillar-shaped elements, the generation of flowing-direction stripes could be suppressed. It is considered that the flowing-direction stripes are caused by the fact that in the case when there are no second triangular pillar-shaped elements that are extended in the longitudinal direction of the optical film, since no paths for allowing the resin to flow in the traveling direction (flowing direction of the resin) of the optical film, the resin is locally gathered to cause irregularities in thickness.

Moreover, it is found that, as shown in examples 1 to 9, by forming the second triangular pillar-shaped elements that are higher than the first triangular pillar-shaped elements with a pitch of 1 to 4 mm, the generation of the flowing-direction stripes can be further suppressed. In example 10, although the generation of the flowing-direction stripes can be suppressed, the suppressing effect tends to be lowered in comparison with examples 1 to 9 and in the observations from the direction of 70°, flowing-direction stripes were observed. It is considered that this is caused by the fact that in example 10, the pitch of the second triangular pillar-shaped elements is as wide as 10 mm. Moreover, in example 11 also, it is found that although the generation of the flowing-direction stripes are suppressed, the same tendency as that of example 10 is exerted. It is considered that this is because of the fact that in example 11, the height of the second triangular pillar-shaped elements is lower than that of the first triangular pillar-shaped elements.

Moreover, in the case when each of the optical films of examples 1 to 11 and comparative example 1 was bonded to a window, in the optical film of example 8, black lines were visually recognized at portions corresponding to the ridge lines of the second triangular pillar-shaped elements. This is because of the fact that since the inclination of the second triangular pillar-shaped elements is as large as 67.5°, a sputtered multi-layer film is hardly adhered onto this inclined surface, the Ag layer fails to form a continuous layer to cause an increase in optical absorption. In contrast, in the case of the optical films of examples 6 and 7, since the inclination of the second triangular pillar-shaped elements was small, the adhesion of the sputtered film was superior so that the ridge lines in the longitudinal direction were hardly visually recognized. In the case of the optical film of example 4, the inclination of the second triangular pillar-shaped elements was 60°, which was comparatively large; however, since an R-shape was formed on its tip portion, and since the inclination of this portion was small, the ridge lines in the longitudinal direction were hardly visually recognized.

Furthermore, in the case when a far-away light bulb was observed through each of these optical films bonded to the window, lateral diffraction patterns were observed only in the case of example 9. This is because of the fact the pitch of the second triangular pillar-shaped elements was as small as 150 μm, and in the case of the optical films of examples 1 to 8, 10 and 11, as well as comparative example 1, in which the pitch of the second triangular pillar-shaped elements was 1 mm or more, none of these diffraction patterns were found.

As described above, explanation has been given specifically to embodiments of the present technique; however, the present technique is not intended to be limited by the above-mentioned embodiments, and various modifications may be made therein based upon technical ideas of the present technique.

For example, although the configurations, methods, shapes, materials and numeric values are used in the above-mentioned embodiments, they are exemplary only, and configurations, methods, shapes, materials, numeric values and the like, different from those may be used, on demand.

Moreover, the respective configurations of the above-mentioned embodiments may be combined with one another on demand within the scope not departing from the gist of the present invention.

In the above-mentioned embodiments, explanations have been given by exemplifying the driving system of the blind device and the roll screen device as a manual driving system; however, an electric driving system may be used as the driving system of the blind device and the roll screen device.

Moreover, in the above-mentioned embodiment, explanations have been given by exemplifying a configuration in which an optical film is bonded to an adherent member such as a window material or the like; however, another configuration may be adopted in which the adherent member such as the window material or the like is prepared as a first optical layer or a second optical layer itself of the optical film. Thus, the optical element such as the window material or the like may be preliminarily prepared with a function for a directional reflection.

Moreover, in the above-mentioned embodiments, explanations have been given by exemplifying a configuration in which the optical element is prepared as an optical film; however, the shape of the optical element is not intended to be limited by a film shape, and a plate shape, a block shape or the like may be used.

In the above-mentioned embodiments, explanation have been given by exemplifying a structure in which the present technique is applied to an interior member or an exterior member, such as a window material, fittings, slats of a blind device, and a screen or the like of a roll screen device; however, the present technique is not intended to be limited by these, and may be applicable to an interior member and an exterior member other than those described above.

As the interior member or the exterior member to which the optical element relating to the present invention is applied, for example, an interior member or an exterior member constituted by an optical element itself, an interior member or an exterior member constituted by a transparent substrate to which a directional reflection body is bonded, or the like, is proposed. By installing such an interior member or exterior member in the vicinity of a window inside a room, for example, only infrared rays can be directionally reflected outside the room, while visible light rays can be taken into the room. Therefore, in the case when the interior member or the exterior member is installed, it becomes possible to reduce the necessity of indoor illumination. Moreover, since there is hardly any diffused reflection onto the indoor side by the interior member or the exterior member, it is possible to suppress an ambient temperature rise. Furthermore, in accordance with required purposes, such as visibility control, intensity improvement and the like, the present invention may be applied to a bonding member other than the transparent substrate.

In the above-mentioned embodiments, explanations have been given by exemplifying a case in which the present invention is applied to a blind device and a roll screen device; however, the present invention is not intended to be limited by these, and may be applicable to various solar shading devices to be installed indoors or outdoors.

Moreover, in the above-mentioned embodiments, explanations have been given by exemplifying a case in which the present technique is applied to a solar shading device (for example, roll screen device) capable of adjusting the shading amount of incident light rays by winding a solar shading member up or by feeding the solar shading member out; however, the present technique is not intended to be limited by this example. For example, the present technique may be applied to a solar shading device capable of adjusting the shading amount of incident light rays by folding the shading member up. As the solar shading device of this type, for example, a pleated screen device which is capable of adjusting the shading amount of incident light rays by folding up a screen serving as the shading member like bellows is proposed.

Furthermore, in the above-mentioned embodiments, explanations have been given by exemplifying a case in which the present technique is applied to a horizontal blind device (Venetian blind device); however, the present technique may also be applicable to a longitudinal blind device (vertical blind device).

The present technique may have the following configurations.

(1)

An optical element including: an optical layer having a concavo-convex surface formed on one surface thereof; and a wavelength-selective reflection layer formed on the concavo-convex surface, and in this structure, the wavelength-selective reflection layer directionally reflects a light ray having a specific wavelength band, while transmitting light rays having wavelength bands other than the specific wavelength band, and the concavo-convex surface is provided with a plurality of first structural elements that are extended in a first direction within the surface of the optical layer and a plurality of second structural elements that are extended in a second direction within the surface of the optical layer, and located so as to be spaced apart from one another, with the first direction and the second direction intersecting with each other.

(2)

The optical element according to (1) in which the optical layer has a belt-like or rectangular shape provided with a width direction and a longitudinal direction, with the first direction serving as the width direction of the optical layer and the second direction serving as the longitudinal direction of the optical layer.

(3)

The optical element according to (1) in which the optical layer has a rectangular shape with two pairs of opposed sides, with the first direction corresponding to an extending direction of one of the two pairs of sides and the second direction corresponding to an extending direction of the other of the two pairs of sides.

(4)

The optical element according to any one of (1) to (3) in which the second structural element is higher than the first structural element.

(5)

The optical element according to any one of (1) to (4) in which the second structural element has an inclination of 65° or less.

(6)

The optical element according to any one of (1) to (5) in which the second structural element has a pitch in a range of 200 μm or more to 5 mm or less.

(7)

The optical element according to any one of (1) to (6) in which the second structural element has an R-shape on an apex portion thereof.

(8)

The optical element according to any one of (1) to (7) in which a difference between angles of inclined surfaces of the first structural element and the second structural element is set in a range of ±15° or less.

(9)

The optical element according to any one of (1) to (8) further including: an optical layer formed on the wavelength-selective reflection layer in a manner so as to bury the concavo-convex surface.

(10)

The optical element according to any one of (1) to (9) in which the first direction and the second direction are allowed to orthogonally intersect with each other or virtually orthogonally intersect with each other.

(11)

The optical element according to any one of (1) to (9) in which the first direction and the second direction are allowed to diagonally intersect with each other.

(12)

A window material including an optical element according to any one of (1) to (11).

(13)

The window material according to (12) in which the optical element is installed such that a ridge line direction of the first structural element is made virtually orthogonal to a height direction of a building.

(14)

A fitting provided with an optical element according to any one of (1) to (11) installed in a lighting unit.

(15)

A solar shading device including one or a plurality of solar shading members for shading solar light, in which the solar shading member is provided with an optical element according to any one of (1) to (11).

(16)

A building including an optical element according to any one of (1) to (11).

REFERENCE SIGNS LIST

1 . . . optical film
2 . . . optical layer
3 . . . wavelength-selective reflection layer
4 . . . first optical layer
4a . . . first substrate
4b . . . concavo-convex surface
4m . . . first structural element
4n . . . second structural element
5 . . . second optical layer
5a . . . second substrate
5b . . . concavo-convex surface
6 . . . bonding layer
7 . . . separation layer
8 . . . hard coat layer
9 . . . optical layer with reflection layer
S1 . . . incident surface
S2 . . . light-releasing surface

The invention claimed is:

1. An optical element comprising:
   an optical layer having a concavo-convex surface formed on one surface thereof; and
   a wavelength-selective reflection layer formed on the concavo-convex surface,
   wherein:
      the wavelength-selective reflection layer directionally reflects a light ray having a specific wavelength band, while transmitting light rays having wavelength bands other than the specific wavelength band,
      the concavo-convex surface is provided with a plurality of first structural elements that are extended in a first direction within the surface of the optical layer and a plurality of second structural elements having a width of W2 and that are extended in a second direction within the surface of the optical layer, and located so as to be spaced apart from one another, with the first direction and the second direction intersecting with each other,
      the first structural elements have an first apex angle made by a first inclined surface and second inclined surface,
      the second structural elements have a second apex angle made by a third inclined surface and fourth inclined surface,
      supposing that a pitch of the second structural elements is P2, the pitch P2 is 10*W2 or more,
      the wavelength-selective reflection layer is covered entirely with a resin,
      the second structural elements each have an R-share on an apex portion thereof, and
      a difference between angles of inclined surfaces of the first structural elements and the second structural elements is set in a range of ±15° or less.

2. The optical element according to claim 1, wherein the optical layer has a belt-like or rectangular shape provided with a width direction and a longitudinal direction, with the first direction serving as the width direction of the optical layer and the second direction serving as the longitudinal direction of the optical layer.

3. The optical element according to claim 1, wherein the optical layer has a rectangular shape with two pairs of opposed sides, with the first direction corresponding to an extending direction of one of the two pairs of sides and the second direction corresponding to an extending direction of the other of the two pairs of sides.

4. The optical element according to claim 1, wherein the second structural element has an inclination of 65° or less.

5. The optical element according to claim 1, further comprising:
   an optical layer formed on the wavelength-selective reflection layer in a manner so as to bury the concavo-convex surface.

6. The optical element according to claim 1, wherein an angle of intersection of the first direction and the second direction is orthogonal or substantially orthogonal.

7. The optical element according to claim 1, wherein an angle of intersection of the first direction and the second direction is not orthogonal.

8. A window material comprising: an optical element according to claim 1.

9. The window material according to claim 8, wherein the optical element is installed such that an angle of intersection of a ridge line direction of the first structural element and a height direction of a building is orthogonal or substantially orthogonal.

10. A fitting comprising: an optical element according to claim 1 installed in a lighting unit.

11. A solar shading device comprising:
    one or a plurality of solar shading members for shading solar light,
    wherein the solar shading member is provided with an optical element according to claim 1.

12. A building comprising: an optical element according to claim 1.

13. The optical element according to claim 1, wherein the light ray having a specific wavelength band is one portion of near infrared rays in solar light rays, and the light rays having wavelength bands other than the specific wavelength band are solar light rays other than the portion of near infrared rays.

* * * * *